United States Patent
Sandrew et al.

(10) Patent No.: US 8,073,247 B1
(45) Date of Patent: Dec. 6, 2011

(54) MINIMAL ARTIFACT IMAGE SEQUENCE DEPTH ENHANCEMENT SYSTEM AND METHOD

(75) Inventors: Barry Sandrew, San Diego, CA (US); Tony Baldridge, San Diego, CA (US)

(73) Assignee: Legend3D, Inc., San Diego, CA (US)

( * ) Notice: Subject to any disclaimer, the term of this patent is extended or adjusted under 35 U.S.C. 154(b) by 0 days.

(21) Appl. No.: 12/916,636

(22) Filed: Nov. 1, 2010

Related U.S. Application Data

(60) Division of application No. 12/913,614, filed on Oct. 27, 2010, which is a continuation-in-part of application No. 12/542,498, filed on Aug. 17, 2009, now Pat. No. 7,907,793, which is a continuation-in-part of application No. 12/032,969, filed on Feb. 18, 2008, now Pat. No. 7,577,312, which is a continuation of application No. 11/324,815, filed on Jan. 4, 2006, now Pat. No. 7,333,670, which is a division of application No. 10/450,970, filed as application No. PCT/US02/14192 on May 6, 2002, now Pat. No. 7,181,081.

(60) Provisional application No. 60/288,929, filed on May 4, 2001.

(51) Int. Cl.
*G06K 9/00* (2006.01)

(52) U.S. Cl. .......... 382/164; 382/167; 382/274; 382/275

(58) Field of Classification Search .................. 382/164, 382/167, 260, 274, 275, 283
See application file for complete search history.

(56) References Cited

U.S. PATENT DOCUMENTS

| | | | |
|---|---|---|---|
| 3,619,051 A | 11/1971 | Wright | |
| 3,621,127 A | 11/1971 | Hope | |
| 3,705,762 A | 12/1972 | Ladd et al. | |
| 3,737,567 A | 6/1973 | Kratomi | |
| 3,772,465 A | 11/1973 | Vlahos et al. | |

(Continued)

FOREIGN PATENT DOCUMENTS

EP   1187494   3/2002

(Continued)

OTHER PUBLICATIONS

Murray et al., Active Tracking, IEEE International Conference on Intelligent Robots and Systems, Sep. 1993, pp. 1021-1028.

(Continued)

*Primary Examiner* — Yosef Kassa
(74) *Attorney, Agent, or Firm* — ARC IP Law, PC; Joseph J. Mayo

(57) ABSTRACT

Motion picture scenes to be colorized/depth enhanced (2D->3D) are broken into separate elements, backgrounds/sets or motion/onscreen-action. Background and motion elements are combined into composite frame which becomes a visual reference database that includes data for all frame offsets used later for the computer controlled application of masks within a sequence of frames. Masks are applied to subsequent frames of motion objects based on various differentiating image processing methods, including automated mask fitting/reshaping. Colors and/or depths are automatically applied to masks throughout a scene from the composite background and to motion objects. Areas never exposed by motion or foreground objects in a series of images may be partially or fully realistically drawn or rendered and applied to the occluded areas of the background and then automatically applied throughout the images to generate of minimal artifact or artifact-free secondary viewpoints when translating foreground objects horizontally during 2D->3D conversion.

24 Claims, 65 Drawing Sheets

U.S. PATENT DOCUMENTS

| | | | |
|---|---|---|---|
| 3,851,955 A | 12/1974 | Kent et al. | |
| 4,021,841 A | 5/1977 | Weinger | |
| 4,021,846 A | 5/1977 | Roese | |
| 4,149,185 A | 4/1979 | Weinger | |
| 4,183,633 A | 1/1980 | Kent et al. | |
| 4,235,503 A | 11/1980 | Condon | |
| 4,436,369 A | 3/1984 | Bukowski | |
| 4,544,247 A | 10/1985 | Ohno | |
| 4,558,359 A | 12/1985 | Kuperman et al. | |
| 4,600,919 A | 7/1986 | Stern | |
| 4,603,952 A | 8/1986 | Sybenga | |
| 4,606,625 A | 8/1986 | Geshwind | |
| 4,642,676 A | 2/1987 | Weinger | |
| 4,647,965 A | 3/1987 | Imsand | |
| 4,697,178 A | 9/1987 | Heckel | |
| 4,755,870 A | 7/1988 | Markle et al. | |
| 4,809,065 A | 2/1989 | Harris et al. | |
| 4,888,713 A | 12/1989 | Falk | |
| 4,903,131 A | 2/1990 | Lingemann et al. | |
| 4,925,294 A | 5/1990 | Geshwind et al. | |
| 4,933,670 A | 6/1990 | Wislocki | |
| 4,984,072 A | 1/1991 | Sandrew | |
| 5,002,387 A | 3/1991 | Baljet et al. | |
| 5,038,161 A | 8/1991 | Ki | |
| 5,050,984 A | 9/1991 | Geshwind | |
| 5,093,717 A | 3/1992 | Sandrew | |
| 5,181,181 A | 1/1993 | Glynn | |
| 5,185,852 A | 2/1993 | Mayer | |
| 5,237,647 A | 8/1993 | Roberts et al. | |
| 5,243,460 A | 9/1993 | Kornberg | |
| 5,252,953 A | 10/1993 | Sandrew et al. | |
| 5,328,073 A | 7/1994 | Blanding et al. | |
| 5,341,462 A | 8/1994 | Obata | |
| 5,363,476 A | 11/1994 | Kurashige et al. | |
| 5,402,191 A | 3/1995 | Dean et al. | |
| 5,428,721 A | 6/1995 | Sato et al. | |
| 5,495,576 A | 2/1996 | Ritchey | |
| 5,534,915 A | 7/1996 | Sandrew | |
| 5,668,605 A | 9/1997 | Nachshon et al. | |
| 5,673,081 A | 9/1997 | Yamashita et al. | |
| 5,682,437 A | 10/1997 | Okino et al. | |
| 5,684,715 A | 11/1997 | Palmer | |
| 5,699,443 A | 12/1997 | Murata et al. | |
| 5,699,444 A | 12/1997 | Palm | |
| 5,729,471 A | 3/1998 | Jain et al. | |
| 5,739,844 A | 4/1998 | Kuwano et al. | |
| 5,748,199 A | 5/1998 | Palm | |
| 5,767,923 A | 6/1998 | Coleman | |
| 5,777,666 A | 7/1998 | Tanase et al. | |
| 5,778,108 A | 7/1998 | Coleman | |
| 5,784,175 A | 7/1998 | Lee | |
| 5,784,176 A | 7/1998 | Narita | |
| 5,808,664 A | 9/1998 | Yamashita et al. | |
| 5,835,163 A | 11/1998 | Liou et al. | |
| 5,841,512 A | 11/1998 | Goodhill | |
| 5,899,861 A | 5/1999 | Friemel et al. | |
| 5,912,994 A | 6/1999 | Norton et al. | |
| 5,920,360 A | 7/1999 | Coleman | |
| 5,929,859 A | 7/1999 | Meijers | |
| 5,940,528 A | 8/1999 | Tanaka et al. | |
| 5,959,697 A | 9/1999 | Coleman | |
| 5,973,700 A | 10/1999 | Taylor et al. | |
| 5,982,350 A | 11/1999 | Hekmatpour et al. | |
| 5,990,900 A | 11/1999 | Seago | |
| 5,990,903 A | 11/1999 | Donovan | |
| 6,011,581 A | 1/2000 | Swift et al. | |
| 6,014,473 A | 1/2000 | Hossack et al. | |
| 6,025,882 A | 2/2000 | Geshwind | |
| 6,031,564 A | 2/2000 | Ma et al. | |
| 6,049,628 A | 4/2000 | Chen et al. | |
| 6,056,691 A | 5/2000 | Urbano et al. | |
| 6,067,125 A | 5/2000 | May | |
| 6,086,537 A | 7/2000 | Urbano et al. | |
| 6,088,006 A | 7/2000 | Tabata | |
| 6,091,421 A | 7/2000 | Terrasson | |
| 6,102,865 A | 8/2000 | Hossack et al. | |
| 6,119,123 A | 9/2000 | Elenbaas et al. | |
| 6,132,376 A | 10/2000 | Hossack et al. | |
| 6,141,433 A | 10/2000 | Moed et al. | |
| 6,198,484 B1 | 3/2001 | Kameyama | |
| 6,201,900 B1 | 3/2001 | Hossack et al. | |
| 6,208,348 B1 | 3/2001 | Kaye | |
| 6,211,941 B1 | 4/2001 | Erland | |
| 6,222,948 B1 | 4/2001 | Hossack et al. | |
| 6,226,015 B1 | 5/2001 | Danneels et al. | |
| 6,228,030 B1 | 5/2001 | Urbano et al. | |
| 6,263,101 B1 | 7/2001 | Klein | |
| 6,314,211 B1 | 11/2001 | Kim et al. | |
| 6,337,709 B1 | 1/2002 | Yamaashi et al. | |
| 6,360,027 B1 | 3/2002 | Hossack et al. | |
| 6,364,835 B1 | 4/2002 | Hossack et al. | |
| 6,373,970 B1 | 4/2002 | Dong et al. | |
| 6,390,980 B1 | 5/2002 | Peterson et al. | |
| 6,414,678 B1 | 7/2002 | Goddard et al. | |
| 6,416,477 B1 | 7/2002 | Jago | |
| 6,429,867 B1 | 8/2002 | Deering | |
| 6,445,816 B1 | 9/2002 | Pettigrew | |
| 6,456,340 B1 | 9/2002 | Margulis | |
| 6,466,205 B2 | 10/2002 | Simpson et al. | |
| 6,477,267 B1 | 11/2002 | Richards | |
| 6,492,986 B1 | 12/2002 | Metaxas et al. | |
| 6,496,598 B1 | 12/2002 | Harman | |
| 6,509,926 B1 | 1/2003 | Mills et al. | |
| 6,515,659 B1 | 2/2003 | Kaye et al. | |
| 6,535,233 B1 | 3/2003 | Smith | |
| 6,553,184 B1 | 4/2003 | Ando et al. | |
| 6,590,573 B1 | 7/2003 | Geshwind | |
| 6,677,944 B1 | 1/2004 | Yamamoto | |
| 6,686,591 B2 | 2/2004 | Ito et al. | |
| 6,686,926 B1 | 2/2004 | Kaye | |
| 6,707,487 B1 | 3/2004 | Aman et al. | |
| 6,727,938 B1 | 4/2004 | Randall | |
| 6,744,461 B1 | 6/2004 | Wada et al. | |
| 6,765,568 B2 | 7/2004 | Swift et al. | |
| 6,791,542 B2 | 9/2004 | Matusik et al. | |
| 6,798,406 B1 | 9/2004 | Jones et al. | |
| 6,850,252 B1 * | 2/2005 | Hoffberg | 715/716 |
| 6,853,383 B2 | 2/2005 | Duquesnois | |
| 6,919,892 B1 | 7/2005 | Cheiky et al. | |
| 6,965,379 B2 | 11/2005 | Lee et al. | |
| 6,985,187 B2 | 1/2006 | Han et al. | |
| 7,006,881 B1 * | 2/2006 | Hoffberg et al. | 700/83 |
| 7,035,451 B2 | 4/2006 | Harman et al. | |
| 7,079,075 B1 * | 7/2006 | Connor et al. | 342/357.41 |
| 7,098,910 B2 | 8/2006 | Petrovic et al. | |
| 7,102,633 B2 | 9/2006 | Kaye et al. | |
| 7,116,323 B2 | 10/2006 | Kaye et al. | |
| 7,116,324 B2 | 10/2006 | Kaye et al. | |
| 7,181,081 B2 | 2/2007 | Sandrew | |
| 7,190,496 B2 | 3/2007 | Klug et al. | |
| 7,254,264 B2 | 8/2007 | Naske | |
| 7,254,265 B2 | 8/2007 | Naske et al. | |
| 7,272,265 B2 * | 9/2007 | Kouri et al. | 382/260 |
| 7,321,374 B2 | 1/2008 | Naske | |
| 7,327,360 B2 | 2/2008 | Petrovic et al. | |
| 7,333,670 B2 | 2/2008 | Sandrew | |
| 7,573,475 B2 | 8/2009 | Sullivan et al. | |
| 7,573,489 B2 | 8/2009 | Davidson et al. | |
| 7,576,332 B2 * | 8/2009 | Britten | 250/393 |
| 7,577,312 B2 | 8/2009 | Sandrew | |
| 2002/0048395 A1 | 4/2002 | Harman et al. | |
| 2002/0063780 A1 | 5/2002 | Harman et al. | |
| 2002/0075384 A1 | 6/2002 | Harman | |
| 2004/0004616 A1 | 1/2004 | Konya et al. | |
| 2005/0104878 A1 | 5/2005 | Kaye et al. | |
| 2005/0146521 A1 | 7/2005 | Kaye | |
| 2005/0231501 A1 | 10/2005 | Nitawaki | |
| 2005/0231505 A1 | 10/2005 | Kaye et al. | |
| 2005/0280643 A1 | 12/2005 | Chen | |
| 2006/0028543 A1 | 2/2006 | Sohn et al. | |
| 2007/0279412 A1 | 12/2007 | Davidson et al. | |
| 2007/0279415 A1 | 12/2007 | Sullivan et al. | |
| 2008/0225045 A1 | 9/2008 | Birtwistle et al. | |
| 2008/0226123 A1 | 9/2008 | Birtwistle et al. | |
| 2008/0226128 A1 | 9/2008 | Birtwistle | |
| 2008/0226160 A1 | 9/2008 | Birtwistle et al. | |
| 2008/0226181 A1 | 9/2008 | Birtwistle et al. | |

| | | | |
|---|---|---|---|
| 2008/0226194 | A1 | 9/2008 | Birtwistle et al. |
| 2008/0228449 | A1 | 9/2008 | Birtwistle et al. |
| 2009/0116732 | A1 | 5/2009 | Zhou et al. |

FOREIGN PATENT DOCUMENTS

| | | |
|---|---|---|
| WO | WO 97/24000 | 7/1997 |
| WO | WO 99/12127 | 3/1999 |
| WO | WO 99/30280 | 6/1999 |
| WO | WO 00/79781 | 12/2000 |
| WO | WO 01/01348 | 1/2001 |
| WO | WO 02/13143 | 2/2002 |
| WO | WO 2006/078237 | 7/2006 |

OTHER PUBLICATIONS

Gao et al., Perceptual Motion Tracking from Image Sequences, IEEE, Jan. 2001, pp. 389-392.

Yasushi Mae, et al., "Object Tracking in Cluttered Background Based on Optical Flow and Edges," Proc. 13th Int. Conf. on Pattern Recognition, vol. 1, pp. 196-200, Apr. 1996.

Di Zhong, Shih-Fu Chang, "AMOS: An Active System for MPEG-4 Video Object Segmentation," ICIP (2) 8: 647-651, Apr. 1998.

Hua Zhong, et al., "Interactive Tracker—A Semi-automatic Video Object Tracking and Segmentation System," Microsoft Research China, http://research.microsoft.com (Aug. 26, 2003).

Eric N. Mortensen, William A. Barrett, "Interactive segmentation with Intelligent Scissors," Graphical Models and Image Processing, v.60 n. 5, p. 349-384, Sep. 2002.

Michael Gleicher, "Image Snapping," SIGGRAPH: 183-190, Jun. 1995.

Joseph Weber, et al., "Rigid Body Segmentation and Shape Description . . .," IEEE Transactions on Pattern Analysis and Machine Intelligence, vol. 19, No. 2, Feb. 1997,pp. 139-143.

E. N. Mortensen and W. A. Barrett, "Intelligent Scissors for Image Composition," Computer Graphics (SIGGRAPH '95), pp. 191-198, Los Angeles, CA, Aug. 1995.

Ohm et al., An Object-Based System for Stereopscopic Viewpoint Synthesis, IEEE transaction on Circuits and Systems for Video Technology, vol. 7, No. 5, Oct. 1997, pp. 801-811.

Izquierdo et al., Virtual 3D-View Generation from Stereoscopic Video Data, IEEE, Jan. 1998, pp. 1219-1224.

Kaufman, D., "The Big Picture", Apr. 1998, http://www.xenotech.com Apr. 1998, pp. 1-4.

Hanrahan et al., "Direct WYSIWYG painting and texturing on 3D shapes", Computer Graphics, vol. 24, Issue 4, pp. 215-223. Aug. 1990.

Grossman, "Look Ma, No Glasses", Games, Apr. 1992, pp. 12-14.

Slinker et al., "The Generation and Animation of Random Dot and Random Line Autostereograms", Journal of Imaging Science and Technology, vol. 36, No. 3, pp. 260-267, May 1992.

A. Michael Noll, Stereographic Projections by Digital Computer, Computers and Automation, vol. 14, No. 5 (May 1965), pp. 32-34.

A. Michael Noll, Computer-Generated Three-Dimensional Movies, Computers and Automation, vol. 14, No. 11 (Nov. 1965), pp. 20-23.

Selsis et al., Automatic Tracking and 3D Localization of Moving Objects by Active Contour Models, Intelligent Vehicles 95 Symposium, Sep. 1995, pp. 96-100.

Smeulders et al., Tracking Nonparameterized Object Contours in Video, IEEE Transactions on Image Processing, vol. 11, No. 9, Sep. 2002, pp. 1081-1091.

* cited by examiner

Key frame masks or individual masks are automatically copied to subsequent frames (2 through 36)

Frame numbers

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

Floating Tool Bar

Figure 9A
Figure 9B
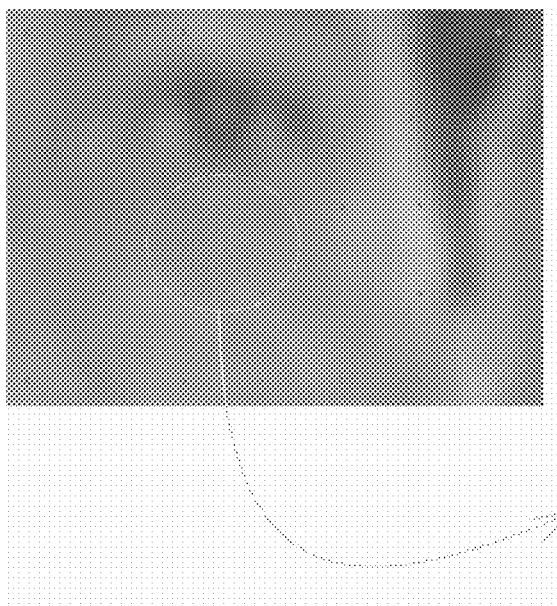
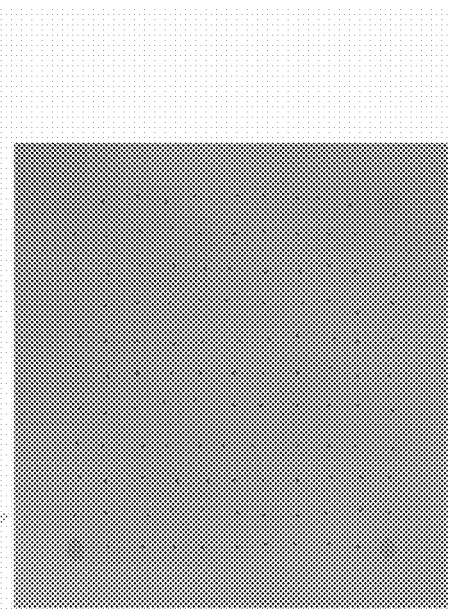

Figure 10A
Reference Image
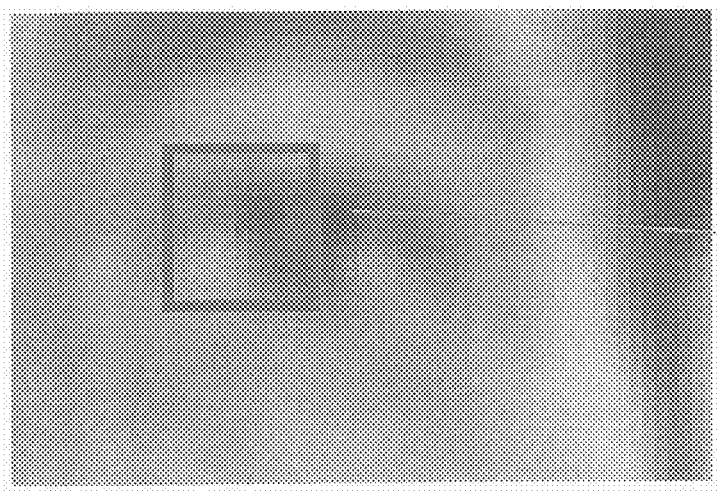
Figure 10B
Reference Box (x0, y0)
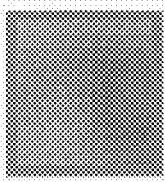
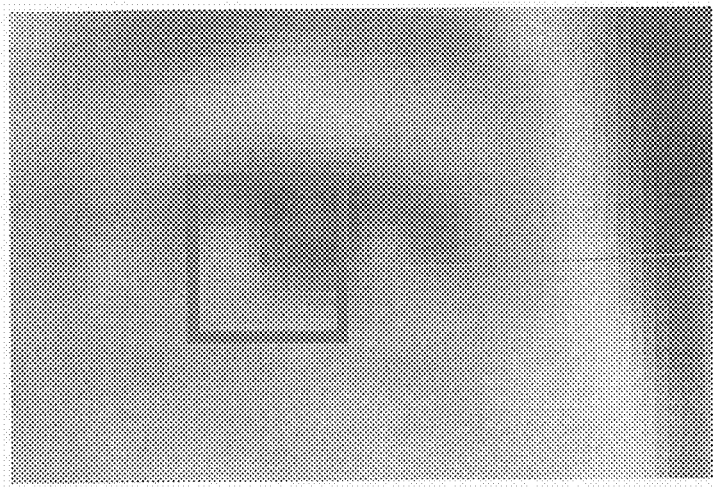
Search Box (x, y)
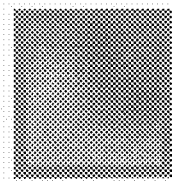
Figure 10C
Figure 10D

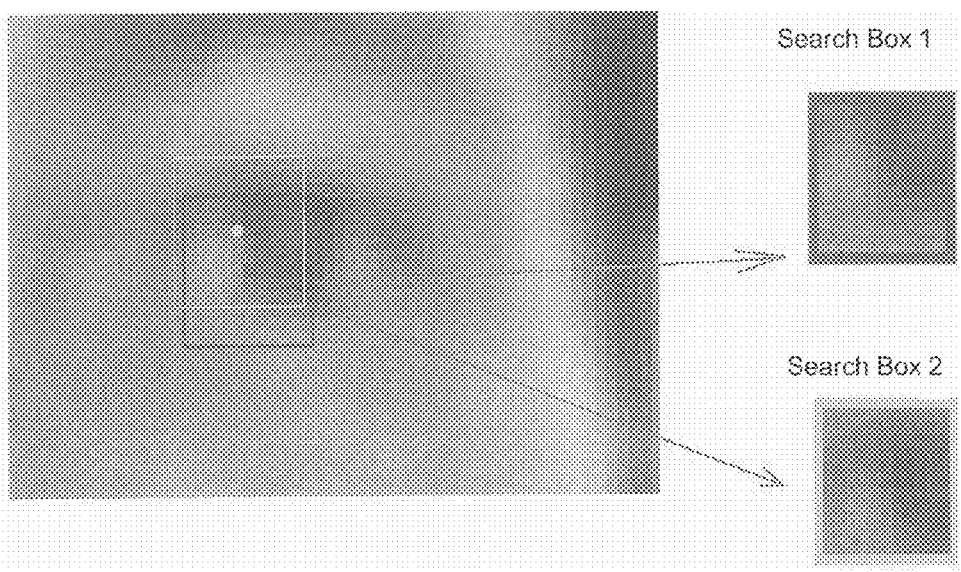
Figure 11A — Search Image Gradient Descent
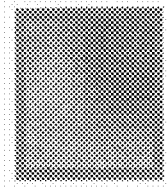
Figure 11B — Search Box 1
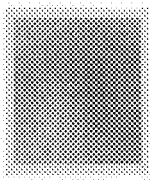
Figure 11C — Search Box 2

— 3401

2. Relative bimodal threshold tool

2.2 Apply Light/Dark shape to mask

7201

7201c

7201a

MINIMAL ARTIFACT IMAGE SEQUENCE DEPTH ENHANCEMENT SYSTEM AND METHOD

This application is a divisional of continuation in part of U.S. Utility patent application Ser. No. 12/913,614, filed 27 Oct. 2010, which is a continuation in part of U.S. Utility patent application Ser. No. 12/542,498, filed 17 Aug. 2009 now U.S. Pat. No. 7,907,793, which is a continuation in part of U.S. Utility patent application Ser. No. 12/032,969, filed 18 Feb. 2008 and issued as U.S. Pat. No. 7,577,312, which is a continuation of Ser. No. 11/324,815, now U.S. Pat. No. 7,333,670, filed 4 Jan. 2006, which is a divisional of Ser. No. 10/450,970, now U.S. Pat. No. 7,181,081, filed Jun. 18th, 2003 which is a national stage entry of Patent Cooperation Treaty Application Serial No. PCT/US02/14192, filed May 6th, 2002, which claims the benefit of U.S. Provisional Patent Application 60/288,929, filed May 4th, 2001, the specifications of which are all hereby incorporated herein by reference.

BACKGROUND OF THE INVENTION

1. Field of the Invention

One or more embodiments of the invention are related to the field of image analysis and image enhancement and computer graphics processing of two-dimensional images into three-dimensional images. More particularly, but not by way of limitation, one or more embodiments of the invention minimizes artifacts to enable an artifact-free or minimal artifact image sequence depth enhancement system and method that allows for the rapid conversion of a sequence of two-dimensional images into three-dimensional images.

2. Description of the Related Art

Known methods for the colorizing of black and white feature films involved the identification of gray scale regions within a picture followed by the application of a pre-selected color transform or lookup tables for the gray scale within each region defined by a masking operation covering the extent of each selected region and the subsequent application of said masked regions from one frame to many subsequent frames. The primary difference between U.S. Pat. No. 4,984,072, System And Method For Color Image Enhancement, and U.S. Pat. No. 3,705,762, Method For Converting Black-And-White Films To Color Films, is the manner by which the regions of interest (ROIs) are isolated and masked, how that information is transferred to subsequent frames and how that mask information is modified to conform with changes in the underlying image data. In the U.S. Pat. No. 4,984,072 system, the region is masked by an operator via a one-bit painted overlay and operator manipulated using a digital paintbrush method frame by frame to match the movement. In the U.S. Pat. No. 3,705,762 process, each region is outlined or roto-scoped by an operator using vector polygons, which are then adjusted frame by frame by the operator, to create animated masked ROIs.

In both systems the color transform lookup tables and regions selected are applied and modified manually to each frame in succession to compensate for changes in the image data which the operator detects visually. All changes and movement of the underlying luminance gray scale is subjectively detected by the operator and the masks are sequentially corrected manually by the use of an interface device such as a mouse for moving or adjusting mask shapes to compensate for the detected movement. In all cases the underlying gray scale is a passive recipient of the mask containing pre-selected color transforms with all modifications of the mask under operator detection and modification. In these prior inventions the mask information does not contain any information specific to the underlying luminance gray scale and therefore no automatic position and shape correction of the mask to correspond with image feature displacement and distortion from one frame to another is possible.

Existing systems that are utilized to convert two-dimensional images to three-dimensional images may also require the creation of wire frame models for objects in images. The creation of wire frame models is a large undertaking in terms of labor. These systems also do not utilize the underlying luminance gray scale of objects in the images to automatically position and correct the shape of the masks of the objects to correspond with image feature displacement and distortion from one frame to another. Hence, great amounts of labor are required to manually shape and reshape masks for applying depth or Z-dimension data to the objects. Motion objects that move from frame to frame thus require a great deal of human intervention. In addition, there are no known solutions for enhancing two-dimensional images into three-dimensional images that utilize composite backgrounds of multiple images in a frame for spreading depth information to background and masked objects. This includes data from background objects whether or not pre-existing or generated for an occluded area where missing data exists, i.e., where motion objects never uncover the background. Hence there is a need for an artifact free image sequence depth enhancement system and method.

BRIEF SUMMARY OF THE INVENTION

Embodiments of the invention classify scenes or two or more images to be colorized and/or converted from two-dimensional to three-dimensional into movies into two separate categories; either background elements (i.e. sets and foreground elements that are stationary) or motion elements (e.g., actors, automobiles, etc.) that move throughout the scene. These background elements and motion elements are treated separately in embodiments of the invention similar to the manner in which traditional animation is produced.

Motion Elements: The motion elements are displayed as a series of sequential tiled frame sets or thumbnail images complete with background elements. The motion elements are masked in a key frame using a multitude of operator interface tools common to paint systems as well as unique tools such as relative bimodal thresholding in which masks are applied selectively to contiguous light or dark areas bifurcated by a cursor brush. After the key frame is fully designed and masked, the mask information from the key frame is then applied to all frames in the display-using mask fitting techniques that include:

1. Automatic mask fitting using Fast Fourier Transform and Gradient Decent Calculations based on luminance and pattern matching which references the same masked area of the key frame followed by all prior subsequent frames in succession.
2. Bezier curve animation with edge detection as an automatic animation guide
3. Polygon animation with edge detection as an automatic animation guide In another embodiment of this invention, these background elements and motion elements are combined separately into single frame representations of multiple frames, as tiled frame sets or as a single frame composite of all elements (i.e., including both motion and backgrounds/foregrounds) that then becomes a visual reference database for the computer controlled application of masks within a sequence composed of a multiplicity of frames. Each pixel address within the reference visual database corresponds to mask/lookup table address within the digital frame and X, Y, Z location of subsequent "raw" frames that were used to create the reference visual database. Masks are applied to subsequent frames based on various differentiating image processing methods such as edge detection combined with pattern recognition and other sub-mask analysis, aided by operator segmented regions of interest from reference objects or frames, and operator directed detection of subsequent regions corresponding to the original region of interest. In this manner, the gray scale actively determines the location and shape of each mask (and corresponding color lookup from frame to frame for colorization projects or depth information for two-dimensional to three-dimensional conversion projects) that is applied in a keying fashion within predetermined and operator controlled regions of interest.

Camera Pan Background and Static Foreground Elements: Stationary foreground and background elements in a plurality of sequential images comprising a camera pan are combined and fitted together using a series of phase correlation, image fitting and focal length estimation techniques to create a composite single frame that represents the series of images used in its construction. During the process of this construction the motion elements are removed through operator adjusted global placement of overlapping sequential frames.

For colorization projects, the single background image representing the series of camera pan images is color designed using multiple color transform look up tables limited only by the number of pixels in the display. This allows the designer to include as much detail as desired including air brushing of mask information and other mask application techniques that provide maximum creative expression. For depth conversion projects, (i.e., two-dimensional to three-dimensional movie conversion for example), the single background image representing the series of camera pan images is utilized to set depths of the various items in the background. Once the background color/depth design is completed the mask information is transferred automatically to all the frames that were used to create the single composited image. In this manner, color or depth is performed once per multiple images and/or scene instead of once per frame, with color/depth information automatically spread to individual frames via embodiments of the invention. Masks from colorization projects may be combined or grouped for depth conversion projects since the colorization masks may contain more sub-areas than a depth conversion mask. For example, for a coloration project, a person's face may have several masks applied to areas such as lips, eyes, hair, while a depth conversion project may only require an outline of the person's head or an outline of a person's nose that is to have depth applied.

In one or more embodiments of the invention, image offset information relative to each frame is registered in a text file during the creation of the single composite image representing the pan and used to apply the single composite mask to all the frames used to create the composite image.

Since the foreground moving elements have been masked separately prior to the application of the background mask, the background mask information is applied wherever there is no pre-existing mask information.

Static Camera Scenes With and Without Film Weave, Minor Camera Following and Camera Drift: In scenes where there is minor camera movement or film weave resulting from the sprocket transfer from 35 mm or 16 mm film to digital format, the motion objects are first fully masked using the techniques listed above. All frames in the scene are then processed automatically to create a single image that represents both the static foreground elements and background elements, eliminating all masked moving objects where they both occlude and expose the background.

Where ever the masked moving object exposes the background or foreground the instance of background and foreground previously occluded is copied into the single image with priority and proper offsets to compensate for camera movement. The offset information is included in a text file associated with each single representation of the background so that the resulting mask information can be applied to each frame in the scene with proper mask offsets.

The single background image representing the series of static camera frames is color designed using multiple color transform look up tables limited only by the number of pixels in the display. Where the motion elements occlude the background elements continuously within the series of sequential frames they are seen as black figure that are ignored and masked over. The black objects are ignored in colorization-only projects during the masking operation because the resulting background mask is later applied to all frames used to create the single representation of the background only where there is no pre-existing mask. If background information is created for areas that are never exposed, then this data is treated as any other background data that is spread through a series of images based on the composite background. This allows for minimization of artifacts or artifact-free two-dimensional to three-dimensional conversion since there is never any need to stretch objects or extend pixels as for missing data, since image data that has been generated to be believable to the human observer is generated for and then taken from the occluded areas when needed during the depth conversion process. This allows the designer to include as much detail as desired including air brushing of mask information and other mask application techniques that provide maximum creative expression. Once the background color design is completed the mask information is transferred automatically to all the frames that were used to create the single composited image. For depth projects, the distance from the camera to each item in the composite frame is automatically transferred to all the frames that were used to create the single composited image. By shifting masked background objects horizontally more or less, their perceived depth is thus set in a secondary viewpoint frame that corresponds to each frame in the scene. This horizontal shifting may utilize data generated by an artist for the occluded or alternatively, areas where no image data exists yet for a second viewpoint may be marked in one or more embodiments of the invention using a user defined color that allows for the creation missing data to ensure that no artifacts occur during the two-dimension to three-dimension conversion process. Any technique known may be utilized in embodiments of the invention to cover areas in the background where unknown data exists, i.e., (as displayed in some color that shows where the missing data exists) that may not be borrowed from another scene/frame for example by having artists create complete backgrounds or smaller occluded areas with artist drawn objects. After assigning depths to objects in the composite background, a second viewpoint image may be created for each image in a scene in order to produce a stereoscopic view of the movie, for example a left eye view where the original frames in the scene are assigned to the right eye viewpoint, for example by translating foreground objects horizontally for the second viewpoint, or alternatively by translating foreground objects horizontally left and right to create two viewpoints offset from the original viewpoint.

BRIEF DESCRIPTION OF THE DRAWINGS

FIG. 9A shows a picture of a face.

FIG. 9B shows a close up of the face in FIG. 9A wherein the "small dark" pixels shown in FIG. 9B are used to calculate a weighed index using bilinear interpolation.

FIGS. 10A-D show searching for a Best Fit on the Error Surface: An error surface calculation in the Gradient Descent Search method involves calculating mean squared differences of pixels in the square fit box centered on reference image pixel (x0, y0), between the reference image frame and the corresponding (offset) location (x, y) on the search image frame.

FIGS. 11A-C show a second search box derived from a descent down the error surface gradient (evaluated separately), for which the evaluated error function is reduced, possibly minimized, with respect to the original reference box (evident from visual comparison of the boxes with the reference box in FIGS. 10A, B, C and D.).

As shown in FIG. 23, the character can is removed from the scene, but can still be seen in the right side of the background mosaic.

As shown in FIG. 24, the character can be removed from the scene, but can still be seen the left side of the background mosaic. In the second pass blend as shown in FIG. 24, the moving character is shown on the left.

As shown in FIG. 25, the final blended background with moving character is removed.

DETAILED DESCRIPTION OF THE INVENTION

Figure 1:
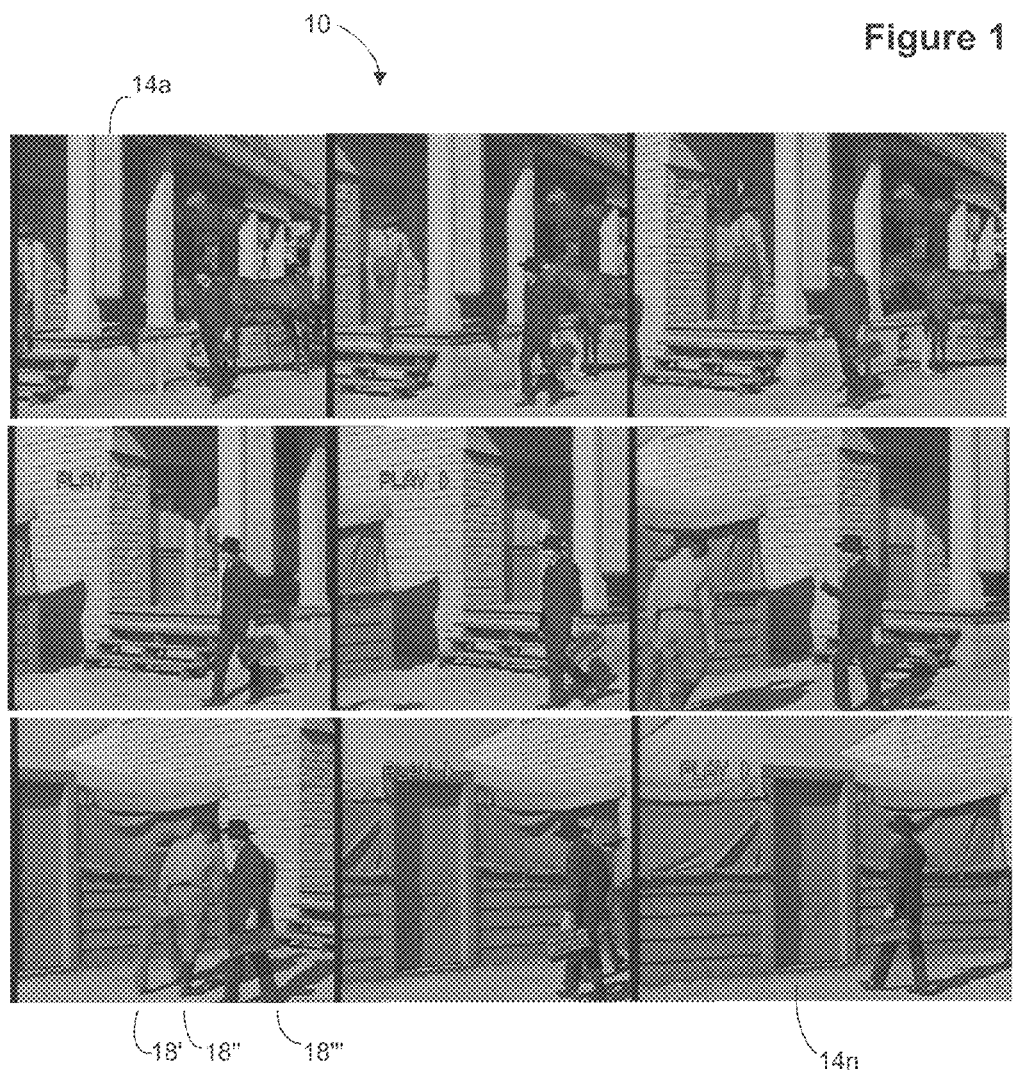
FIG. 1 shows a plurality of feature film or television film frames representing a scene or cut in which there is a single instance or perceptive of a background.

Feature Film and TV series Data Preparation for Colorization/Depth enhancement: Feature films are tele-cined or transferred from 35 mm or 16 mm film using a high resolution scanner such as a 10-bit SPIRIT DATACINE® or similar device to HDTV (1920 by 1080 24P) or data-cined on a laser film scanner such as that manufactured by IMAGICA® Corp. of America at a larger format 2000 lines to 4000 lines and up to 16 bits of grayscale. The high resolution frame files are then converted to standard digital files such as uncompressed TIP files or uncompressed TGA files typically in 16 bit three-channel linear format or 8 bit three channel linear format. If the source data is HDTV, the 10-bit HDTV frame files are converted to similar TIF or TGA uncompressed files at either 16-bits or 8-bit per channel. Each frame pixel is then averaged such that the three channels are merged to create a single 16 bit channel or 8 bit channel respectively. Any other scanning technologies capable of scanning an existing film to digital format may be utilized. Currently, many movies are generated entirely in digital format, and thus may be utilized without scanning the movie.

Digitization Telecine and Format Independence Monochrome elements of either 35 or 16 mm negative or positive film are digitized at various resolutions and bit depth within a high resolution film scanner such as that performed with a SPIRIT DATACINE® by PHILIPS® and EASTMAN KODAK® which transfers either 525 or 625 formats, HDTV, (HDTV) 1280×720/60 Hz progressive, 2K, DTV (ATSC) formats like 1920×1080/24 Hz/25 Hz progressive and 1920× 1080/48 Hz/50 Hz segmented frame or 1920×1080 501 as examples. The invention provides improved methods for editing film into motion pictures. Visual images are transferred from developed motion picture film to a high definition video storage medium, which is a storage medium adapted to store images and to display images in conjunction with display equipment having a scan density substantially greater than that of an NTSC compatible video storage medium and associated display equipment. The visual images are also transferred, either from the motion picture film or the high definition video storage medium to a digital data storage format adapted for use with digital nonlinear motion picture editing equipment. After the visual images have been transferred to the high definition video storage medium, the digital nonlinear motion picture editing equipment is used to generate an edit decision list, to which the motion picture film is then conformed. The high definition video storage medium is generally adapted to store and display visual images having a scan density of at least 1080 horizontal lines. Electronic or optical transformation may be utilized to allow use of visual aspect ratios that make full use of the storage formats used in the method. This digitized film data as well as data already transferred from film to one of a multiplicity of formats such as HDTV are entered into a conversion system such as the HDTV STILL STORE 0 manufactured by AVICA® Technology Corporation. Such large scale digital buffers and data converters are capable of converting digital image to all standard formats such as 1080i HDTV formats such as 720p, and 1080p/24. An Asset Management System server provides powerful local and server back ups and archiving to standard SCSI devices, C2-level security, streamlined menu selection and multiple criteria data base searches.

During the process of digitizing images from motion picture film the mechanical positioning of the film frame in the telecine machine suffers from an imprecision known as "film weave", which cannot be fully eliminated. However various film registration and ironing or flattening gate assemblies are available such as that embodied in U.S. Pat. No. 5,328,073, Film Registration and Ironing Gate Assembly, which involves the use of a gate with a positioning location or aperture for focal positioning of an image frame of a strip film with edge perforations. Undersized first and second pins enter a pair of transversely aligned perforations of the film to register the image frame with the aperture. An undersized third pin enters a third perforation spaced along the film from the second pin and then pulls the film obliquely to a reference line extending between the first and second pins to nest against the first and second pins the perforations thereat and register the image frame precisely at the positioning location or aperture. A pair of flexible bands extending along the film edges adjacent the positioning location moves progressively into incrementally increasing contact with the film to iron it and clamp its perforations against the gate. The pins register the image frame precisely with the positioning location, and the bands maintain the image frame in precise focal position. Positioning can be further enhanced following the precision mechanical capture of images by methods such as that embodied in U.S. Pat. No. 4,903,131, Method For The Automatic Correction Of Errors In Image Registration During Film Scanning.

To remove or reduce the random structure known as grain within exposed feature film that is superimposed on the image as well as scratches or particles of dust or other debris which obscure the transmitted light various algorithms will be used such as that embodied in U.S. Pat. No. 6,067,125 Structure And Method For Film Grain Noise Reduction and U.S. Pat. No. 5,784,176, Method Of Image Noise Reduction Processing.

Reverse Editing of the Film Element preliminary to visual database creation:

The digital movie is broken down into scenes and cuts. The entire movie is then processed sequentially for the automatic detection of scene changes including dissolves, wipe-a-ways and cuts. These transitions are further broken down into camera pans, camera zooms and static scenes representing little or no movement. All database references to the above are entered into an edit decision list (EDT) within the database based on standard SMPTE time code or other suitable sequential naming convention. There exists, a great deal of technologies for detecting dramatic as well as subtle transitions in film content such as:

U.S. Ser. No. 05/959,697 Sep. 28, 1999 Method And System For Detecting Dissolve Transitions In A Video Signal U.S. Ser. No. 05/920,360 Jul. 6, 1999 Method And System For Detecting Fade Transitions In A Video Signal U.S. Ser. No. 05/841,512 Nov. 24, 1998 Methods Of Previewing And Editing Motion Pictures U.S. Ser. No. 05/835,163 Nov. 10, 1998 Apparatus For Detecting A Cut In A Video U.S. Pat. No. 5,767,923 Jun. 16, 1998 Method And System For Detecting Cuts In A Video Signal U.S. Pat. No. 5,778,108 Jul. 6, 1996 Method And System For Detecting Transitional Markers Such As Uniform Fields In A Video Signal U.S. Pat. No. 5,920,360 Jun. 7, 1999 Method And System For Detecting Fade Transitions In A Video Signal All cuts that represent the same content such as in a dialog between two or more people where the camera appears to volley between the two talking heads are combined into one file entry for later batch processing.

An operator checks all database entries visually to ensure that:

1. Scenes are broken down into camera moves
2. Cuts are consolidated into single batch elements where appropriate
3. Motion is broken down into simple and complex depending on occlusion elements, number of moving objects and quality of the optics (e.g., softness of the elements, etc).

Pre-Production—scene analysis and scene breakdown for reference frame ID and data base creation:

Files are numbered using sequential SMPTE time code or other sequential naming convention. The image files are edited together at 24-frame/sec speed (without field related 3/2 pull down which is used in standard NTSC 30 frame/sec video) onto a DVD using ADOBE® AFTER EFFECTS® or similar programs to create a running video with audio of the feature film or TV series. This is used to assist with scene analysis and scene breakdown.

Scene and Cut Breakdown:

1. A database permits the entering of scene, cut, design, key frame and other critical data in time code format as well as descriptive information for each scene and cut.
2. Each scene cut is identified relative to camera technique. Time codes for pans, zooms, static backgrounds, static backgrounds with unsteady or drifting camera and unusual camera cuts that require special attention.
3. Designers and assistant designers study the feature film for color clues and color references or for the case of depth projects, the film is studied for depth clues, generally for non-standard sized objects. Research is provided for color/depth accuracy where applicable. The Internet for example may be utilized to determine the color of a particular item or the size of a particular item. For depth projects, knowing the size of an object allows for the calculation of the depth of an item in a scene for example.
4. Single frames from each scene are selected to serve as design frames. These frames are color designed or depth assignments (see FIGS. 42-70) are made to objects in the frames to represent the overall look and feel of the feature film. Approximately 80 to 100 design frames are typical for a feature film.
5. In addition, single frames called key frames from each cut of the feature film are selected that contain all the elements within each cut that require color/depth consideration. There may be as many as 1,000 key frames. These frames will contain all the color/depth transform information necessary to apply color/depth to all sequential frames in each cut without additional color choices.

Color/Depth Selection:

Historical reference, studio archives and film analysis provides the designer with color references. Using an input device such as a mouse, the designer masks features in a selected single frame containing a plurality of pixels and assigns color to them using an HSL color space model based on creative considerations and the grayscale and luminance distribution underlying each mask. One or more base colors are selected for image data under each mask and applied to the particular luminance pattern attributes of the selected image feature. Each color selected is applied to an entire masked object or to the designated features within the luminance pattern of the object based on the unique gray-scale values of the feature under the mask.

A lookup table or color transform for the unique luminance pattern of the object or feature is thus created which represent the color to luminance values applied to the object. Since the color applied to the feature extends the entire range of potential grayscale values from dark to light the designer can insure that as the distribution of the gray-scale values representing the pattern change homogeneously into dark or light regions within subsequent frames of the movie such as with the introduction of shadows or bright light, the color for each feature also remains consistently homogeneous and correctly lighten or darken with the pattern upon which it is applied.

Depth can be assigned to objects and adjusted using embodiments of the invention using an input device such as a mouse to assign objects particular depths including contour depths, e.g., geometric shapes such as an ellipsoid to a face for example. This allows objects to appear natural when converted to three-dimensional stereoscopic images. Assigning a fixed distance to foreground objects tends to make the objects appear as cut-outs, i.e., flat. See also FIGS. 42-70.

Propagation of Mask Color Transform/Depth Information from One Frame to a Series of Subsequent Frames:

The masks representing designed selected color transforms/depth contours in the single design frame are then copied to all subsequent frames in the series of movie frames by one or more methods such as auto-fitting bezier curves to edges, automatic mask fitting based on Fast Fourier Transforms and Gradient Descent Calculation tied to luminance patterns in a subsequent frame relative to the design frame or a successive preceding frames, mask paint to a plurality of successive frames by painting the object within only one frame, auto-fitting vector points to edges and copying and pasting individual masks or a plurality of masks to selected subsequent frames. In addition, depth information may be "tweened" to account for forward/backward motion or zooming with respect to the camera capture location.

Single Frame Set Design and Colorization:

In embodiments of the invention, camera moves are consolidated and separated from motion elements in each scene by the creation of a montage or composite image of the background from a series of successive frames into a single frame containing all background elements for each scene and cut. The resulting single frame becomes a representation of the entire common background of a multiplicity of frames in a movie, creating a visual database of all elements and camera offset information within those frames.

In this manner most set backgrounds can be designed and colorized/depth enhanced in one pass using a single frame montage. Each montage is masked without regard to the foreground moving objects, which are masked separately. The background masks of the montage are then automatically extracted from the single background montage image and applied to the subsequent frames that were used to create the single montage using all the offsets stored in the image data for correctly aligning the masks to each subsequent frame.

There is a basic formula in filmmaking that varies little within and between feature films (except for those films employing extensive hand-held or StediCam shots.) Scenes are composed of cuts, which are blocked for standard camera moves, i.e., pans, zooms and static or locked camera angles as well as combinations of these moves. Cuts are either single occurrences or a combination of cut-a-ways where there is a return to a particular camera shot such as in a dialog between two individuals. Such cut-a-ways can be considered a single scene sequence or single cut and can be consolidate in one image-processing pass.

Pans can be consolidated within a single frame visual database using special panorama stitching techniques but without lens compensation. Each frame in a pan involves:

1. The loss of some information on one side, top and/or bottom of the frame
2. Common information in the majority of the frame relative to the immediately preceding and subsequent frames and
3. New information on the other side, top and/or bottom of the frame.

By stitching these frames together based on common elements within successive frames and thereby creating a panorama of the background elements a visual database is created with all pixel offsets available for referencing in the application of a single mask overlay to the complete set of sequential frames.

Creation of a Visual Database:

Since each pixel within a single frame visual database of a background corresponds to an appropriate address within the respective "raw" (unconsolidated) frame from which it was created, any designer determined masking operation and corresponding masking lookup table designation applied to the visual database will be correctly applied to each pixel's appropriate address within the raw film frames that were used to create the single frame composite.

In this manner, sets for each scene and cut are each represented by a single frame (the visual database) in which pixels have either single or multiple representations within the series of raw frames from which they were derived. All masking within a single visual database frame will create a one bit mask per region representation of an appropriate lookup table that corresponds to either common or unique pixel addresses within the sequential frames that created the single composite frame. These address-defined masking pixels are applied to the full resolution frames where total masking is automatically checked and adjusted where necessary using feature, edge detection and pattern recognition routines. Where adjustments are required, i.e., where applied masked region edges do not correspond to the majority of feature edges within the gray scale image, a "red flag" exception comment signals the operator that frame-by-frame adjustments may be necessary.

Single Frame Representation of Motion within Multiple Frames:

The differencing algorithm used for detecting motion objects will generally be able to differentiate dramatic pixel region changes that represent moving objects from frame to frame. In cases where cast shadows on a background from a moving object may be confused with the moving object the resulting masks will be assigned to a default alpha layer that renders that part of the moving object mask transparent. In some cases an operator using one or more vector or paint tools will designate the demarcation between the moving object and cast shadow. In most cases however, the cast shadows will be detected as an extraneous feature relative to the two key motion objects. In this invention cast shadows are handled by the background lookup table which automatically adjusts color along a luminance scale determined by the spectrum of light and dark gray scale values in the image.

Action within each frame is isolated via differencing or frame-to-frame subtraction techniques that include vector (both directional and speed) differencing (i.e., where action occurs within a pan) as well as machine vision techniques, which model objects and their behaviors. Difference pixels are then composited as a single frame (or isolated in a tiling mode) representing a multiplicity of frames thus permitting the operator to window regions of interest and otherwise direct image processing operations for computer controlled subsequent frame masking.

As with the set or background montage discussed above, action taking place in multiple frames within a scene can be represented by a single frame visual database in which each unique pixel location undergoes appropriate one bit masking from which corresponding lookup tables are applied. However, unlike the set or background montage in which all color/depth is applied and designated within the single frame pass, the purpose of creating an action composite visual data base is to window or otherwise designate each feature or region of interest that will receive a particular mask and apply region of interest vectors from one key frame element to subsequent key frame elements thus provide operator assistance to the computer processing that will track each region of interest.

During the design phase, masks are applied to designer designated regions of interest for a single instance of a motion object appearing within the background (i.e., a single frame of action appears within the background or stitched composited background in the proper x, y coordinates within the background corresponding to the single frame of action from which it was derived). Using an input device such as a mouse the operator uses the following tools in creating the regions of interest for masking.

1. A combination of edge detection algorithms such as standard Laplacian filters and pattern recognition routines 2. Automatic or assisted closing of a regions 3. Automatic seed fill of selected regions 4. Bimodal luminance detection for light or dark regions 5. An operator-assisted sliding scale and other tools create a "best fit" distribution index corresponding to the dynamic range of the underlying pixels as well as the underlying luminance values, pattern and weighted variables 6. Subsequent analysis of underlying gray scale, luminance, area, pattern and multiple weighting characteristics relative to immediately surrounding areas creating a unique determination/discrimination set called a Detector File.

In the pre-production key frame phase—The composited single, design motion database described above is presented along with all subsequent motion inclusive of selected key frame motion objects. All motion composites can be toggled on and off within the background or viewed in motion within the background by turning each successive motion composite on and off sequentially.

Key Frame Motion Object Creation: The operator windows all masked regions of interest on the design frame in succession and directs the computer by various pointing instruments and routines to the corresponding location (regions of interest) on selected key frame motion objects within the visual database thereby reducing the area on which the computer must operate (i.e., the operator creates a vector from the design frame moving object to each subsequent key frame moving object following a close approximation to the center of the region of interest represented within the visual database of the key frame moving object. This operator assisted method restricts the required detection operations that must be performed by the computer in applying masks to the corresponding regions of interest in the raw frames).

In the production phase—The composited key frame motion object database described above is presented along with all subsequent motion inclusive of fully masked selected key frame motion objects. As above, all motion composites can be toggled on and off within the background or sequentially turned on and off in succession within the background to simulate actual motion. In addition, all masked regions (regions of interest) can be presented in the absence of their corresponding motion objects. In such cases the one-bit color masks are displayed as either translucent or opaque arbitrary colors.

During the production process and under operator visual control, each region of interest within subsequent motion object frames, between two key motion object frames undergoes a computer masking operation. The masking operation involves a comparison of the masks in a preceding motion object frame with the new or subsequent Detector File operation and underlying parameters (i.e., mask dimensions, gray scale values and multiple weighting factors that lie within the vector of parameters in the subsequent key frame motion object) in the successive frame. This process is aided by the windowing or pointing (using various pointing instruments) and vector application within the visual database. If the values within an operator assisted detected region of the subsequent motion object falls within the range of the corresponding region of the preceding motion object, relative to the surrounding values and if those values fall along a trajectory of values (vectors) anticipated by a comparison of the first key frame and the second key frame then the computer will determine a match and will attempt a best fit.

The uncompressed, high resolution images all reside at the server level, all subsequent masking operations on the regions of interest are displayed on the compressed composited frame in display memory or on a tiled, compressed frame in display memory so that the operator can determine correct tracking and matching of regions. A zoomed region of interest window showing the uncompressed region is displayed on the screen to determine visually the region of interest best fit. This high-resolution window is also capable of full motion viewing so that the operator can determine whether the masking operation is accurate in motion.

Figure 3:
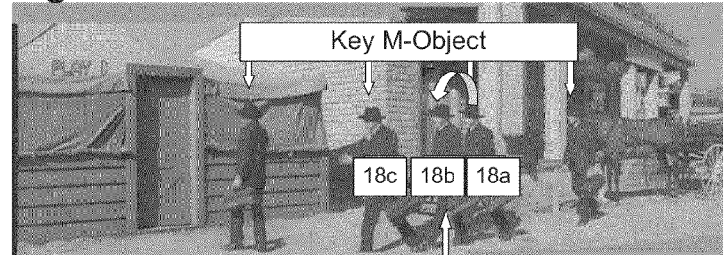
FIG. 3 shows a representative sample of each motion object (M-Object) in the scene receives a mask overlay that represents designer selected color lookup tables in which dynamic pixel colors automatically compensate or adjust for moving shadows and other changes in luminance as the M-Object moves within the scene.

In a first embodiment as shown in FIG. 1, a plurality of feature film or television film frames 14 a-n representing a scene or cut in which there is a single instance or perceptive of a background 12 (FIG. 3). In the scene 10 shown, several actors or motion elements 18', 18" and 18''' are moving within an outdoor stage and the camera is performing a pan left. FIG. 1 shows selected samples of the 120 total frames 14 making up the 5-second pan.

Figure 2:
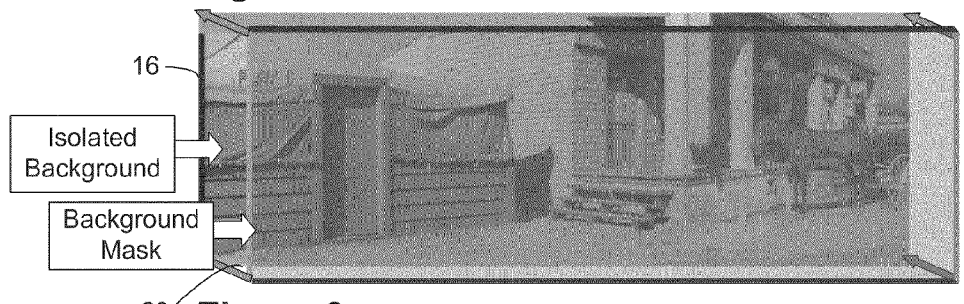
FIG. 2 shows an isolated background processed scene from the plurality of frames shown in FIG. 1 in which all motion elements are removed using various subtraction and differencing techniques. The single background image is then used to create a background mask overlay representing designer selected color lookup tables in which dynamic pixel colors automatically compensate or adjust for moving shadows and other changes in luminance.

In FIG. 2, an isolated background 16 processed scene from the plurality of frames 14*a-n* represented in FIG. 1 in which all motion elements 18 are removed using various subtraction and differencing techniques. The separate frames that created the pan are combined into a visual database in which unique and common pixels from each of the 120 frames 14 composing the original pan are represented in the single composite background image 12 shown in FIG. 3. The single background image 12 is then used to create a background mask overlay 20 representing designer selected color lookup tables in which dynamic pixel colors automatically compensate or adjust for moving shadows and other changes in luminance. For depth projects, any object in the background may be assigned any depth. A variety of tools may be utilized to perform the assignment of depth information to any portion of the background including paint tools, geometric icon based tools that allow setting a contour depth to an object, or text field inputs to allow for numeric inputs. The composite background shown in FIG. 2 for example may also have a ramp function assigned to allow for a nearer depth to be assigned to the left portion of the scene and a linear increase in depth to the right of the image to be automatically assigned. See also FIGS. 42-70.

In one illustrative embodiment of this invention, operator assisted and automated operations are used to detect obvious anchor points represented by clear edge detected intersects and other contiguous edges n each frame 14 making up the single composite image 12 and over laid mask 20. These anchor points are also represented within the composite image 12 and are used to aide in the correct assignment of the mark to each frame 14 represented by the single composite image 12.

Anchor points and objects and/or areas that are clearly defined by closed or nearly closed edges are designed as a single mask area and given a single lookup table. Within those clearly delineated regions polygons are created of which anchor points are dominant points. Where there is no clear edge detected to create a perfectly closed region, polygons are generated using the edge of the applied mask.

The resulting polygon mesh includes the interior of anchor point dominant regions plus all exterior areas between those regions.

Pattern parameters created by the distribution of luminance within each polygon are registered in a database for reference when corresponding polygonal addresses of the overlying masks are applied to the appropriate addresses of the frames which were used to create the composite single image 12.

In FIG. 3, a representative sample of each motion object (M-Object) 18 in the scene 10 receives a mask overlay that represents designer selected color lookup tables/depth assignments in which dynamic pixel colors automatically compensate or adjust for moving shadows and other changes in luminance as the M-Object 18 moves within the scene 10. The representative sample are each considered Key M-Objects 18 that are used to define the underlying patterns, edges, grouped luminance characteristics, etc., within the masked M-Object 18. These characteristics are used to translate the design masks from one Key M-Object 18*a* to subsequent M-Objects 18*b* along a defined vector of parameters leading to Key M-Object 18*c*, each Subsequent M-Object becoming the new Key M-Object in succession as masks are applied. As shown, Key M-Object 18*a* may be assigned a depth of 32 feet from the camera capture point while Key M-Object 18*c* may be assigned a depth of 28 feet from the camera capture point. The various depths of the object may be "tweened" between the various depth points to allow for realistic three-dimensional motion to occur within the cut without for example requiring wire frame models of all of the objects in the objects in a frame.

As with the background operations above, operator assisted and automated operations are used to detect obvious anchor points represented by clear edge detected intersects and other contiguous edges in each motion object used to create a keyframe.

Anchor points and specific regions of interest within each motion object that are clearly defined by closed or nearly closed edges are designated as a single mask area and given a single lookup table. Within those clearly delineated regions, polygons are created of which anchor points are dominant points. Where there is no clear edge detected to create a perfectly closed region, polygons are generated using the edge of the applied mask.

The resulting polygon mesh includes the interior of the anchor point dominant regions plus all exterior areas between those regions.

Pattern parameters created by the distribution of luminance values within each polygon are registered in a database for reference when corresponding polygonal addresses of the overlying masks are applied to the appropriate addresses of the frames which were used to create the composite single frame 12.

The greater the polygon sampling the more detailed the assessment of the underlying luminance values and the more precise the fit of the overlying mask.

Subsequent or in-between motion key frame objects 18 are processed sequentially. The group of masks comprising the motion key frame object remains in its correct address location in the subsequent frame 14 or in the subsequent instance of the next motion object 18. The mask is shown as an opaque or transparent color. An operator indicates each mask in succession with a mouse or other pointing device and along with its corresponding location in the subsequent frame and/or instance of the motion object. The computer then uses the prior anchor point and corresponding polygons representing both underlying luminance texture and mask edges to create a best fit to the subsequent instance of the motion object.

The next instance of the motion object 18 is operated upon in the same manner until all motion objects 18 in a cut 10 and/or scene are completed between key motion objects.

Figure 4:
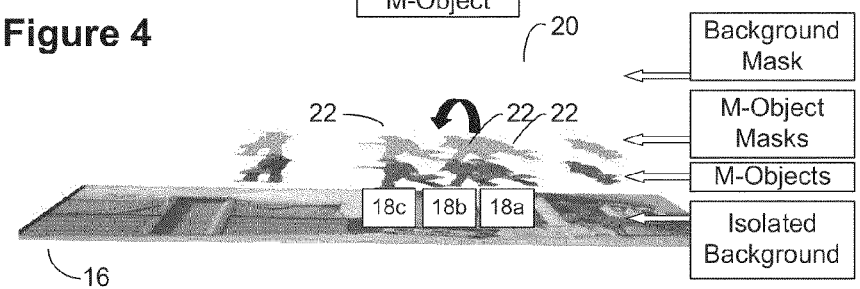
FIG. 4 shows all mask elements of the scene are then rendered to create a fully colored frame in which M-Object masks are applied to each appropriate frame in the scene followed by the background mask, which is applied only where there is no pre-existing mask in a Boolean manner.

In FIG. 4, all mask elements of the scene 10 are then rendered to create a fully colored and/or depth enhanced frame in which M-Object 18 masks are applied to each appropriate frame in the scene followed by the background mask 20, which is applied only where there is no pre-existing mask in a Boolean manner. Foreground elements are then applied to each frame 14 according to a pre-programmed priority set. Aiding the accurate application of background masks 20 are vector points which are applied by the designer to the visual database at the time of masking where there are well defined points of reference such as edges and/or distinct luminance points. These vectors create a matrix of reference points assuring accuracy of rendering masks to the separate frames that compose each scene. The applied depths of the various objects determine the amount of horizontal translation applied when generating left and right viewpoints as utilized in three-dimensional viewing as one skilled in the art will appreciate. In one or more embodiments of the invention, the desired objects may be dynamically displayed while shifting by an operator set and observe a realistic depth. In other embodiments of the invention, the depth value of an object determines the horizontal shift applied as one skilled in the art will recognize and which is taught in at least U.S. Pat. No. 6,031,564, to Ma et al., the specification of which is hereby incorporated herein by reference.

The operator employs several tools to apply masks to successive movie frames.

Display: A key frame that includes all motion objects for that frame is fully masked and loaded into the display buffer along with a plurality of subsequent frames in thumbnail format; typically 2 seconds or 48 frames.

Figure 5A:
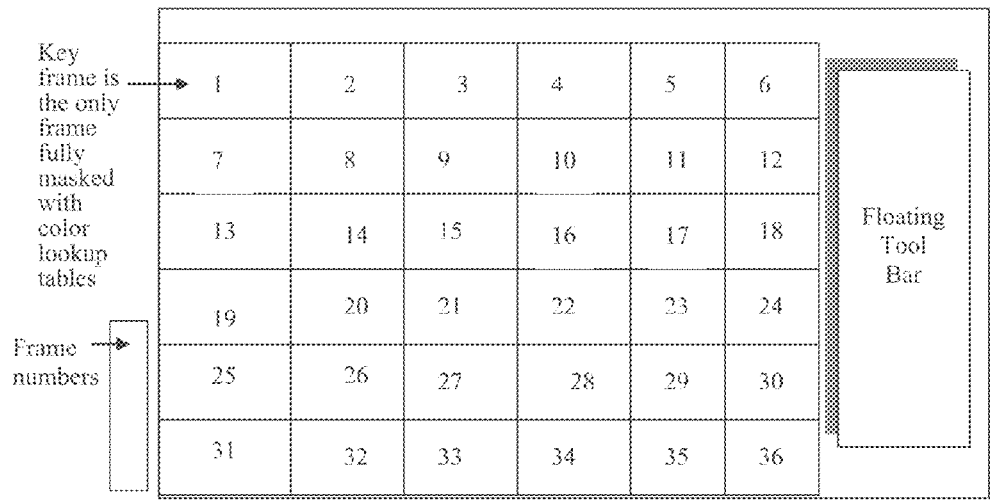
FIGS. 5A and 5B show a series of sequential frames loaded into display memory in which one frame is fully masked with the background (key frame) and ready for mask propagation to the subsequent frames via automatic mask fitting methods.
Figure 5B:

FIGS. 5A and 5B show a series of sequential frames 14*a*-*n* loaded into display memory in which one frame 14 is fully masked with the background (key frame) and ready for mask propagation to the subsequent frames 14 via automatic mask fitting methods.

All frames 14 along with associated masks and/or applied color transforms/depth enhancements can also be displayed sequentially in real-time (24 frames/sec) using a second (child) window to determine if the automatic masking operations are working correctly. In the case of depth projects, stereoscopic glasses or red/blue anaglyph glasses may be utilized to view both viewpoints corresponding to each eye. Any type of depth viewing technology may be utilized to view depth enhanced images including video displays that require no stereoscopic glasses yet which utilizes more than two image pairs which may be created utilizing embodiments of the invention.

Figure 6A:
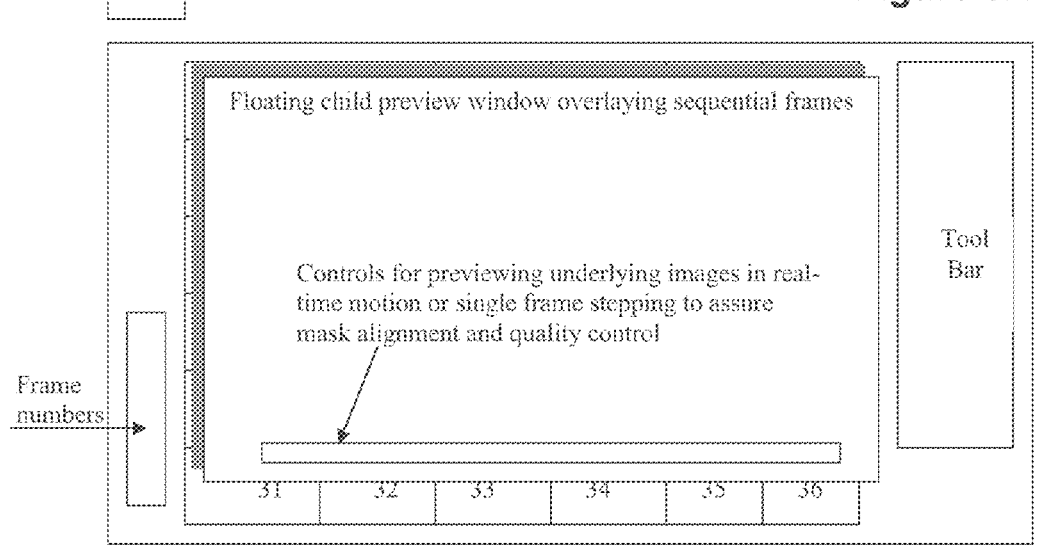
FIGS. 6A and 6B show the child window displaying an enlarged and scalable single image of the series of sequential images in display memory. The Child window enables the operator to manipulate masks interactively on a single frame or in multiple frames during real time or slowed motion.
Figure 6B:

FIGS. 6A and 6B show the child window displaying an enlarged and scalable single image of the series of sequential images in display memory. The Child window enables the operator to manipulate masks interactively on a single frame or in multiple frames during real time or slowed motion.

Mask Modification: Masks can be copied to all or selected frames and automatically modified in thumbnail view or in the preview window. In the preview window mask modification takes place on either individual frames in the display or on multiple frames during real-time motion.

Propagation of Masks to Multiple Sequential Frames in Display Memory: Key Frame masks of foreground motion objects are applied to all frames in the display buffer using various copy functions:

Copy all masks in one frame to all frames;
Copy all masks in one frame to selected frames;
Copy selected mask or masks in one frame to all frames;
Copy selected mask or masks in one frame to selected frames; and
Create masks generated in one frame with immediate copy at the same addresses in all other frames.

Figure 7A:
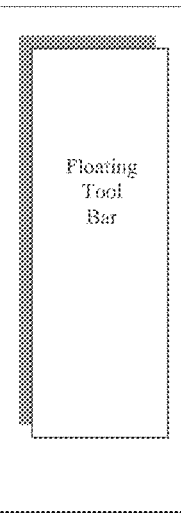
FIGS. 7A and 7B shows a single mask (flesh) is propagated automatically to all frames in the display memory.
Figure 7B:

Refining now to FIGS. 7A and 7B, a single mask (flesh) is propagated automatically to all frames 14 in the display memory. The operator could designate selective frames to apply the selected mask or indicate that it is applied to all frames 14. The mask is a duplication of the initial mask in the first fully masked frame. Modifications of that mask occur only after they have been propagated.

Figure 8:
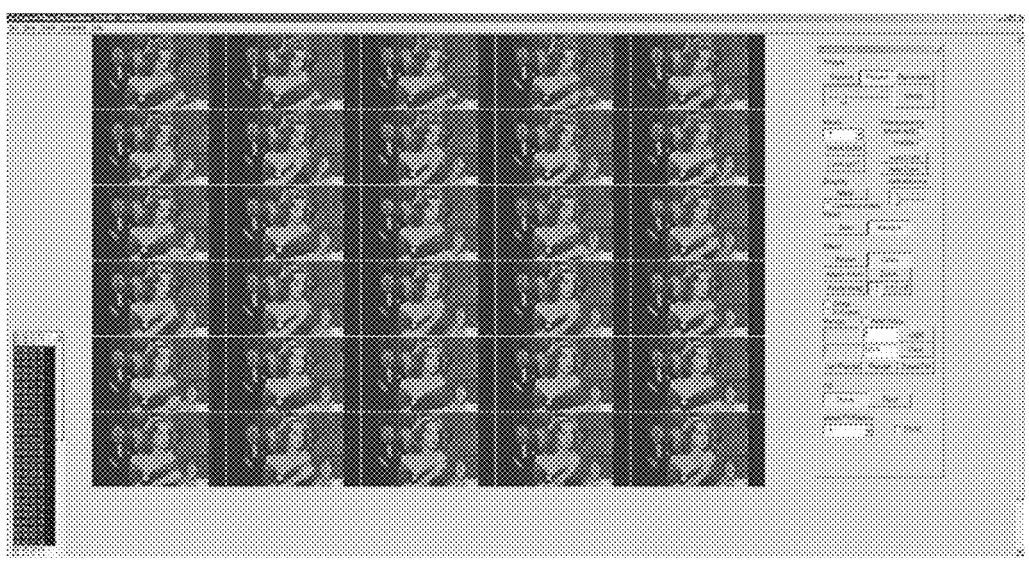
FIG. 8 shows all masks associated with the motion object are propagated to all sequential frames in display memory.

As shown in FIG. 8, all masks associated with the motion object are propagated to all sequential frames in display memory. The images show the displacement of the underlying image data relative to the mask information.

None of the propagation methods listed above actively fit the masks to objects in the frames 14. They only apply the same mask shape and associated color transform information from one frame, typically the key frame to all other frames or selected frames.

Masks are adjusted to compensate for object motion in subsequent frames using various tools based on luminance, pattern and edge characteristics of the image.

Automatic Mask Fitting: Successive frames of a feature film or TV episode exhibit movement of actors and other objects. These objects are designed in a single representative frame within the current embodiment such that operator selected features or regions have unique color transformations identified by unique masks, which encompass the entire feature. The purpose of the mask-fitting tool is to provide an automated means for correct placement and reshaping of a each mask region of interest (ROI) in successive frames such that the mask accurately conforms to the correct spatial location and two dimensional geometry of the ROI as it displaces from the original position in the single representative frame. This method is intended to permit propagation of a mask region from an original reference or design frame to successive frames, and automatically enabling it to adjust shape and location to each image displacement of the associated underlying image feature.

The method for automatically modifying both the location and correctly fitting all masks in an image to compensate for movement of the corresponding image data between frames involves the following:

Set Reference Frame Mask and Corresponding Image Data:

1. A reference frame (frame 1) is masked by an operator using a variety of means such as paint and polygon tools so that all regions of interest (i.e., features) are tightly covered.

2. The minimum and maximum x,y coordinate values of each masked region are calculated to create rectangular bounding boxes around each masked region encompassing all underlying image pixels of each masked region.

3. A subset of pixels are identified for each region of interest within its bounding rectangle (i.e., every 10th pixel)

Copy Reference Frame Mask and Corresponding Image Data To All Subsequent Frames: The masks, bounding boxes and corresponding subset of pixel locations from the reference frame are copied over to all subsequent frames by the operator.

Approximate Offset of Regions Between Reference Frame and the Next Subsequent Frame:

1. Fast Fourier Transform (FFT) are calculated to approximate image data displacements between frame 1 and frame 2

2. Each mask in frame 2 with the accompanying bounding boxes are moved to compensate for the displacement of corresponding image data from frame 1 using the FFT calculation.

3. The bounding box is augmented by an additional margin around the region to accommodate other motion and shape morphing effects.

Fit Masks to the New Location:

1. Using the vector of offset determined by the FFT, a gradient decent of minimum errors is calculated in the image data underlying each mask by:

2. Creating a fit box around each pixel within the subset of the bounding box

3. Calculating a weighed index of all pixels within the fit box using a bilinear interpolation method.

4. Determining offset and best fit to each subsequent frame use Gradient Decent calculations to fit the mask to the desired region Mask fit initialization: An operator selects image features in a single selected frame of a scene (the reference frame) and creates masks with contain all color transforms (color lookup tables) for the underlying image data for each feature. The selected image features that are identified by the operator have well-defined geometric extents which are identified by scanning the features underlying each mask for minimum and maximum x, y coordinate values, thereby defining a rectangular bounding box around each mask.

The Fit Grid used for Fit Grid Interpolation: For optimization purposes, only a sparse subset of the relevant mask-extent region pixels within each bounding box are fit with the method; this subset of pixels defines a regular grid in the image, as labeled by the light pixels of FIG. 9A.

The "small dark" pixels shown in FIG. 9B are used to calculate a weighed index using bilinear interpolation. The grid spacing is currently set at 10 pixels, so that essentially no more than 1 in 50 pixels are presently fit with a gradient descent search. This grid spacing could be a user controllable parameter.

Fast Fourier Transform (FFT) to Estimate Displacement Values: Masks with corresponding rectangular bounding boxes and fit grids are copied to subsequent frames. Forward and inverse FFTs are calculated between the reference frame the next subsequent frame to determine the x,y displacement values of image features corresponding to each mask and bounding box. This method generates a correlation surface, the largest value of which provides a "best fit" position for the corresponding feature's location in the search image. Each mask and bounding box is then adjusted within the second frame to the proper x,y locations.

Fit Value Calculation (Gradient Descent Search): The FFT provides a displacement vector, which directs the search for ideal mask fitting using the Gradient Descent Search method. Gradient descent search requires that the translation or offset be less than the radius of the basin surrounding the minimum of the matching error surface. A successful FFT correlation for each mask region and bounding box will create the minimum requirements.

Searching for a Best Fit on the Error Surface: An error surface calculation in the Gradient Descent Search method involves calculating mean squared differences of pixels in the square fit box centered on reference image pixel (x0, y0), between the reference image frame and the corresponding (offset) location (x, y) on the search image frame, as shown in FIGS. 10A, B, C and D.

Corresponding pixel values in two (reference and search) fit boxes are subtracted, squared, summed/accumulated, and the square-root of the resultant sum finally divided by the number of pixels in the box (#pixels=height×width=height2) to generate the root mean square fit difference ("Error") value at the selected fit search location $$\text{Error}(x0,y0;x,y) = \{\Sigma i \Box \Sigma j \Box (\text{reference box}(x0,y0)\text{pixel}[i,j] - \text{search box}(x,y)\text{pixel}[i,j])2\}/(\text{height2})$$

Fit Value Gradient: The displacement vector data derived from the FFT creates a search fit location, and the error surface calculation begins at that offset position, proceeding down (against) the gradient of the error surface to a local minimum of the surface, which is assumed to be the best fit This method finds best fit for each next frame pixel or groups of pixels based on the previous frame, using normalized squared differences, for instance in a 10×10 box and finding a minimum down the mean squared difference gradients. This technique is similar to a cross correlation but with a restricted sampling box for the calculation. In this way the corresponding fit pixel in the previous frame can be checked for its mask index, and the resulting assignment is complete.

FIGS. 11A, B and C show a second search box derived from a descent down the error surface gradient (evaluated separately), for which the evaluated error function is reduced, possibly minimized, with respect to the original reference box (evident from visual comparison of the boxes with the reference box in FIGS. 10A, B, C and D.).

Figure 12:
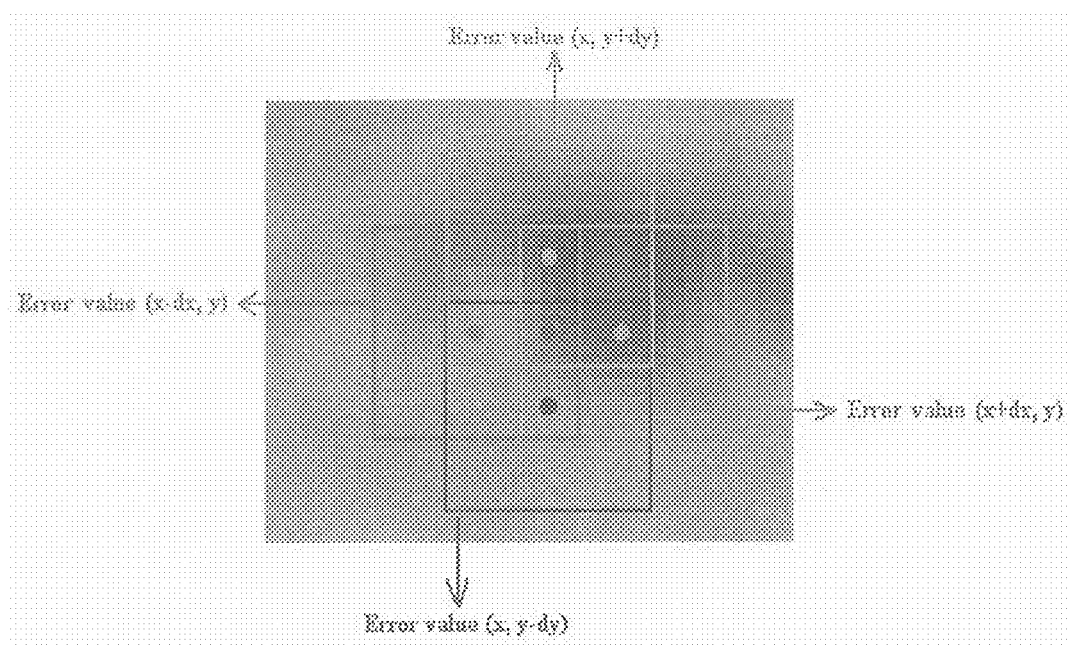
FIG. 12 depicts the gradient component evaluation. The error surface gradient is calculated as per definition of the gradient. Vertical and horizontal error deviations are evaluated at four positions near the search box center position, and combined to provide an estimate of the error gradient for that position. 12.

The error surface gradient is calculated as per definition of the gradient. Vertical and horizontal error deviations are evaluated at four positions near the search box center position, and combined to provide an estimate of the error gradient for that position. The gradient component evaluation is explained with the help of FIG. 12.

The gradient of a surface S at coordinate (x, y) is given by the directional derivatives of the surface:

$$gradient(x,y)=[dS(x,y)/dx, dS(x,y)/dy],$$

which for the discrete case of the digital image is provided by:

$$gradient(x,y)=[(Error(x+dx,y)-Error(x-dx,y))/(2*dx), (Error(x,y+dy)-Error(x,y-dy))/(2*dy)]$$

where dx, dy are one-half the box-width or box-height, also defined as the fit-box "box-radius": box-width=box-height=2×box-radius+1

Note that with increasing box-radius, the fit-box dimensions increase and consequently the size and detail of an image feature contained therein increase as well; the calculated fit accuracy is therefore improved with a larger box and more data to work with, but the computation time per fit (error) calculation increases as the square of the radius increase.

Previous vs. Propagated Reference Images: The reference image utilized for mask fitting is usually an adjacent frame in a film image-frame sequence. However, it is sometimes preferable to use an exquisitely fit mask as a reference image (e.g. a key frame mask, or the source frame from which mask regions were propagated/copied). The present embodiment provides a switch to disable "adjacent" reference frames, using the propagated masks of the reference image if that frame is defined by a recent propagation event.

The process of mask fitting: In the present embodiment the operator loads n frames into the display buffer. One frame includes the masks that are to be propagated and fitted to all other frames. All or some of the mask(s) are then propagated to all frames in the display buffer. Since the mask-fitting algorithm references the preceding frame or the first frame in the series for fitting masks to the subsequent frame, the first frame masks and/or preceding masks must be tightly applied to the objects and/or regions of interest. If this is not done, mask errors will accumulate and mask fitting will break down. The operator displays the subsequent frame, adjusts the sampling radius of the fit and executes a command to calculate mask fitting for the entire frame. The execution command can be a keystroke or mouse-hotkey command.

Figure 13:
FIG. 13 shows a propagated mask in the first sequential instance where there is little discrepancy between the underlying image data and the mask data. The dress mask and hand mask can be clearly seen to be off relative to the image data.

As shown in FIG. 13, a propagated mask in the first sequential instance where there is little discrepancy between the underlying image data and the mask data. The dress mask and hand mask can be clearly seen to be off relative to the image data.

Figure 14:
FIG. 14 shows that by using the automatic mask fitting routine, the mask data adjusts to the image data by referencing the underlying image data in the preceding image.

FIG. 14 shows that by using the automatic mask fitting routine, the mask data adjusts to the image data by referencing the underlying image data in the preceding image.

Figure 15:
FIG. 15 shows the mask data in later images within the sequence show marked discrepancy relative to the underlying image data. Eye makeup, lipstick, blush, hair, face, dress and hand image data are all displaced relative to the mask data.

In FIG. 15, the mask data in later images within the sequence show marked discrepancy relative to the underlying image data. Eye makeup, lipstick, blush, hair, face, dress and hand image data are all displaced relative to the mask data.

Figure 16:
FIG. 16 shows that the mask data is adjusted automatically based on the underlying image data from the previous mask and underlying image data.

As shown in FIG. 16, the mask data is adjusted automatically based on the underlying image data from the previous mask and underlying image data. In this FIG. 13, the mask data is shown with random colors to show the regions that were adjusted automatically based on underlying pattern and luminance data. The blush and eye makeup did not have edge data to reference and were auto-adjusted on the basis of luminance and grayscale pattern.

Figure 17:
FIG. 17 shows the mask data from FIG. 16 is shown with appropriate color transforms after whole frame automatic mask fitting. The mask data is adjusted to fit the underlying luminance pattern based on data from the previous frame or from the initial key frame.

In FIG. 17, mask data from FIG. 16 is shown with appropriate color transforms after whole frame automatic mask fitting. The mask data is adjusted to fit the underlying luminance pattern based on data from the previous frame or from the initial key frame.

Mask Propagation With Bezier and Polygon Animation Using Edge Snap: Masks for motion objects can be animated using either bezier curves or polygons that enclose a region of interest. A plurality of frames are loaded into display memory and either bezier points and curves or polygon points are applied close to the region of interest where the points automatically snap to edges detected within the image data. Once the object in frame one has been enclosed by the polygon or bezier curves the operator adjusts the polygon or bezier in the last frame of the frames loaded in display memory. The operator then executes a fitting routine, which snaps the polygons or bezier points plus control curves to all intermediate frames, animating the mask over all frames in display memory. The polygon and bezier algorithms include control points for rotation, scaling and move-all to handle camera zooms, pans and complex camera moves.

Figure 18:
FIG. 18 shows polygons that are used to outline a region of interest for masking in frame one. The square polygon points snap to the edges of the object of interest. Using a Bezier curve the Bezier points snap to the object of interest and the control points/curves shape to the edges.

In FIG. 18, polygons are used to outline a region of interest for masking in frame one. The square polygon points snap to the edges of the object of interest. Using a bezier curve the bezier points snap to the object of interest and the control points/curves shape to the edges.

Figure 19:
FIG. 19 shows the entire polygon or Bezier curve is carried to a selected last frame in the display memory where the operator adjusts the polygon points or Bezier points and curves using the snap function which automatically snaps the points and curves to the edges of the object of interest.

As disclosed in FIG. 19, the entire polygon or bezier curve is carried to a selected last frame in the display memory where the operator adjusts the polygon points or bezier points and curves using the snap function which automatically snaps the points and curves to the edges of the object of interest.

Figure 20:
FIG. 20 shows that if there is a marked discrepancy between the points and curves in frames between the two frames where there was an operator interactive adjustment, the operator will further adjust a frame in the middle of the plurality of frames where there is maximum error of fit.

As shown in FIG. 20, if there is a marked discrepancy between the points and curves in frames between the two frames where there was an operator interactive adjustment, the operator will further adjust a frame in the middle of the plurality of frames where there is maximum error of fit.

Figure 21:
FIG. 21 shows that when it is determined that the polygons or Bezier curves are correctly animating between the two adjusted frames, the appropriate masks are applied to all frames.

As shown in FIG. 21, when it is determined that the polygons or bezier curves are correctly animating between the two adjusted frames, the appropriate masks are applied to all frames. In these Figures, the arbitrary mask color is seen filling the polygon or bezier curves.

Figure 22:
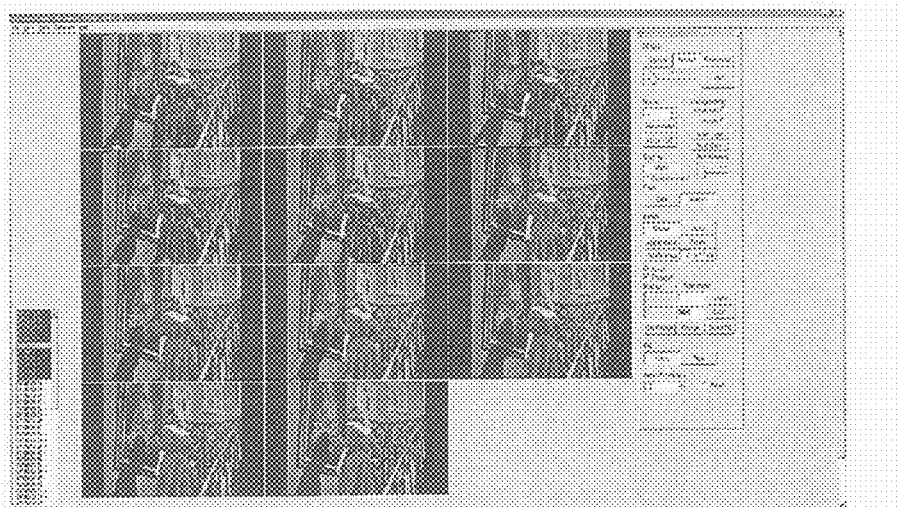
FIG. 22 shows the resulting masks from a polygon or Bezier animation with automatic point and curve snap to edges. The brown masks are the color transforms and the green masks are the arbitrary color masks.

FIG. 22 shows the resulting masks from a polygon or bezier animation with automatic point and curve snap to edges. The brown masks are the color transforms and the green masks are the arbitrary color masks. For depth projects, areas that have been depth assigned may be of one color while those areas that have yet to be depth assigned may be of another color for example.

Colorization/Depth Enhancement of Backgrounds in feature films and television episode: The process of applying mask information to sequential frames in a feature film or television episode is known, but is laborious for a number of reasons. In all cases, these processes involve the correction of mask information from frame to frame to compensate for the movement of underlying image data. The correction of mask information not only includes the re-masking of actors and other moving objects within a scene or cut but also correction of the background and foreground information that the moving objects occlude or expose during their movement. This has been particularly difficult in camera pans where the camera follows the action to the left, right, up or down in the scene cut. In such cases the operator must not only correct for movement of the motion object, the operator must also correct for occlusion and exposure of the background information plus correct for the exposure of new background information as the camera moves to new parts of the background and foreground. Typically these instances greatly increase the time and difficulty factor of colorizing a scene cut due to the extreme amount of manual labor involved. Embodiments of the invention include a method and process for automatically colorizing/depth enhancing a plurality of frames in scenes cuts that include complex camera movements as well as scene cuts where there is camera weave or drifting cameras movement that follows erratic action of the motion objects.

Camera Pans: For a pan camera sequence, the background associated with nonmoving objects in a scene form a large part of the sequence. In order to colorize/depth enhance a large amount of background objects for a pan sequence, a mosaic that includes the background objects for an entire pan sequence with moving objects removed is created. This task is accomplished with a pan background stitcher tool. Once a background mosaic of the pan sequence is generated, it can be colorized/depth enhanced once and applied to the individual frames automatically, without having to manually colorize/depth assign the background objects in each frame of the sequence.

The pan background stitcher tool generates a background image of a pan sequence using two general operations. First, the movement of the camera is estimated by calculating the transformation needed to align each frame in the sequence with the previous frame. Since moving objects form a large portion of cinematic sequences, techniques are used that minimize the effects of moving objects on the frame registration. Second, the frames are blended into a final background mosaic by interactively selecting two pass blending regions that effectively remove moving objects from the final mosaic.

Background composite output data includes a greyscale/ (or possibly color for depth projects) image file of standard digital format such as TIFF image file (bkg.*.tif) comprised of a background image of the entire pan shot, with the desired moving objects removed, ready for color design/depth assignments using the masking operations already described, and an associated background text data file needed for background mask extraction after associated background mask/ colorization/depth data components (bkg.*.msk, bkg.*lut, . . . ) have been established. The background text data file provides filename, frame position within the mosaic, and other frame-dimensioning information for each constituent (input) frame associated with the background, with the following per line (per frame) content: Frame-filename, frame-x-position, frame-y-position, frame-width, frame-height, frame-left-margin-x-max, frame-right-margin-x-min. Each of the data fields are integers except for the first (frame-filename), which is a string.

Generating Transforms: In order to generate a background image for a pan camera sequence, the motion of the camera first is calculated. The motion of the camera is determined by examining the transformation needed to bring one frame into alignment with the previous frame. By calculating the movement for each pair of consecutive frames in the sequence, a map of transformations giving each frame's relative position in the sequence can be generated.

Translation Between Image Pairs: Most image registration techniques use some form of intensity correlation. Unfortunately, methods based on pixel intensities will be biased by any moving objects in the scene, making it difficult to estimate the movement due to camera motion. Feature based methods have also been used for image registration. These methods are limited by the fact that most features occur on the boundaries of moving objects, also giving inaccurate results for pure camera movement. Manually selecting feature points for a large number of frames is also too costly.

The registration method used in the pan stitcher uses properties of the Fourier transform in order to avoid bias towards moving objects in the scene. Automatic registration of frame pairs is calculated and used for the final background image assembly.

Fourier Transform of an Image Pair: The first step in the image registration process consists of taking the Fourier transform of each image. The camera motion can be estimated as a translation. The second image is translated by a certain amount given by:

$$I_2(x,y) = I_1(x-x_0, y-y_0) \tag{1}$$

Taking the Fourier transform of each image in the pair yields the following relationship:

$$F_2(\alpha,\beta) = e^{-j\cdot 2\pi \cdot (\alpha x_0 - \beta y_0)} \cdot F_1(\alpha,\beta). \tag{2}$$

Phase Shift Calculation: The next step involves calculating the phase shift between the images. Doing this results in an expression for the phase shift in terms of the Fourier transform of the first and second image:

$$e^{-j\cdot 2\pi\cdot(\alpha x_0 - \beta y_0)} = \frac{F_1^* \cdot F_2}{|F_1^* \cdot F_2|}. \tag{3}$$

Inverse Fourier Transform

By taking the inverse Fourier transform of the phase shift calculation given in (3) results in delta function whose peak is located at the translation of the second image.

$$\delta(x-x_0, y-y_0) = F^{-1}[e^{-j\cdot 2\pi \cdot (\alpha x_0 - \beta y_0)}] = F^{-1}\left[\frac{F_1^* \cdot F_2}{|F_1^* \cdot F_2|}\right]. \tag{4}$$

Peak Location: The two-dimensional surface that results from (4) will have a maximum peak at the translation point from the first image to the second image. By searching for the largest value in the surface, it is simple to find the transform that represents the camera movement in the scene. Although there will be spikes present due to moving objects, the dominant motion of the camera should represent the largest peak value. This calculation is performed for every consecutive pair of frames in the entire pan sequence.

Dealing with Image Noise: Unfortunately, spurious results can occur due to image noise which can drastically change the results of the transform calculation. The pan background stitcher deals with these outliers using two methods that detect and correct erroneous cases: closest peak matching and interpolated positions. If these corrections fail for a particular image pair, the stitching application has an option to manually correct the position of any pair of frames in the sequence.

Closest Matching Peak: After the transform is calculated for an image pair, the percent difference between this transform and the previous transform is determined. If the difference is higher than a predetermined threshold than a search for neighboring peaks is done. If a peak is found that is a closer match and below the difference threshold, then this value is used instead of the highest peak value.

This assumes that for a pan camera shot, the motion with be relatively steady, and the differences between motions for each frame pair will be small. This corrects for the case where image noise may cause a peak that is slightly higher that the true peak corresponding to the camera transformation.

Interpolating Positions: If the closest matching peak calculation fails to yield a reasonable result given by the percent difference threshold, then the position is estimated based on the result from the previous image pair. Again, this gives generally good results for a steady pan sequence since the difference between consecutive camera movements should be roughly the same. The peak correlation values and interpolated results are shown in the stitching application, so manual correction can be done if needed.

Generating the Background: Once the relative camera movement for each consecutive frame pair has been calculated, the frames can be composited into a mosaic which represents the entire background for the sequence. Since the moving objects in the scene need to be removed, different image blending options are used to effectively remove the dominant moving objects in the sequence.

Assembling the Background Mosaic: First a background image buffer is generated which is large enough to span the entire sequence. The background can be blended together in a single pass, or if moving objects need to be removed, a two-pass blend is used, which is detailed below. The position and width of the blend can be edited in the stitching application and can be set globally set or individually set for each frame pair. Each blend is accumulated into the final mosaic and then written out as a single image file.

Figure 23:
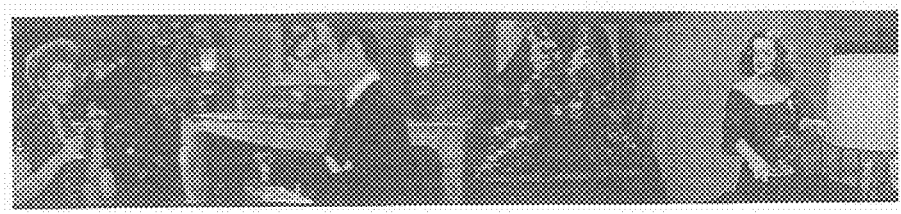
FIG. 23 shows an example of two pass blending: The objective in two-pass blending is to eliminate moving objects from the final blended mosaic. This can be done by first blending the frames so the moving object is completely removed from the left side of the background mosaic.
Figure 24:
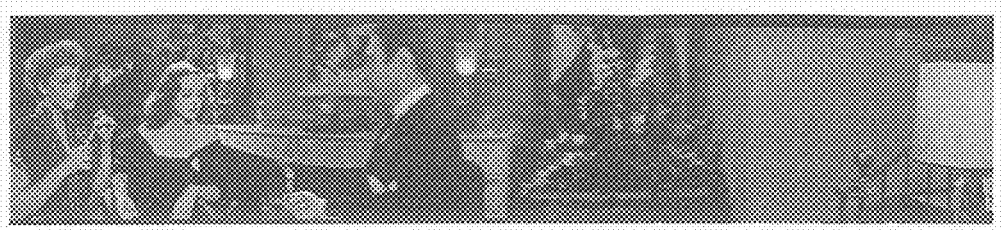
FIG. 24 shows the second pass blend. A second background mosaic is then generated, where the blend position and width is used so that the moving object is removed from the right side of the final background mosaic.

Two Pass Blending: The objective in two-pass blending is to eliminate moving objects from the final blended mosaic. This can be done by first blending the frames so the moving object is completely removed from the left side of the background mosaic. An example is shown in FIG. 23, where the character can is removed from the scene, but can still be seen in the right side of the background mosaic. FIG. 23. In the first pass blend shown in FIG. 23, the moving character is shown on the stairs to the right A second background mosaic is then generated, where the blend position and width is used so that the moving object is removed from the right side of the final background mosaic. An example of this is shown in FIG. 24, where the character can be removed from the scene, but can still be seen the left side of the background mosaic. In the second pass blend as shown in FIG. 24, the moving character is shown on the left.

Figure 25:
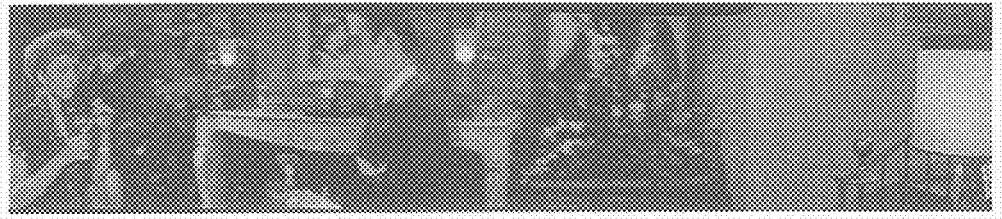
FIG. 25 shows the final background corresponding to FIGS. 23-24. The two-passes are blended together to generate the final blended background mosaic with the moving object removed from the scene.

Finally, the two-passes are blended together to generate the final blended background mosaic with the moving object removed from the scene. The final background corresponding to FIGS. 23 and 24 is shown in FIG. 25. As shown in FIG. 25, the final blended background with moving character is removed.

Figure 26:
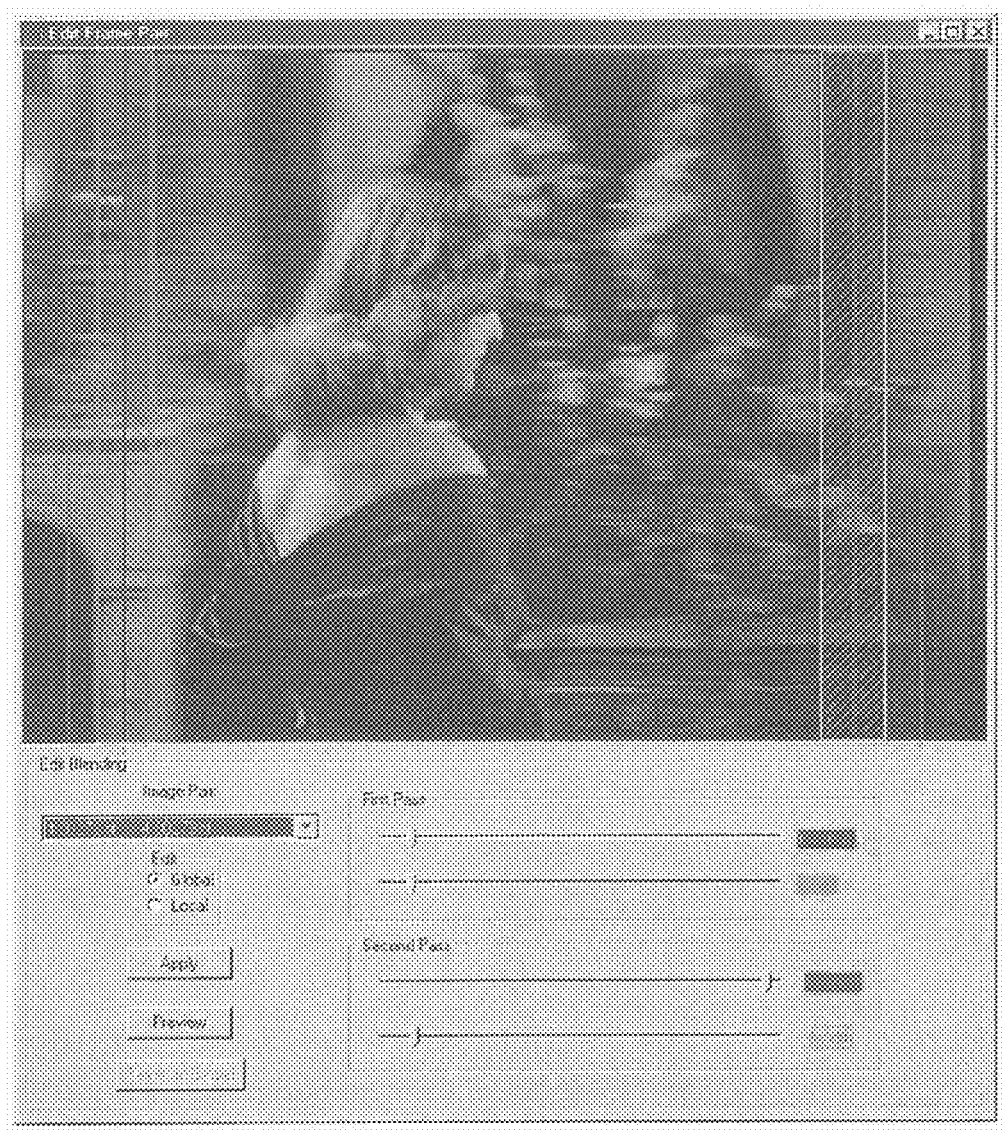
FIG. 26 shows an edit frame pair window.

In order to facilitate effective removal of moving objects, which can occupy different areas of the frame during a pan sequence, the stitcher application has on option to interactively set the blending width and position for each pass and each frame individually or globally. An example screen shot from the blend editing tool, showing the first and second pass blend positions and widths, can be seen in FIG. 26, which is a screen shot of the blend-editing tool.

Background Text Data Save: An output text data file containing parameter values relevant for background mask extraction as generated from the initialization phase described above. As mentioned above, each text data record includes: Frame-filename frame-x-position frame-y-position frame-width frame-height frame-left-margin-x-max frame-right-margin-x-min.

The output text data filename is composed from the first composite input frame rootname by prepending the "bkg." prefix and appending the ".txt" extension.

Example: Representative lines output text data file called "bkgA.00233.txt" that may include data from 300 or more frames making up the blended image.:
 4.00233.tif 0 0 1436 1080 0 1435
 4.00234.tif 7 0 1436 1080 0 1435
 4.00235.tif 20 0 1436 1080 0 1435
 4.00236.tif 37 0 1436 1080 0 1435
 4.00237.tif 58 0 1436 1080 0 1435

Image offset information used to create the composite representation of the series of frames is contained within a text file associated with the composite image and used to apply the single composite mask to all the frames used to create the composite image.

Figure 27:
FIG. 27 shows sequential frames representing a camera pan that are loaded into memory. The motion object (butler moving left to the door) has been masked with a series of color transform information leaving the background black and white with no masks or color transform information applied.

In FIG. 27, sequential frames representing a camera pan are loaded into memory. The motion object (butler moving left to the door) has been masked with a series of color transform information leaving the background black and white with no masks or color transform information applied. Alternatively for depth projects, the motion object may be assigned a depth and/or depth shape. See FIGS. 42-70.

Figure 28:
FIG. 28 shows six representative sequential frames of the pan above are displayed for clarity.

In FIG. 28, six representative sequential frames of the pan above are displayed for clarity.

Figure 29:
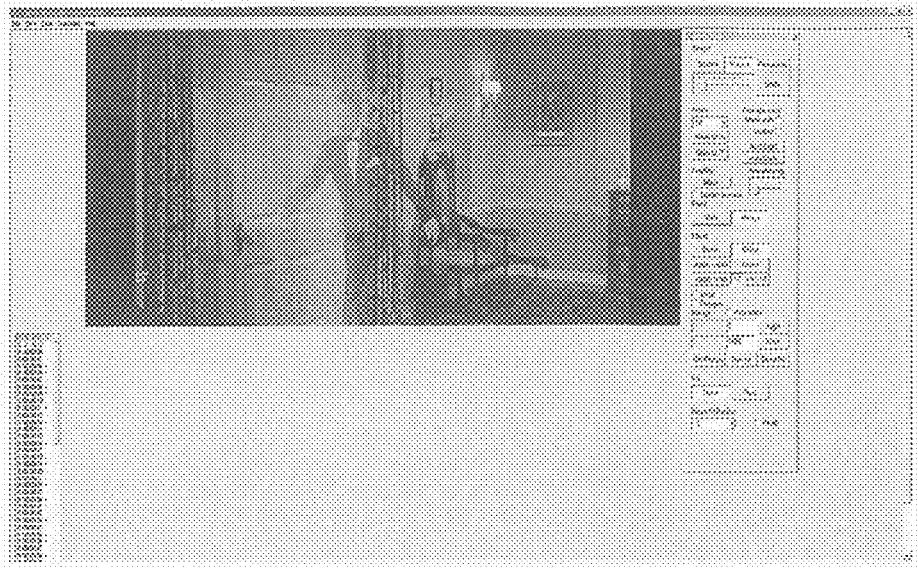
FIG. 29 shows the composite or montage image of the entire camera pan that was built using phase correlation techniques. The motion object (butler) included as a transparency for reference by keeping the first and last frame and averaging the phase correlation in two directions. The single montage representation of the pan is color designed using the same color transform masking techniques as used for the foreground object.

FIG. 29 show the composite or montage image of the entire camera pan that was built using phase correlation techniques. The motion object (butler) included as a transparency for reference by keeping the first and last frame and averaging the phase correlation in two directions. The single montage representation of the pan is color designed using the same color transform masking techniques as used for the foreground object.

Figure 30:
FIG. 30 shows that the sequence of frames in the camera pan after the background mask color transforms the montage has been applied to each frame used to create the montage. The mask is applied where there is no pre-existing mask thus retaining the motion object mask and color transform information while applying the background information with appropriate offsets.

FIG. 30 shows that the sequence of frames in the camera pan after the background mask color transforms the montage has been applied to each frame used to create the montage. The mask is applied where there is no pre-existing mask thus retaining the motion object mask and color transform information while applying the background information with appropriate offsets. Alternatively for depth projects, the left and right eye views of each frame may be shown as pairs, or in a separate window for each eye for example. Furthermore, the images may be displayed on a three-dimensional viewing display as well.

Figure 31:
FIG. 31 shows a selected sequence of frames in the pan for clarity after the color background masks have been automatically applied to the frames where there is no pre-existing masks.

In FIG. 31, a selected sequence of frames in the pan for clarity after the color background/depth enhanced background masks have been automatically applied to the frames where there is no pre-existing masks.

Static and drifting camera shots: Objects which are not moving and changing in a film scene cut can be considered "background" objects, as opposed to moving "foreground" objects. If a camera is not moving throughout a sequence of frames, associated background objects appear to be static for the sequence duration, and can be masked and colorized only once for all associated frames. This is the "static camera" (or "static background") case, as opposed to the moving (e.g. panning) camera case, which requires stitching tool described above to generate a background composite.

Cuts or frame sequences involving little or no camera motion provide the simplest case for generating frame-image background "composites" useful for cut background colorization. However, since even a "static" camera experiences slight vibrations for a variety of reasons, the static background composition tool cannot assume perfect pixel alignment from frame-to-frame, requiring an assessment of interframe shifts, accurate to 1 pixel, in order to optimally associated pixels between frames prior to adding their data contribution into the composite (an averaged value). The Static Background Composite tool provides this capability, generating all the data necessary to later colorize and extract background colorization information for each of the associated frames.

Moving foreground objects such as actors, etc., are masked leaving the background and stationary foreground objects unmasked. Wherever the masked moving object exposes the background or foreground the instance of background and foreground previously occluded is copied into the single image with priority and proper offsets to compensate for movement. The offset information is included in a text file associated with the single representation of the background so that the resulting mask information can be applied to each frame in the scene cut with proper mask offsets.

Background composite output data uses a greyscale TIFF image file (bkg.*.tif) that includes averaged input background pixel values lending itself to colorization/depth enhancement, and an associated background text data file required for background mask extraction after associated background mask/colorization data/depth enhancement components (bkg.*.msk, bkg.*.lut, . . . ) have been established. Background text data provides filename, mask-offset, and other frame-dimensioning information for each constituent (input) frame associated with the composite, with the following per line (per frame) format: Frame-filename frame-x-offset frame-y-offset frame-width frame-height frame-left-margin-x-max frame-right-margin-x-min. Each of these data fields are integers except for the first (frame-filename), which is a string.

Initialization: Initialization of the static background composition process involves initializing and acquiring the data necessary to create the composited background image-buffer and -data. This requires a loop over all constituent input image frames. Before any composite data initialization can occur, the composite input frames must be identified, loaded, and have all foreground objects identified/colorized (i.e. tagged with mask labels, for exclusion from composite). These steps are not part of the static background composition procedure, but occur prior to invoking the composite tool after browsing a database or directory tree, selecting and loading relevant input frames, painting/depth assigning the foreground objects.

Get Frame Shift: Adjacent frames' image background data in a static camera cut may exhibit small mutual vertical and horizontal offsets. Taking the first frame in the sequence as a baseline, all successive frames' background images are compared to the first frames', fitting line-wise and column-wise, to generate two histograms of "measured" horizontal and vertical offsets, from all measurable image-lines and -columns. The modes of these histograms provide the most frequent (and likely) assessed frame offsets, identified and stored in arrays DVx[iframe], DVy[iframe] per frame [iframe]. These offset arrays are generated in a loop over all input frames.

Get Maximum Frame Shift: While looping over input frames during initialization to generate the DVx[ ], DVy[ ] offset array data, the absolute maximum DVxMax, DVyMax values are found from the DVx[ ], DVy[ ] values. These are required when appropriately dimensioning the resultant background composite image to accommodate all composited frames' pixels without clipping.

Get Frame Margin: While looping over input frames during initialization, an additional procedure is invoked to find the right edge of the left image margin as well as the left edge of the right image margin. As pixels in the margins have zero or near-zero values, the column indexes to these edges are found by evaluating average image-column pixel values and their variations. The edge column-indexes are stored in arrays lMarg[iframe] and rMarg[iframe] per frame [iframe], respectively.

Extend Frame Shifts with Maximum: The Frame Shifts evaluated in the GetFrameShift( ) procedure described are relative to the "baseline" first frame of a composited frame sequence, whereas the sought frame shift values are shifts/offsets relative to the resultant background composite frame. The background composite frame's dimensions equal the first composite frame's dimensions extended by vertical and horizontal margins on all sides with widths DVxMax, DVyMax pixels, respectively. Frame offsets must therefore include margin widths relative to the resultant background frame, and therefore need to be added, per iframe, to the calculated offset from the first frame:

$$DVx[iframe]=DVx[iframe]+DVxMax$$

$$DVy[iframe]=DVy[iframe]+DVyMax$$

Initialize Composite Image: An image-buffer class object instance is created for the resultant background composite. The resultant background composite has the dimensions of the first input frame increased by 2*DVxMax (horizontally) and 2*DVyMax (vertically) pixels, respectively. The first input frame background image pixels (mask-less, non-foreground pixels) are copied into the background image buffer with the appropriate frame offset. Associated pixel composite count buffer values are initialized to one (1) for pixels receiving an initialization, zero (0) otherwise.

Composite Frame Loop: Input frames are composited (added) sequentially into the resultant background via a loop over the frames. Input frame background pixels are added into the background image buffer with the relevant offset (DVx [iframe], DVy[iframe]) for each frame, and associated pixel composite count values are incremented by one (1) for pixels receiving a composite addition (a separate composite count array/buffer is provided for this). Only background pixels, those without an associated input mask index, are composited (added) into the resultant background; pixels with nonzero (labeled) mask values are treated as foreground pixels and are therefore not subject to composition into the background; thus they are ignored. A status bar in the GiII is incremented per pass through the input frame loop.

Composite Finish: The final step in generating the output composite image buffer requires evaluating pixel averages which constitute the composite image. Upon completion of the composite frame loop, a background image pixel value represents the sum of all contributing aligned input frame pixels. Since resultant output pixels must be an average of these, division by a count of contributing input pixels is required. The count per pixel is provided by the associated pixel composite count buffer, as mentioned. All pixels with nonzero composite counts are averaged; other pixels remain zero.

Composite Image Save: A TIFF format output gray-scale image with 16 bits per pixel is generated from composite-averaged background image buffer. The output filename is composed from the first composite input frame filename by pre-pending the "bkg." prefix (and appending the usual ".tif" image extension if required), and writing to the associated background folder at path " . . . /Bckgrnd Frm", if available, otherwise to the default path (same as input frames').

Figure 39A:
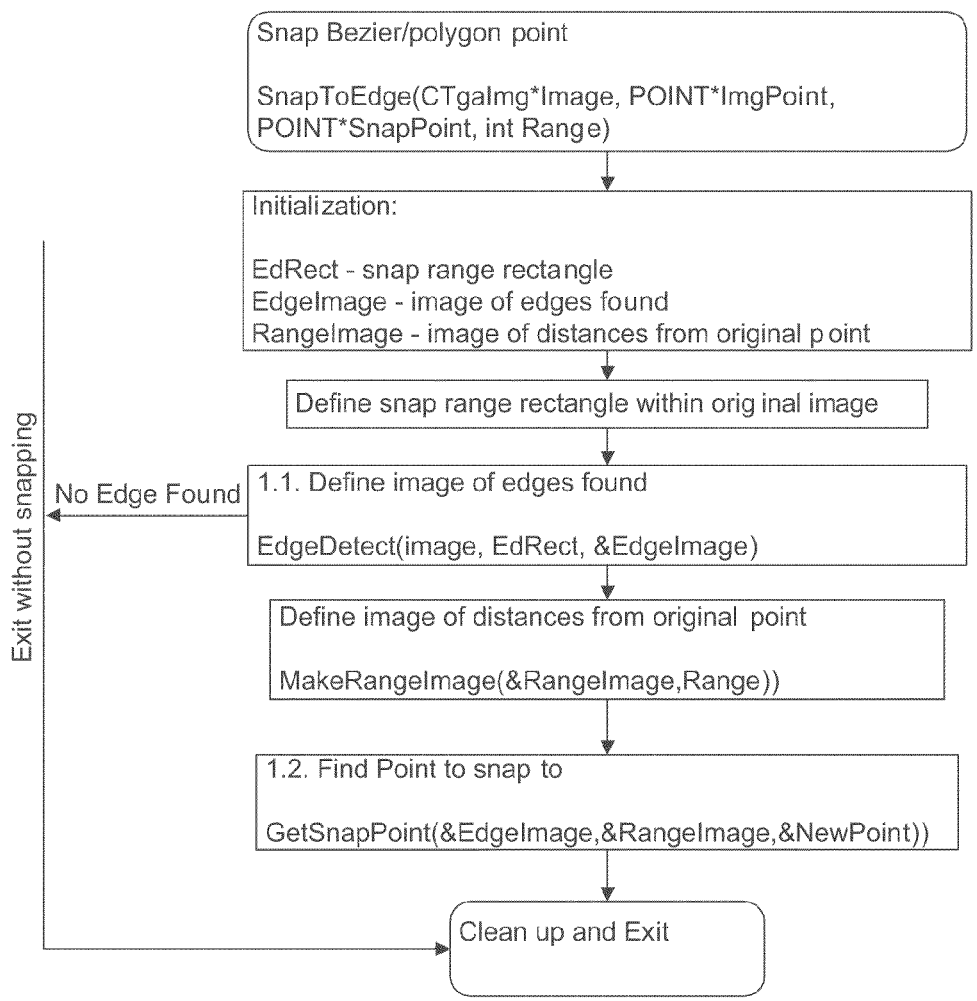
FIGS. 39A-C show embodiments of the snap point functions.
Figure 39B:
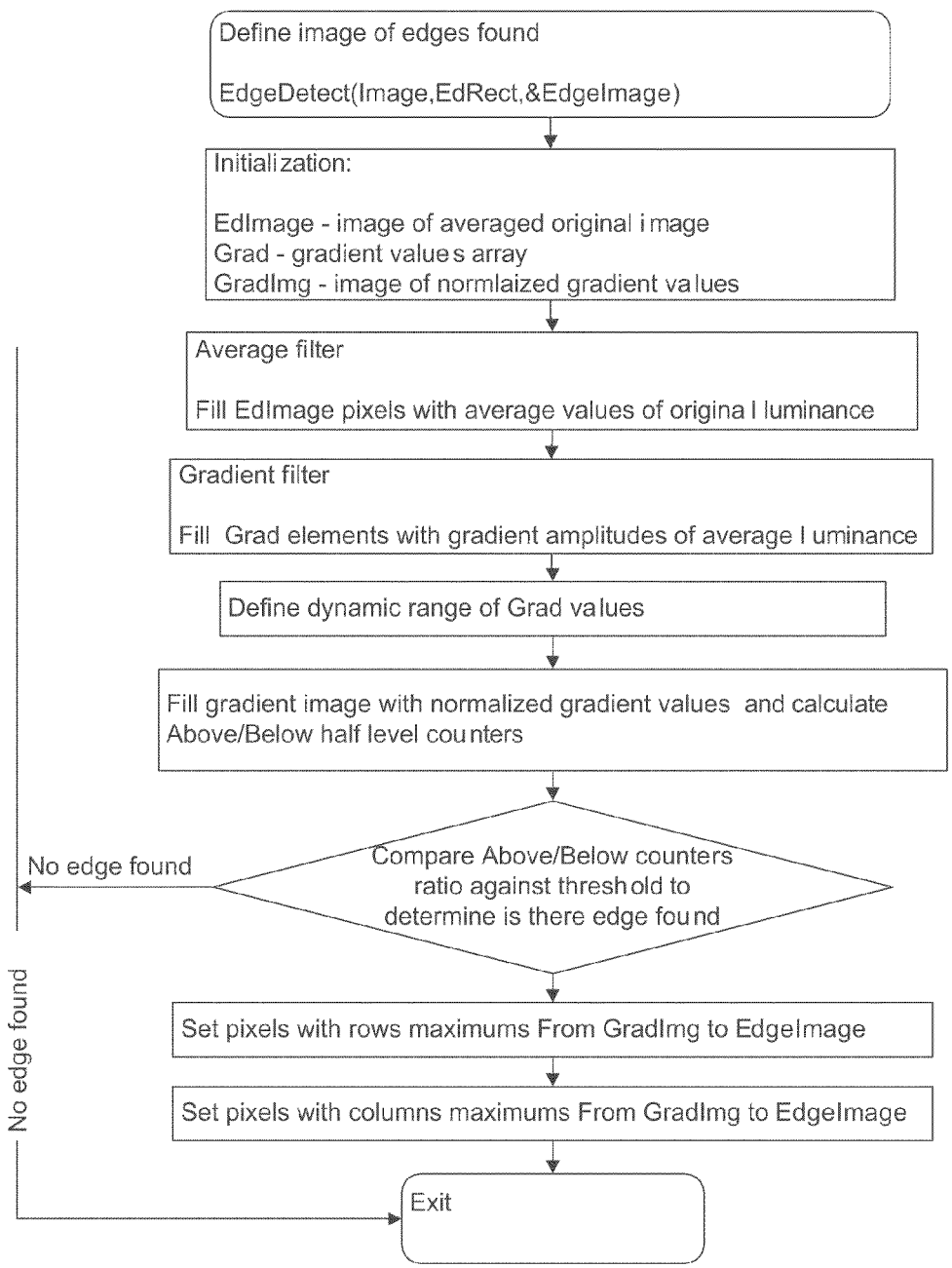
Figure 39C:
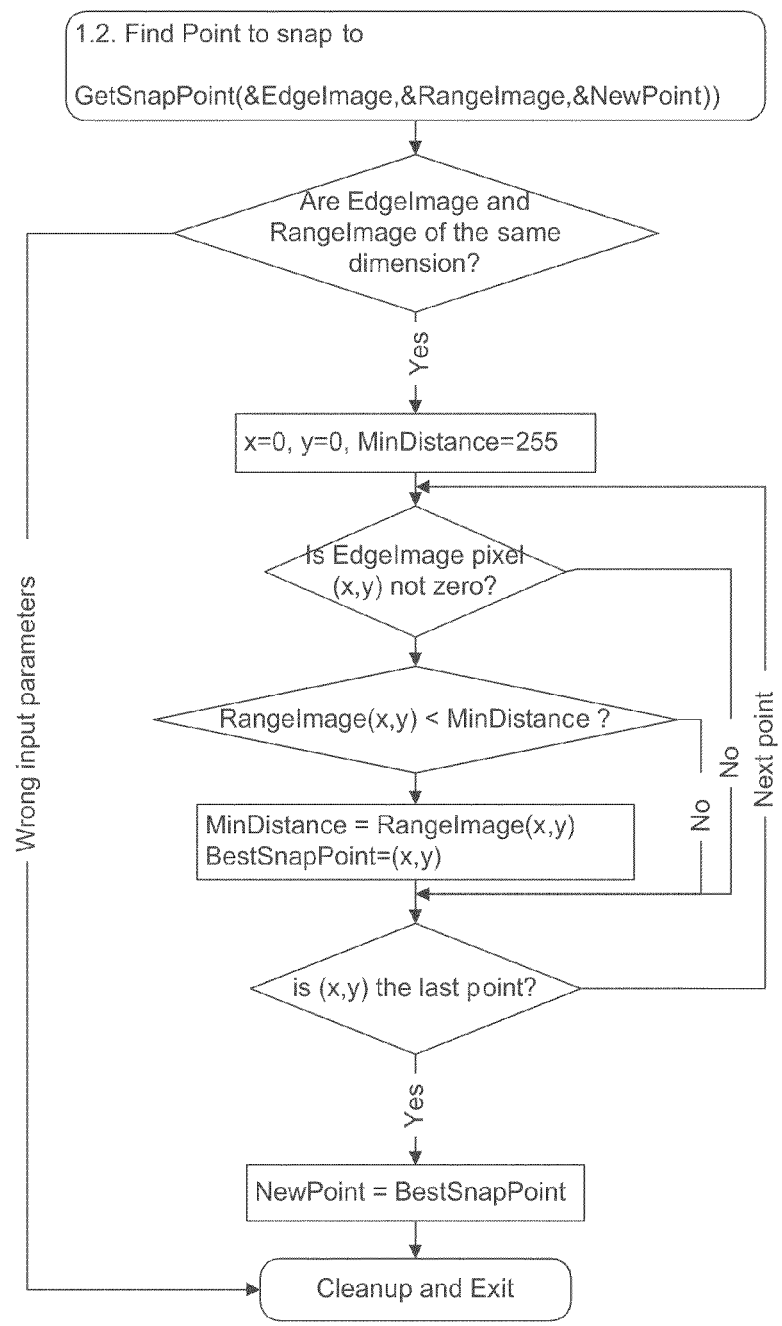
Figure 40A:
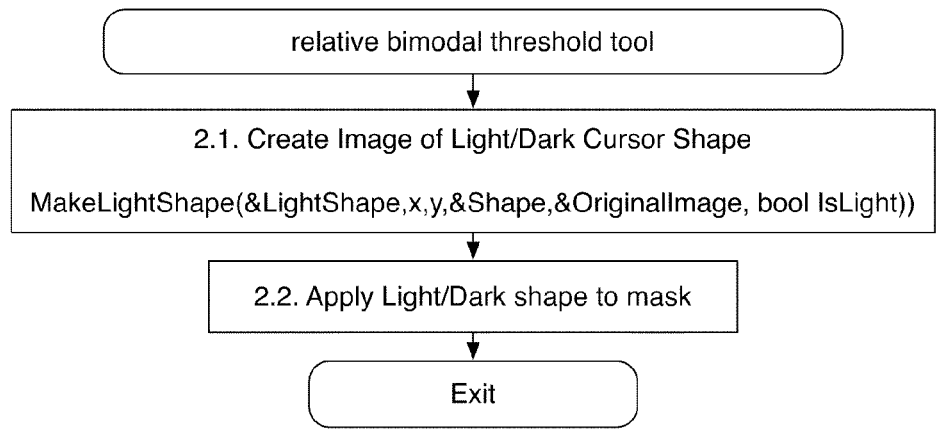
FIGS. 40A-C show embodiments of the bimodal threshold masking functions, wherein FIG. 40C corresponds to step 2.1 in FIG. 40A, namely "Create Image of Light/Dark Cursor Shape" and FIG. 40B corresponds to step 2.2 in FIG. 40A, namely "Apply Light/Dark shape to mask".
Figure 40B:
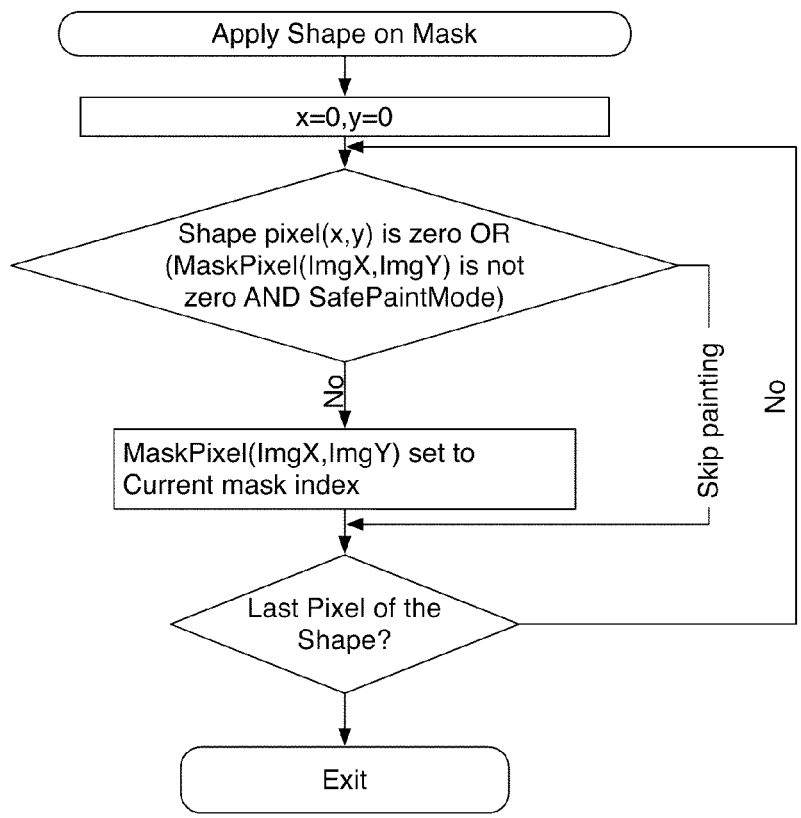
Figure 40C:
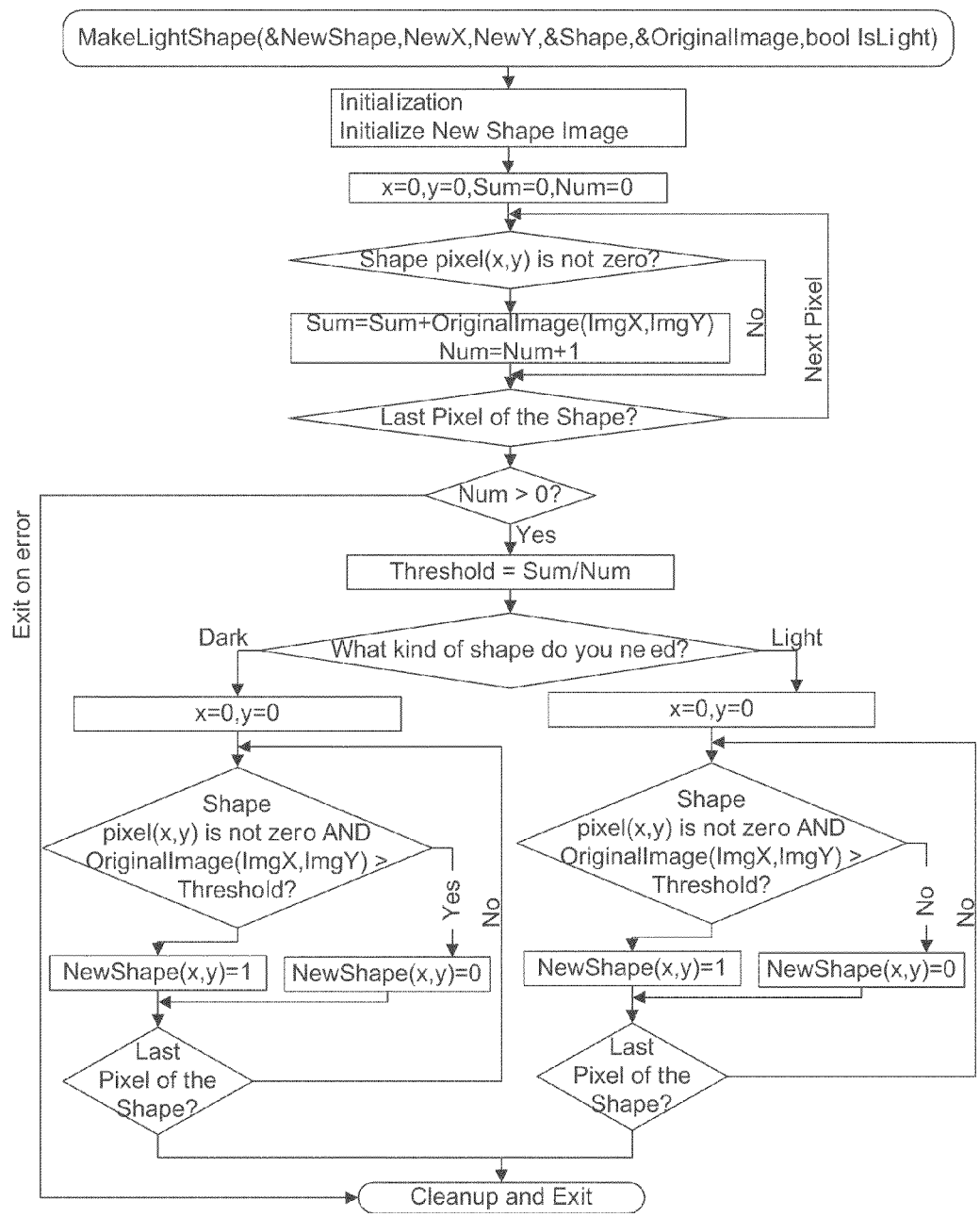
Figure 41A:
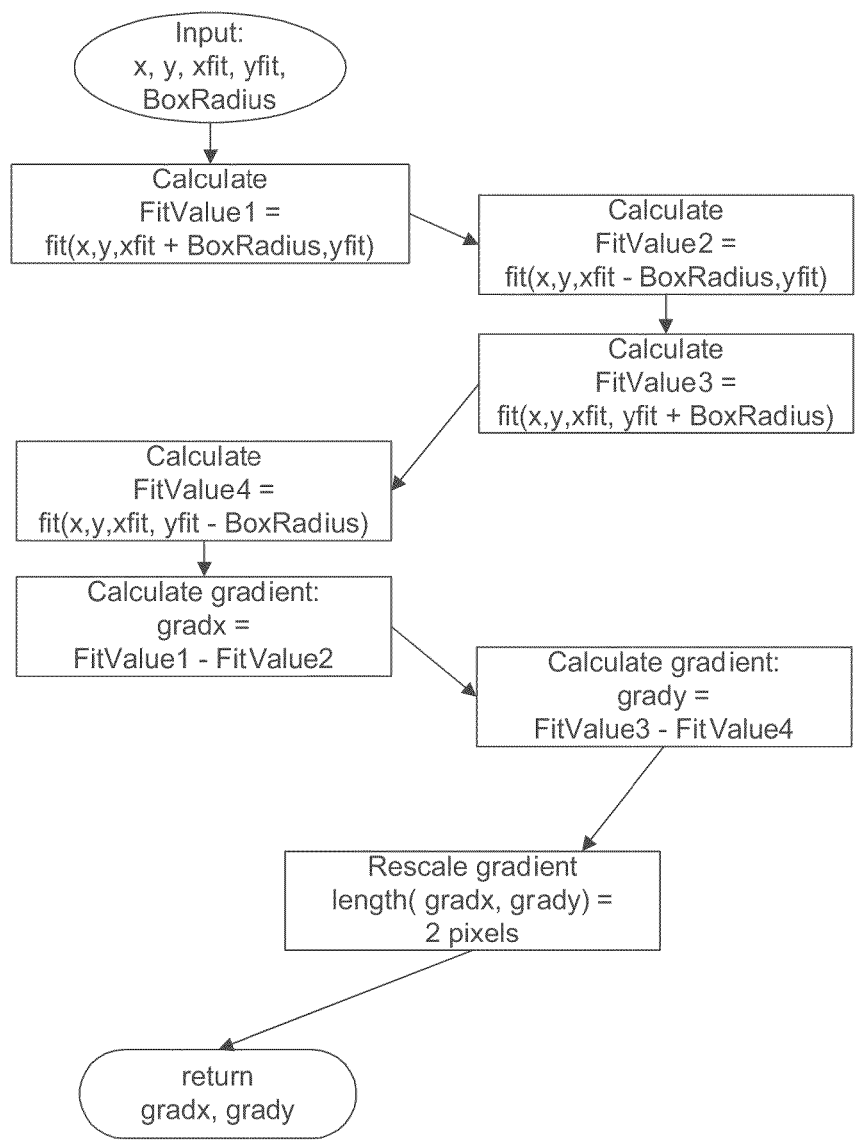
FIGS. 41A-B show embodiments of the calculate fit value functions.
Figure 41B:
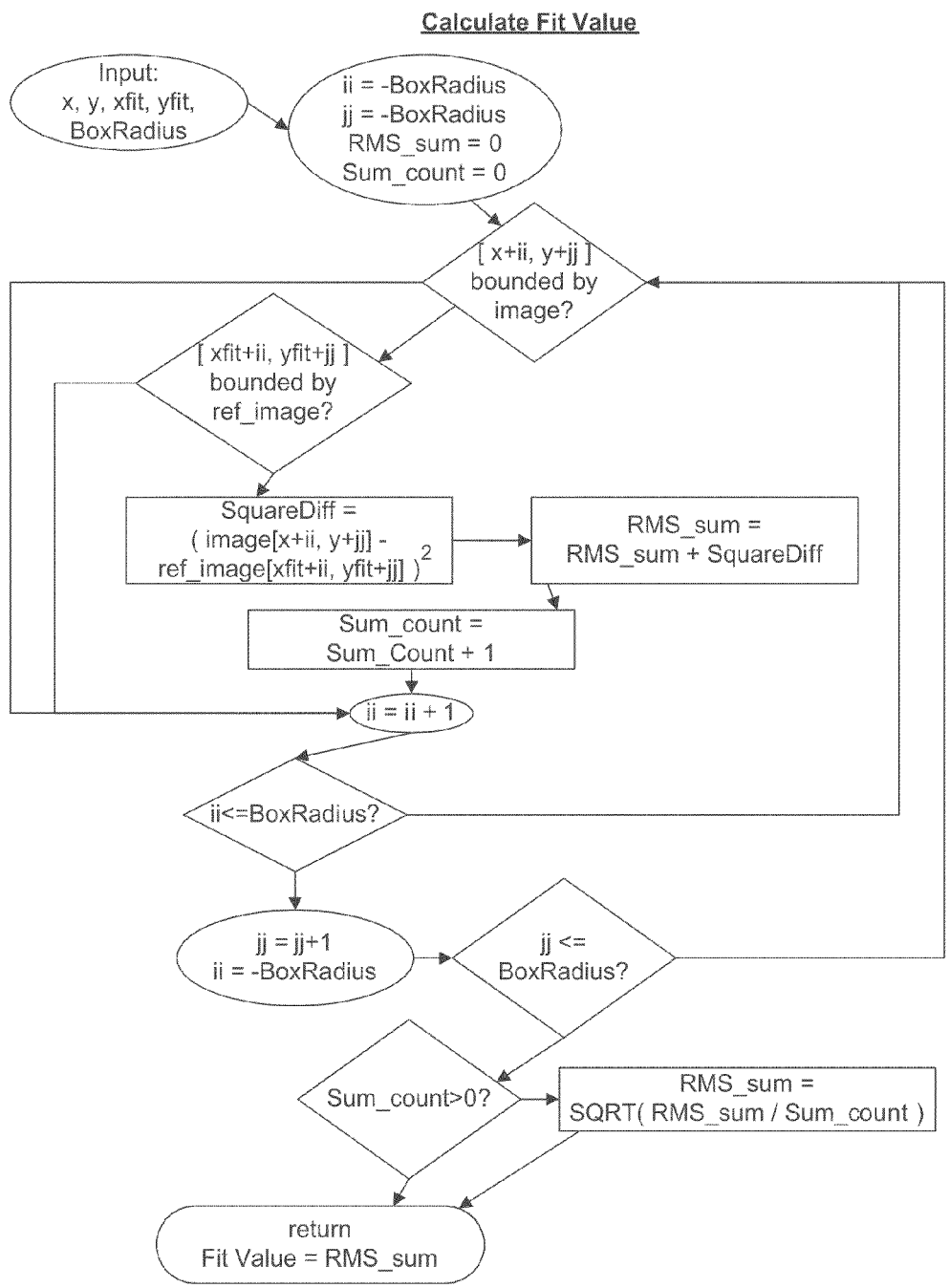

Background Text Data Save: An output text data file containing parameter values relevant for background mask extraction as generated from the initialization phase described in (40A-C). As mentioned in the introduction (see FIG. 39A), each text data record consists of: Frame-filename frame-x-offset frame-y-offset frame-width frame-height frame-left-margin-x-max frame-right-margin-x-min.

The output text data filename is composed from the first composite input frame rootname by prepending the "bkg." prefix and appending the ".txt" extension, and writing to the associated background folder at path " . . . /Bckgrnd Frm", if available, otherwise to the default path (same as input frames').

Example: A complete output text data file called "bkg.02.00.06.02.txt":

C:\NewYolder\Static Backgrounding Test\02.00.06.02.tif
1 4 1920 1080 0 1919
C: \New Folder\Static Backgrounding Test\02.00.06.03.tif
1 4 1920 1080 0 1919
C: \New Folder\Static Backgrounding Test\02.00.06.04.tif
1 3 1920 1080 0 1919
C: \New Folder\Static Backgrounding Test\02.00.06.05.tif
2 3 1920 1080 0 1919
C: \New Folder\Static Backgrounding Test\02.00.06.06.tif
1 3 1920 1080 0 1919

Data Cleanup: Releases memory allocated to data objects used by the static background composite procedure. These include the background composite GUI dialog object and its member arrays DVx[ ], DVy[ ], lMarg[ ], rMarg[ ], and the background composite image buffer object, whose contents have previously been saved to disk and are no longer needed.

Colorization/Depth Assignment of the Composite Background

Once the background is extracted as described above the single frame can be masked by an operator with.

The offset data for the background composite is transferred to the mask data overlaying the background such that the mask for each successive frame used to create the composite is placed appropriately.

The background mask data is applied to each successive frame wherever there are no pre-existing masks (e.g. the foreground actors).

Figure 32:
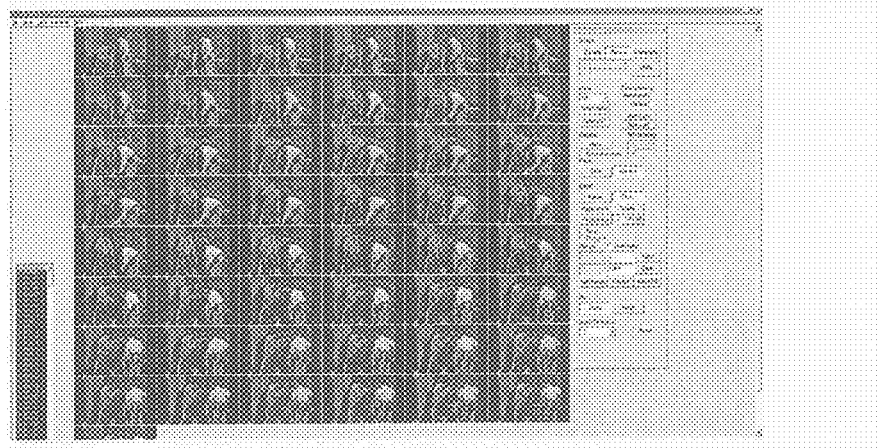
FIG. 32 shows a sequence of frames in which all moving objects (actors) are masked with separate color transforms.

FIG. 32 shows a sequence of frames in which all moving objects (actors) are masked with separate color transforms/depth enhancements.

Figure 33:
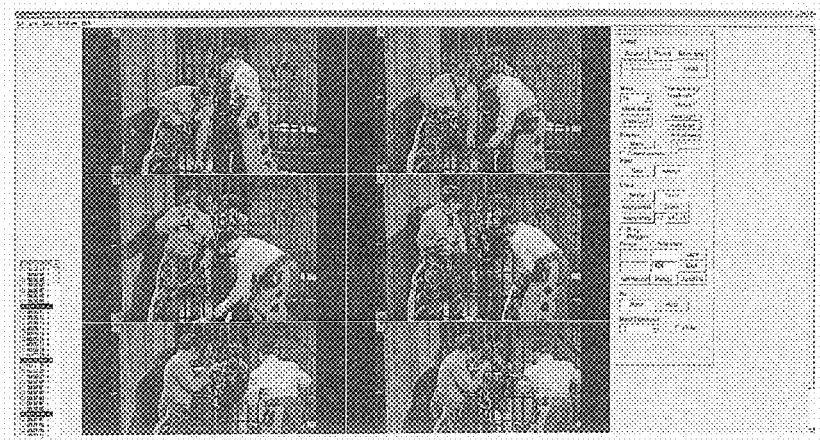
FIG. 33 shows a sequence of selected frames for clarity prior to background mask information. All motion elements have been fully masked using the automatic mask-fitting algorithm.

FIG. 33 shows a sequence of selected frames for clarity prior to background mask information. All motion elements have been fully masked using the automatic mask-fitting algorithm.

Figure 34:
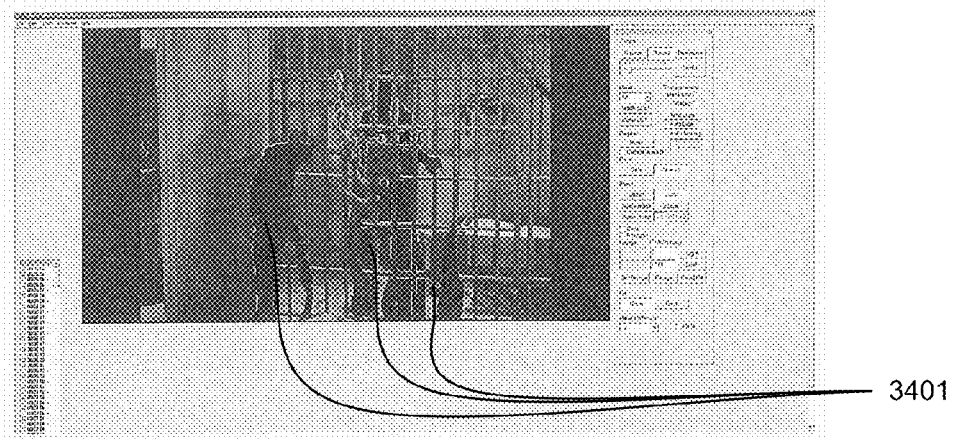
FIG. 34 shows the stationary background and foreground information minus the previously masked moving objects. In this case, the single representation of the complete background has been masked with color transforms in a manner similar to the motion objects. Note that outlines of removed foreground objects appear truncated and unrecognizable due to their motion across the input frame sequence interval, i.e., the black objects in the frame represent areas in which the motion objects (actors) never expose the background and foreground. The black objects are ignored during the masking operation in colorization-only projects because the resulting background mask is later applied to all frames used to create the single representation of the background only where there is no pre-existing mask. In depth conversion projects the missing data area may be displayed so that image data may be obtained/generated for the missing data area so as to provide visually believable image data when translating foreground objects horizontally to generate a second viewpoint.

FIG. 34 shows the stationary background and foreground information minus the previously masked moving objects. In this case, the single representation of the complete background has been masked with color transforms in a manner similar to the motion objects. Note that outlines of removed foreground objects appear truncated and unrecognizable due to their motion across the input frame sequence interval, i.e., the black objects in the frame represent areas in which the motion objects (actors in this case) never expose the background and foreground, i.e., missing background image data 3401. The black objects are ignored for colorization-only projects during the masking operation because the resulting background mask is later applied to all frames used to create the single representation of the background only where there is no pre-existing mask. For depth related projects, the black objects where missing background image data 3401 exists, may artistically or realistically rendered, for example to fill in information to be utilized in the conversion of two-dimensional images into three-dimensional images. Since these areas are areas where pixels may not be borrowed from other frames since they are never exposed in a scene, drawing them or otherwise creating believable images there, allows for all background information to be present and used for artifact free two-dimensional to three-dimensional conversion. For example, in order to create artifact-free three-dimensional image pairs from a two-dimensional image having areas that are never exposed in a scene, backgrounds having all or enough required information for the background areas that are always occluded may be generated. The missing background image data 3401 may be painted, drawn, created, computer generated or otherwise obtained from a studio for example, so that there is enough information in a background, including the black areas to translate foreground objects horizontally, and borrow generated background data for the translated edges for occluded areas. This enables the generation of artifact free three-dimensional image pairs since translation of foreground objects horizontally, which may expose areas that are always occluded in a scene, results in the use of the newly created background data instead of stretching objects or morphing pixels which creates artifacts that are human detectable errors. Hence, obtaining backgrounds with occluded areas filled in, either partially with enough horizontal realistic image data or fully with all occluded areas rendered into a realistic enough looking area, i.e., drawn and colorized and/or depth assigned, thus results in artifact free edges for depth enhanced frames. See also FIGS. 70 and 71-76 and the associated description respectively.

Figure 35:
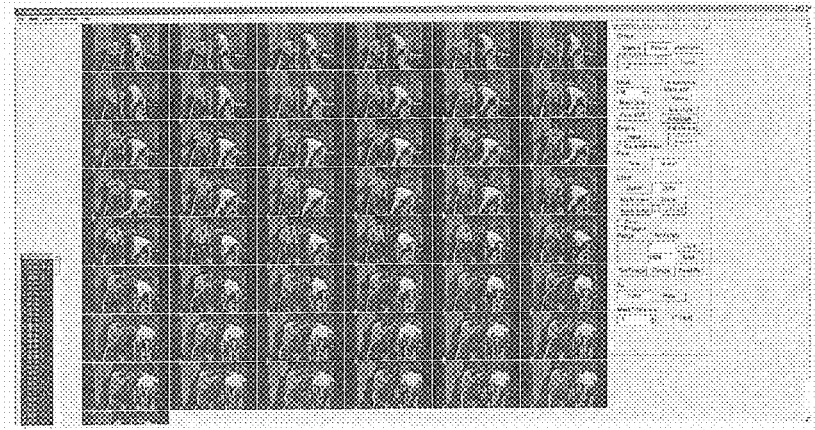
FIG. 35 shows the sequential frames in the static camera scene cut after the background mask information has been applied to each frame with appropriate offsets and where there is no pre-existing mask information.

FIG. 35 shows the sequential frames in the static camera scene cut after the background mask information has been applied to each frame with appropriate offsets and where there is no pre-existing mask information.

Figure 36:
FIG. 36 shows a representative sample of frames from the static camera scene cut after the background information has been applied with appropriate offsets and where there is no pre-existing mask information.
Figure 37A:
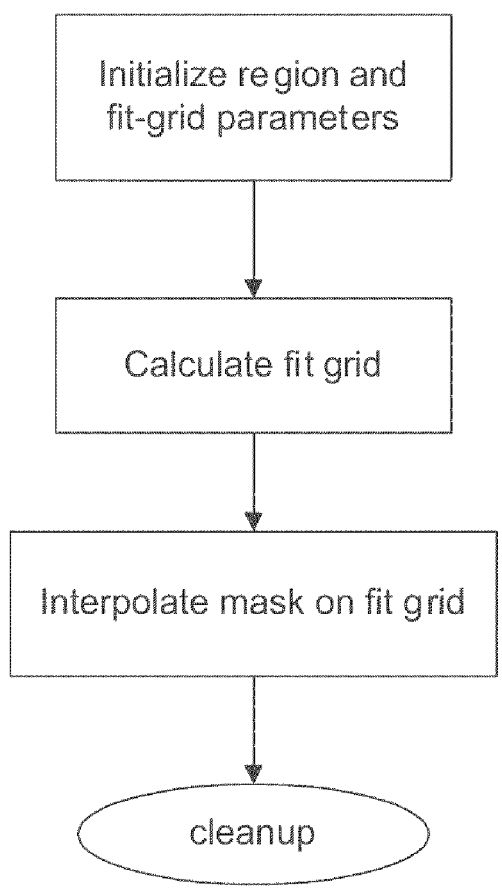
FIGS. 37A-C show embodiments of the Mask Fitting functions, including calculate fit grid and interpolate mask on fit grid.
Figure 37B:
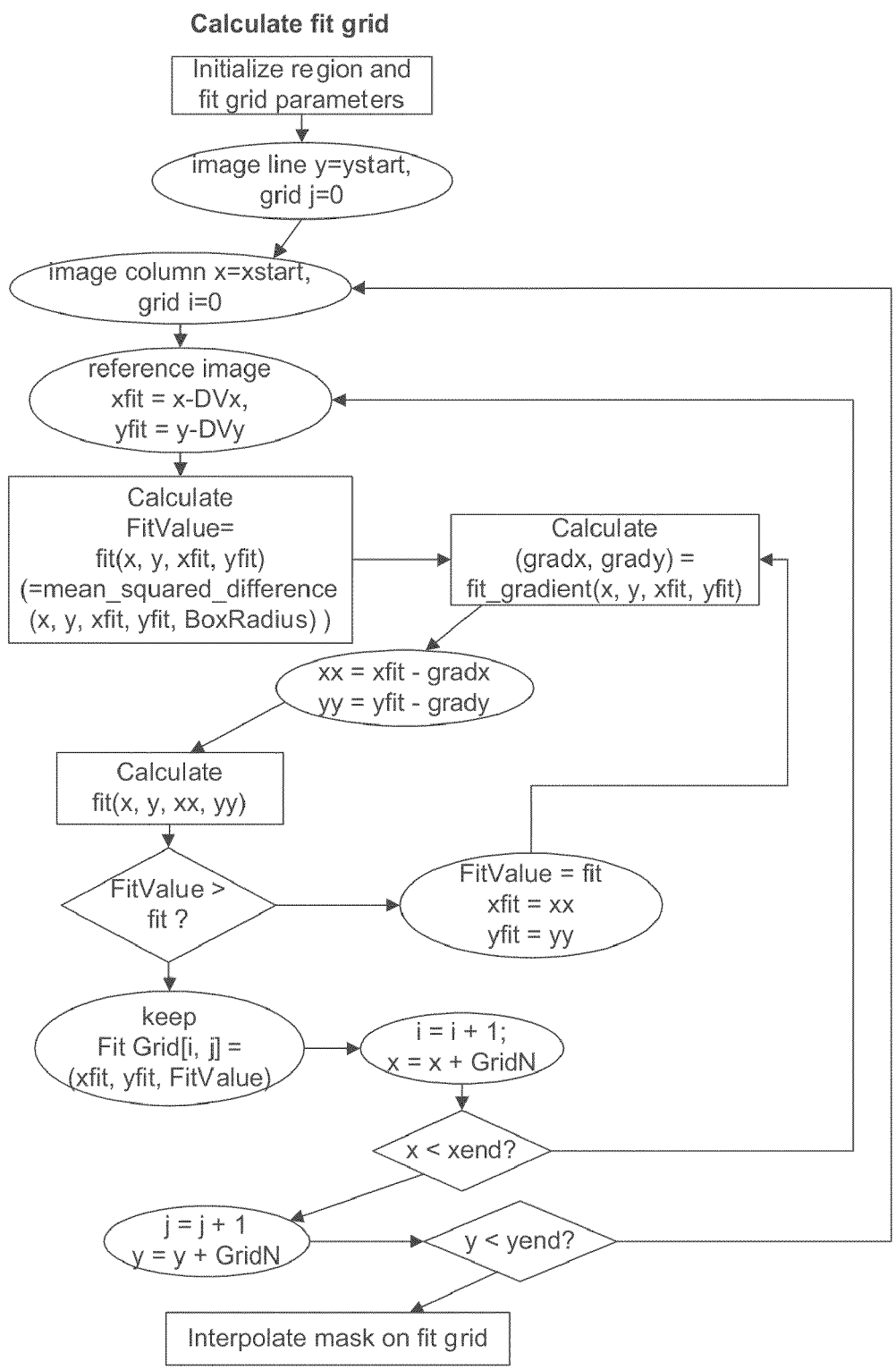
Figure 37C:
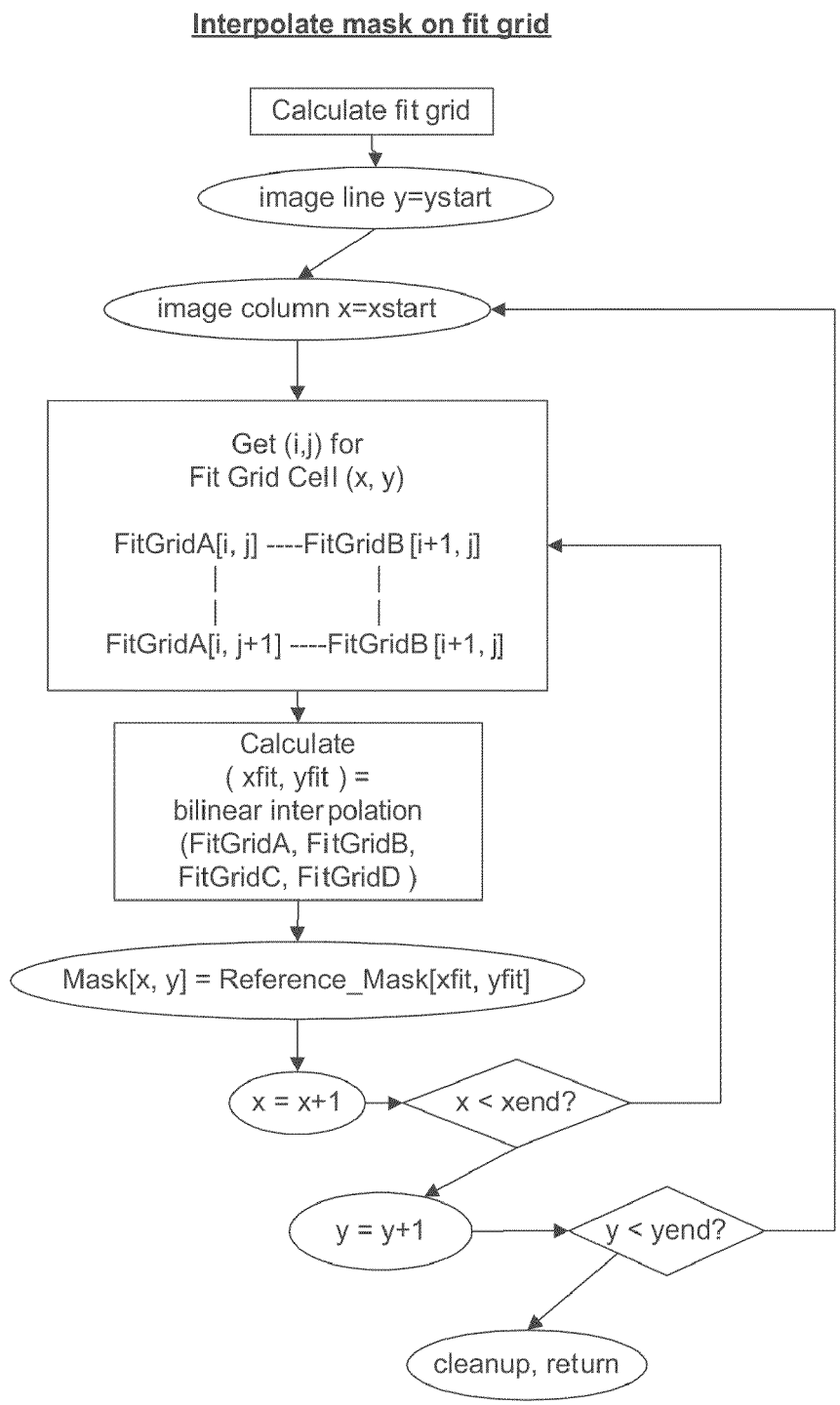
Figure 38A:
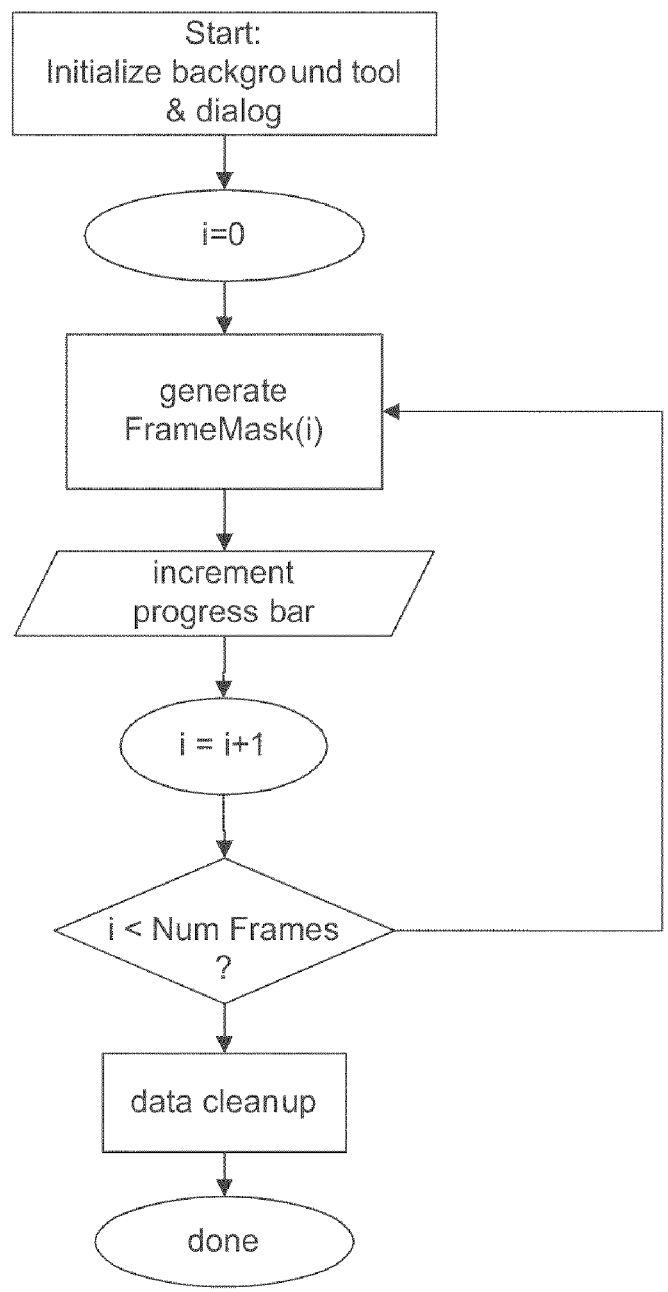
FIGS. 38A-B show embodiments of the extract background functions.
Figure 38B:
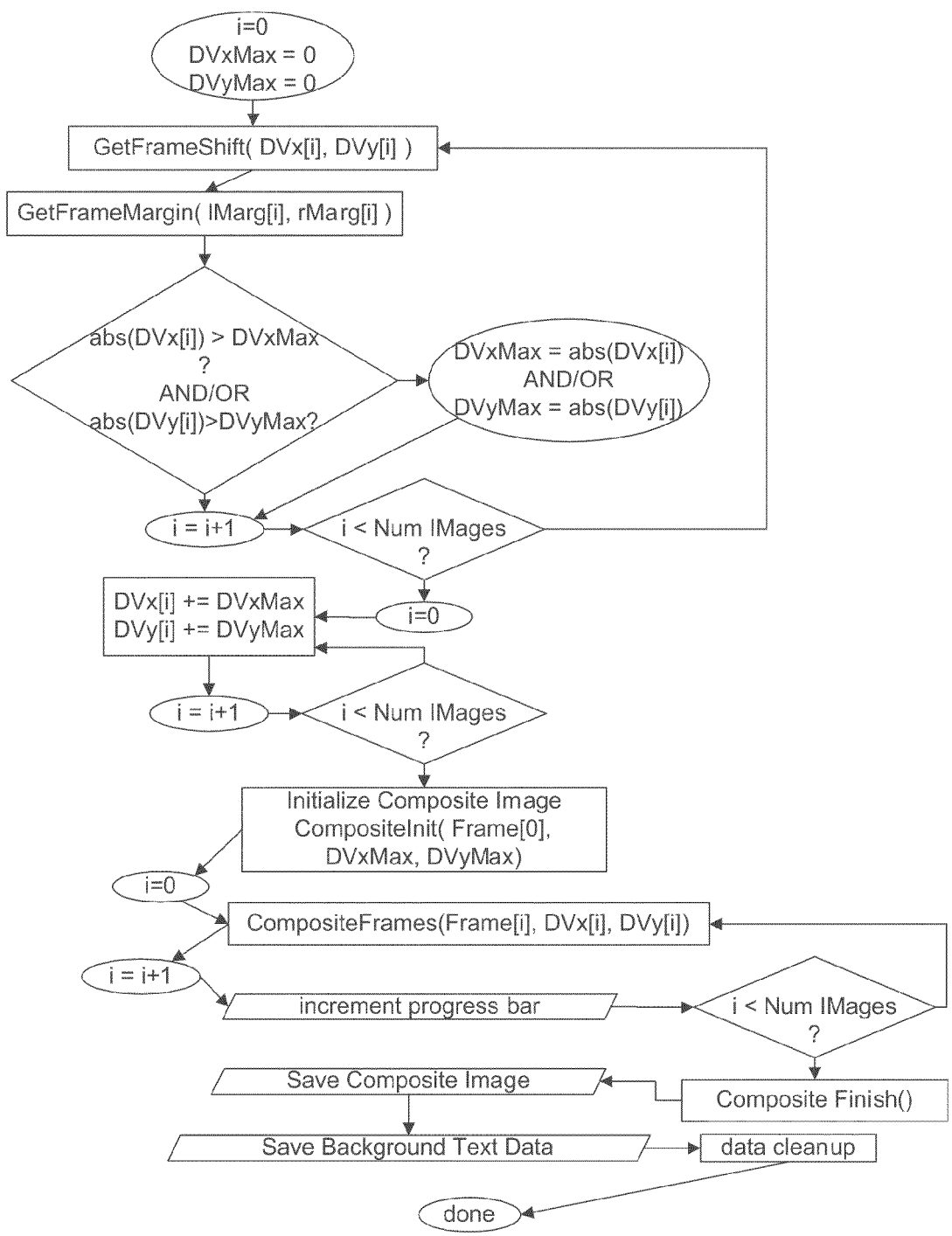

FIG. 36 shows a representative sample of frames from the static camera scene cut after the background information has been applied with appropriate offsets and where there is no pre-existing mask information.

Colorization Rendering: After color processing is completed for each scene, subsequent or sequential color motion masks and related lookup tables are combined within 24-bit or 48-bit RGB color space and rendered as TIF or TGA files. These uncompressed, high-resolution images are then rendered to various media such as HDTV, 35 mm negative film (via digital film scanner), or a variety of other standard and non standard video and film formats for viewing and exhibit.

Process Flow:

Digitization, Stabilization and Noise Reduction:

1. 35 mm film is digitized to 1920×1080×10 in any one of several digital formats.

2. Each frame undergoes standard stabilization techniques to minimize natural weaving motion inherent in film as it traverses camera sprockets as well as any appropriate digital telecine technology employed. Frame-differencing techniques are also employed to further stabilize image flow.

3. Each frame then undergoes noise reduction to minimize random film grain and electronic noise that may have entered into the capture process.

Pre-Production Movie Dissection into Camera Elements and Visual Database Creation:

1. Each scene of the movie is broken down into background and foreground elements as well as movement objects using various subtraction, phase correlation and focal length estimation algorithms.

2. Backgrounds and foreground elements m pans are combined into a single frame using uncompensated (lens) stitching routines.

3. Foregrounds are defined as any object and/or region that move in the same direction as the background but may represent a faster vector because of its proximity to the camera lens. In this method pans are reduced to a single representative image, which contains all of the background and foreground information taken from a plurality of frames.

4. Zooms are sometimes handled as a tiled database in which a matrix is applied to key frames where vector points of reference correspond to feature points in the image and correspond to feature points on the applied mask on the composited mask encompassing any distortion.

5. A database is created from the frames making up the single representative or composited frame (i.e., each common and novel pixel during a pan is assigned to the plurality of frames from which they were derived or which they have in common).

6. In this manner, a mask overlay representing an underlying lookup table will be correctly assigned to the respective novel and common pixel representations of backgrounds and foregrounds in corresponding frames.

Pre-Production Design Background Design:

1. Each entire background is colorized/depth assigned as a single frame in which all motion objects are removed. Background masking is accomplished using a routine that employs standard paint, fill, digital airbrushing, transparency, texture mapping, and similar tools. Color selection is accomplished using a 24-bit color lookup table automatically adjusted to match the density of the underlying gray scale and luminance. Depth assignment is accomplished via assigning depths, assigning geometric shapes, entry of numeric values with respect to objects, or in any other manner in the single composite frame. In this way creatively selected colors/depths are applied that are appropriate for mapping to the range of gray scale/depth underlying each mask. The standard color wheel used to select color ranges detects the underlying grayscale dynamic range and determines the corresponding color range from which the designer may choose (i.e., only from those color saturations that will match the grayscale luminance underlying the mask.)

2. Each lookup table allows for a multiplicity of colors applied to the range of gray scale values underlying the mask. The assigned colors will automatically adjust according to luminance and/or according to pre-selected color vectors compensating for changes in the underlying gray scale density and luminance.

Pre-Production Design Motion Element Design:

1. Design motion object frames are created which include the entire scene background as well as a single representative moment of movement within the scene in which all characters and elements within the scene are present. These moving non-background elements are called Design Frame Objects (DFO).

2. Each DFO is broken down into design regions of interest (regions of interest) with special attention focused on contrasting elements within the DFOs that can be readily be isolated using various gray scale and luminance analyses such as pattern recognition and or edge detection routines. As existing color movies may be utilized for depth enhancement, regions of interest may be picked with color taken into account.

3. The underlying gray scale-and luminance distribution of each masked region is displayed graphically as well as other gray scale analyses including pattern analysis together with a graphical representation of the region's shape with area, perimeter and various weighting parameters.

4. Color selection is determined for each region of interest comprising each object based on appropriate research into the film genre, period, creative intention, etc. and using a 24 bit color lookup table automatically adjusted to match the density of the underlying gray scale and luminance suitable and creatively selected colors are applied. The standard color wheel detects the underlying grayscale range and restricts the designer to choose only from those color saturations that will match the grayscale luminance underlying the mask. Depth assignments may be made or adjusted for depth projects until realistic depth is obtained for example.

5. This process continues until a reference design mask is created for all objects that move in the scene.

Pre-Production Design Key Frame Objects Assistant Designer:

1. Once all color selection/depth assignment is generally completed for a particular scene the design motion object frame is then used as a reference to create the larger number of key frame objects within the scene.

2. Key Frame Objects (all moving elements within the scene such as people, cars, etc that do not include background elements) are selected for masking.

3. The determining factor for each successive key frame object is the amount of new information between one key frame and the next key frame object.

Method of Colorizing/Depth Enhancing Motion Elements in Successive Frames:

1. The Production Colorist (operator) loads a plurality of frames into the display buffer.

2. One of the frames in the display buffer will include a key frame from which the operator obtains all masking information. The operator makes no creative or color/depth decisions since all color transform information is encoded within the key frame masks.

3. The operator can toggle from the colorized or applied lookup tables to translucent masks differentiated by arbitrary but highly contrasting colors.

4. The operator can view the motion of all frames in the display buffer observing the motion that occurs in successive frames or they can step through the motion from one key frame to the next.

5. The operator propagates (copies) the key frame mask information to all frames in the display buffer.

6. The operator then executes the mask fitting routine on each frame successively. The program makes a best fit based on the grayscale/luminance, edge parameters and pattern recognition based on the gray scale and luminance pattern of the key frame or the previous frame in the display.

7. In the event that movement creates large deviations in regions from one frame to the next the operator can select individual regions to mask-fit. The displaced region is moved to the approximate location of the region of interest where the program attempts to create a best fit. This routine continues for each region of interest in succession until all masked regions have been applied to motion objects in all sequential frames in the display memory.

a. The operator clicks on a single mask in each successive frame on the corresponding area where it belongs in frame 2. The computer makes a best fit based on the grayscale/luminance, edge parameters, gray scale pattern and other analysis.

b. This routine continues for each region in succession until all regions of interest have been repositioned in frame two.

c. The operator then indicates completion with a mouse click and masks in frame two are compared with gray scale parameters in frame three.

d. This operation continues until all motion in all frames between two or more key frames is completely masked.

8. Where there is an occlusion, a modified best-fit parameter is used. Once the occlusion is passed, the operator uses the pre-occlusion frame as a reference for the post occlusion frames.

9. After all motion is completed, the background/set mask is applied to each frame in succession. Application is: apply mask where no mask exists.

10. Masks for motion objects can also be animated using either bezier curves or polygons that enclose a region of interest.

a. A plurality of frames are loaded into display memory and either bezier points and curves of polygon points are applied close to the region of interest where the points automatically snap to edges detected within the image data.

b. Once the object in frame one has been enclosed by the polygon or bezier curves the operator adjusts the polygon or bezier in the last frame of the frames loaded in display memory.

c. The operator then executes a fitting routine, which snaps the polygons or bezier points plus control curves to all intemlediate frames, animating the mask over all frames in display memory.

d. The polygon and bezier algorithms include control points for rotation, scaling and move-all to handle zooms, pans and complex camera moves where necessary.

Figure 42:
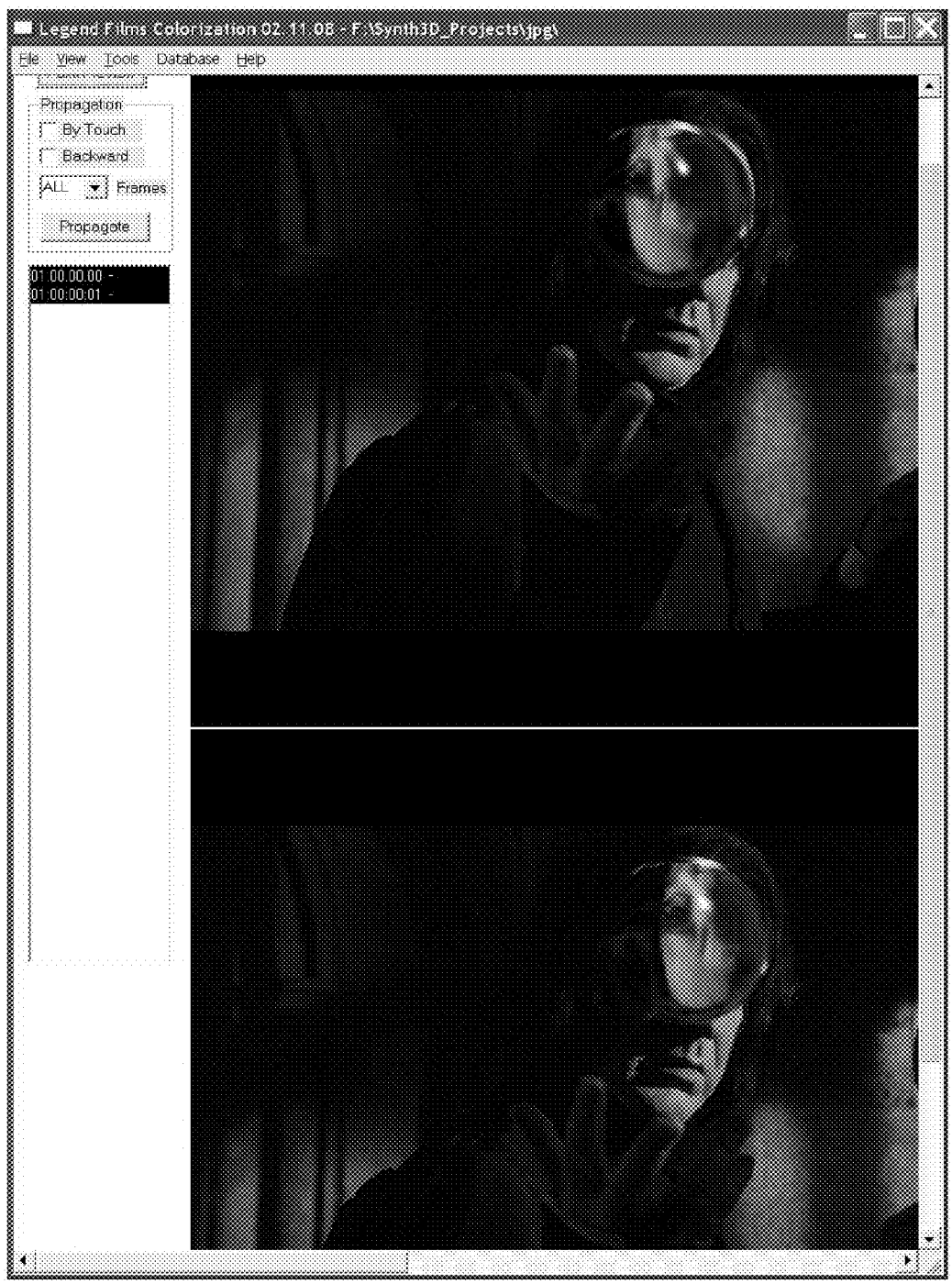
FIG. 42 shows two image frames that are separated in time by several frames, of a person levitating a crystal ball wherein the various objects in the image frames are to be converted from two-dimensional objects to three-dimensional objects.

FIG. 42 shows two image frames that are separated in time by several frames, of a person levitating a crystal ball wherein the various objects in the image frames are to be converted from two-dimensional objects to three-dimensional objects. As shown the crystal ball moves with respect to the first frame (shown on top) by the time that the second frame (shown on the bottom) occurs. As the frames are associated with one another, although separated in time, much of the masking information can be utilized for both frames, as reshaped using embodiments of the invention previously described above. For example, using the mask reshaping techniques described above for colorization, i.e., using the underlying grey-scale for tracking and reshaping masks, much of the labor involved with converting a two-dimensional movie to a three-dimensional movie is eliminated. This is due to the fact that once key frames have color or depth information applied to them, the mask information can be propagated automatically throughout a sequence of frames which eliminates the need to adjust wire frame models for example. Although there are only two images shown for brevity, these images are separated by several other images in time as the crystal ball slowly moves to the right in the sequence of images.

Figure 43:
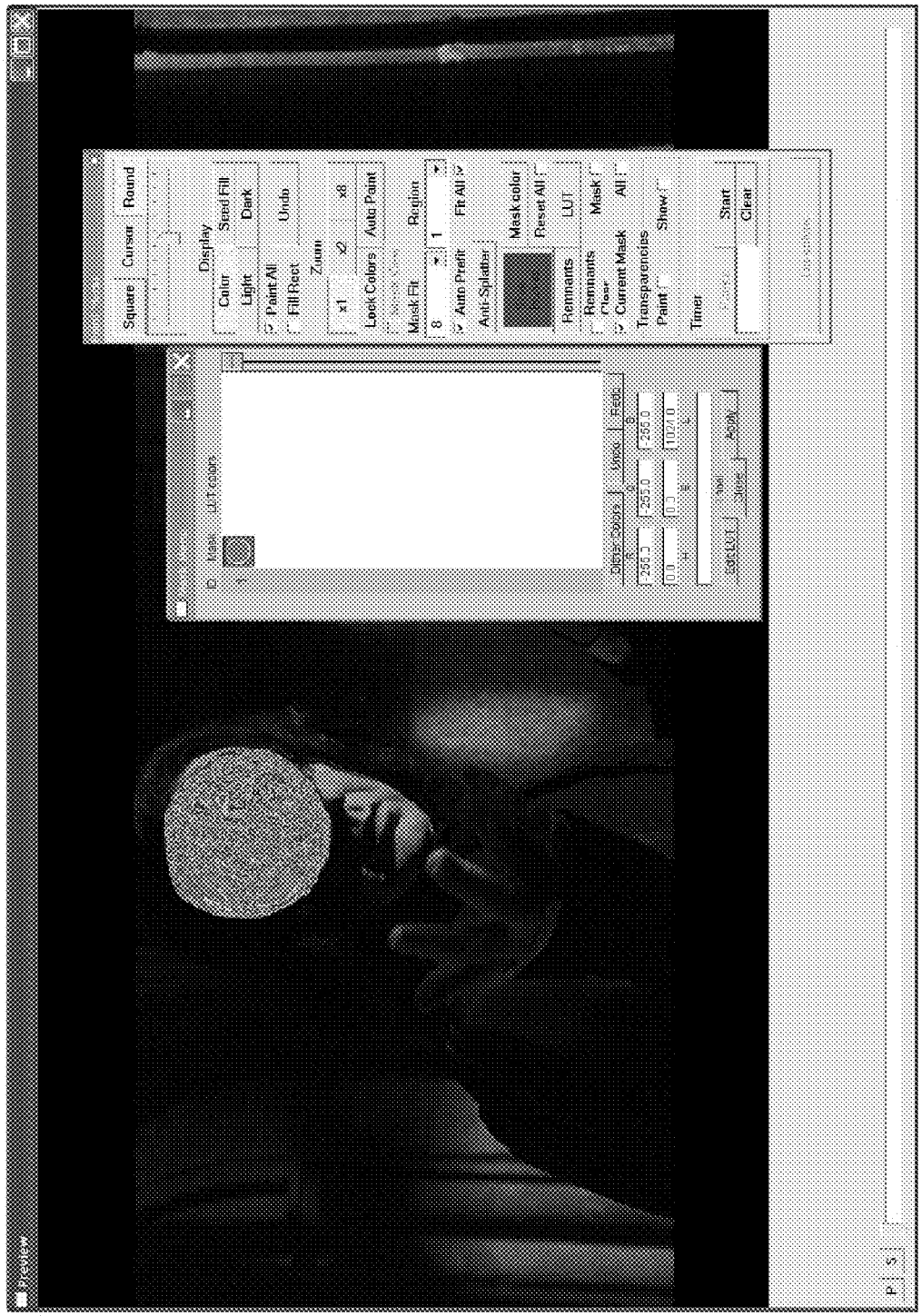
FIG. 43 shows the masking of the first object in the first image frame that is to be converted from a two-dimensional image to a three-dimensional image.

FIG. 43 shows the masking of the first object in the first image frame that is to be converted from a two-dimensional image to a three-dimensional image. In this figure, the first object masked is the crystal ball. There is no requirement to mask objects in any order. In this case a simple free form drawing tool is utilized to apply a somewhat round mask to the crystal ball. Alternatively, a circle mask may be dropped on the image and resized and translated to the correct position to correspond to the round crystal ball. However, since most objects masked are not simple geometric shapes, the alternative approach is shown herein. The grey-scale values of the masked object are thus utilized to reshape the mask in subsequent frames.

Figure 44:
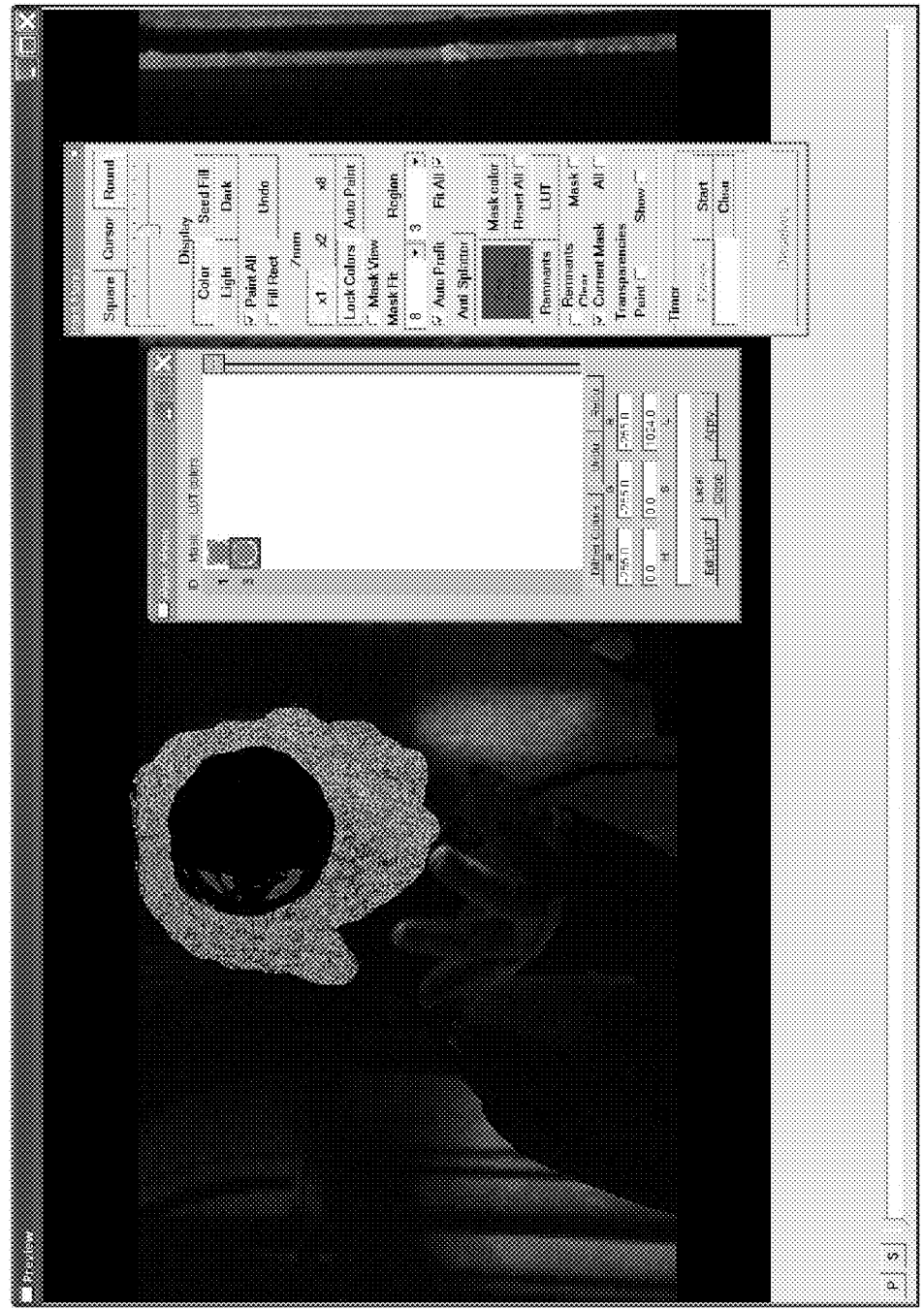
FIG. 44 shows the masking of the second object in the first image frame.

FIG. 44 shows the masking of the second object in the first image frame. In this figure, the hair and face of the person behind the crystal ball are masked as the second object using a free form drawing tool. Edge detection or grey-scale thresholds can be utilized to accurately set the edges of the masks as has been previously described above with respect to colorization. There is no requirement that an object be a single object, i.e., the hair and face of a person can be masked as a single item, or not and depth can thus be assigned to both or individually as desired.

Figure 45:
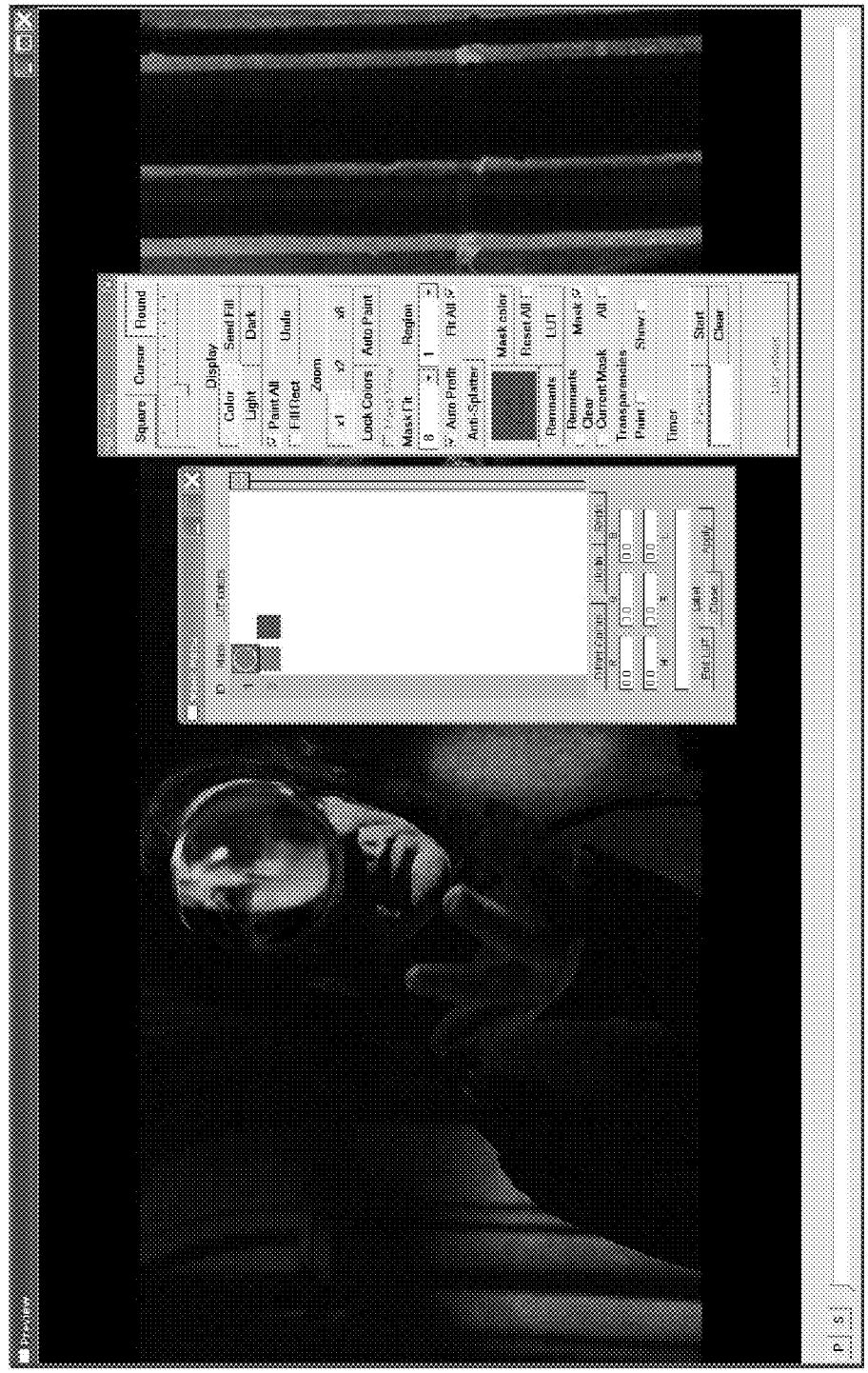
FIG. 45 shows the two masks in color in the first image frame allowing for the portions associated with the masks to be viewed.

FIG. 45 shows the two masks in color in the first image frame allowing for the portions associated with the masks to be viewed. This figure shows the masks as colored transparent masks so that the masks can be adjusted if desired.

Figure 46:
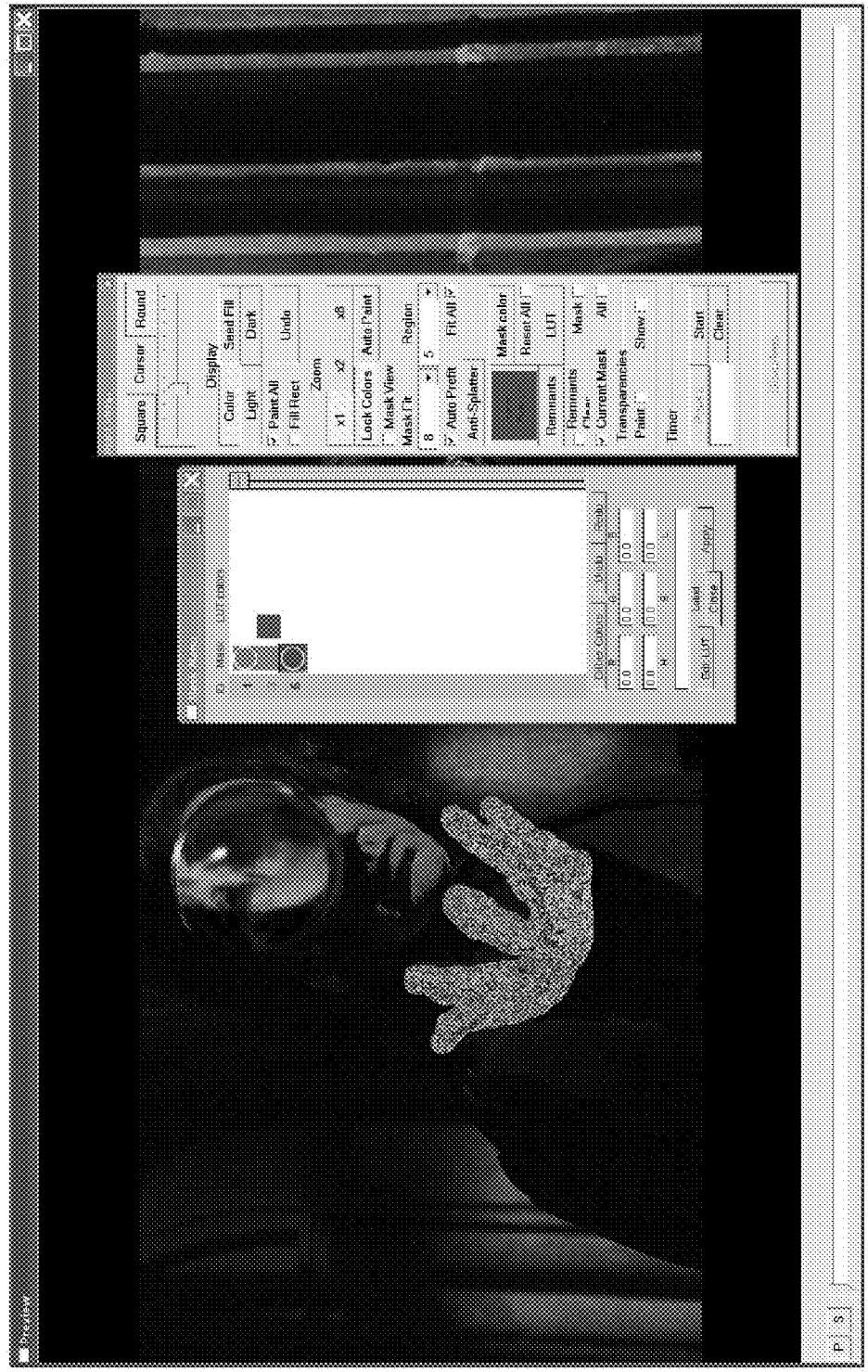
FIG. 46 shows the masking of the third object in the first image frame.

FIG. 46 shows the masking of the third object in the first image frame. In this figure the hand is chosen as the third object. A free form tool is utilized to define the shape of the mask.

Figure 47:
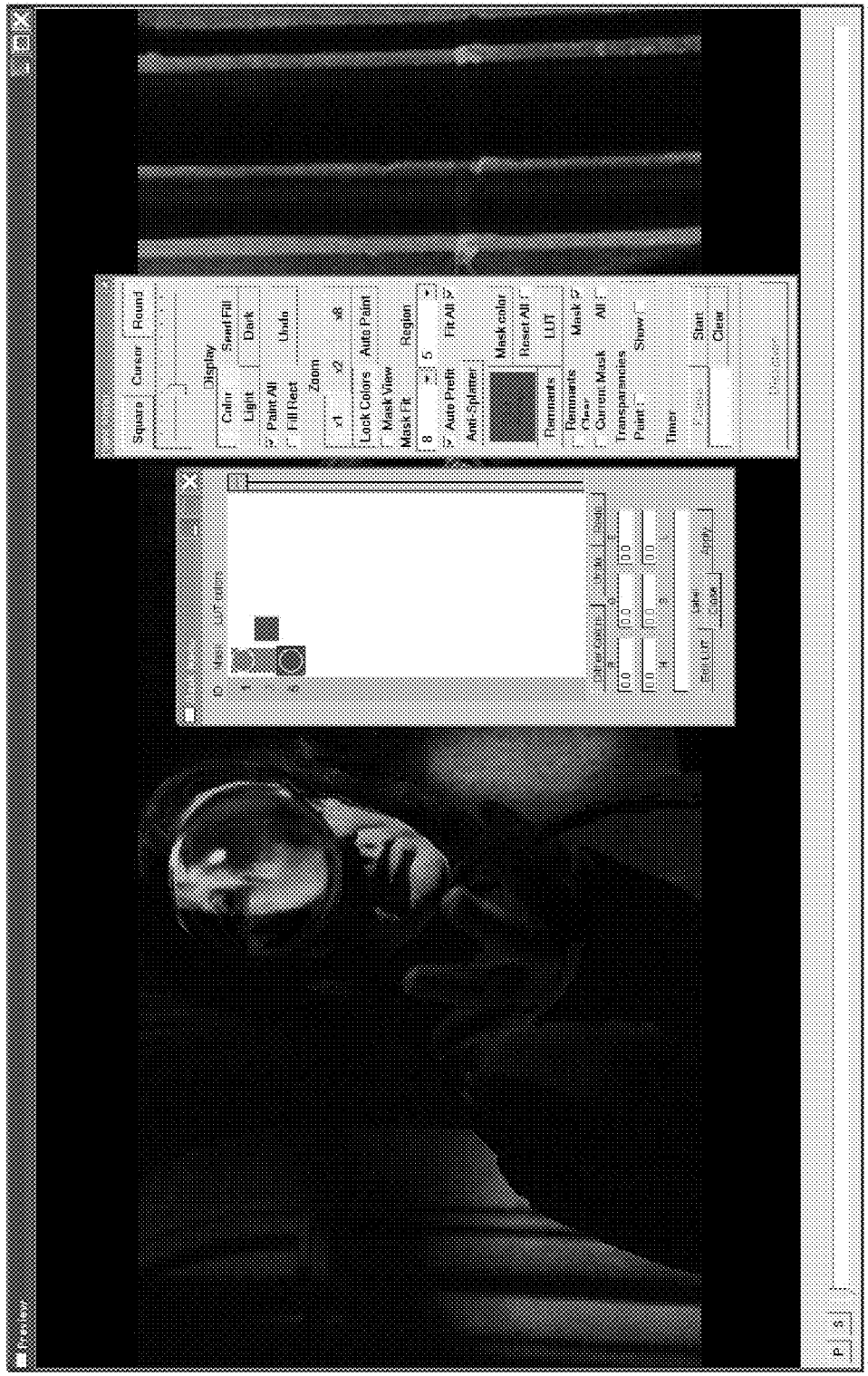
FIG. 47 shows the three masks in color in the first image frame allowing for the portions associated with the masks to be viewed.

FIG. 47 shows the three masks in color in the first image frame allowing for the portions associated with the masks to be viewed. Again, the masks can be adjusted if desired based on the transparent masks.

Figure 48:
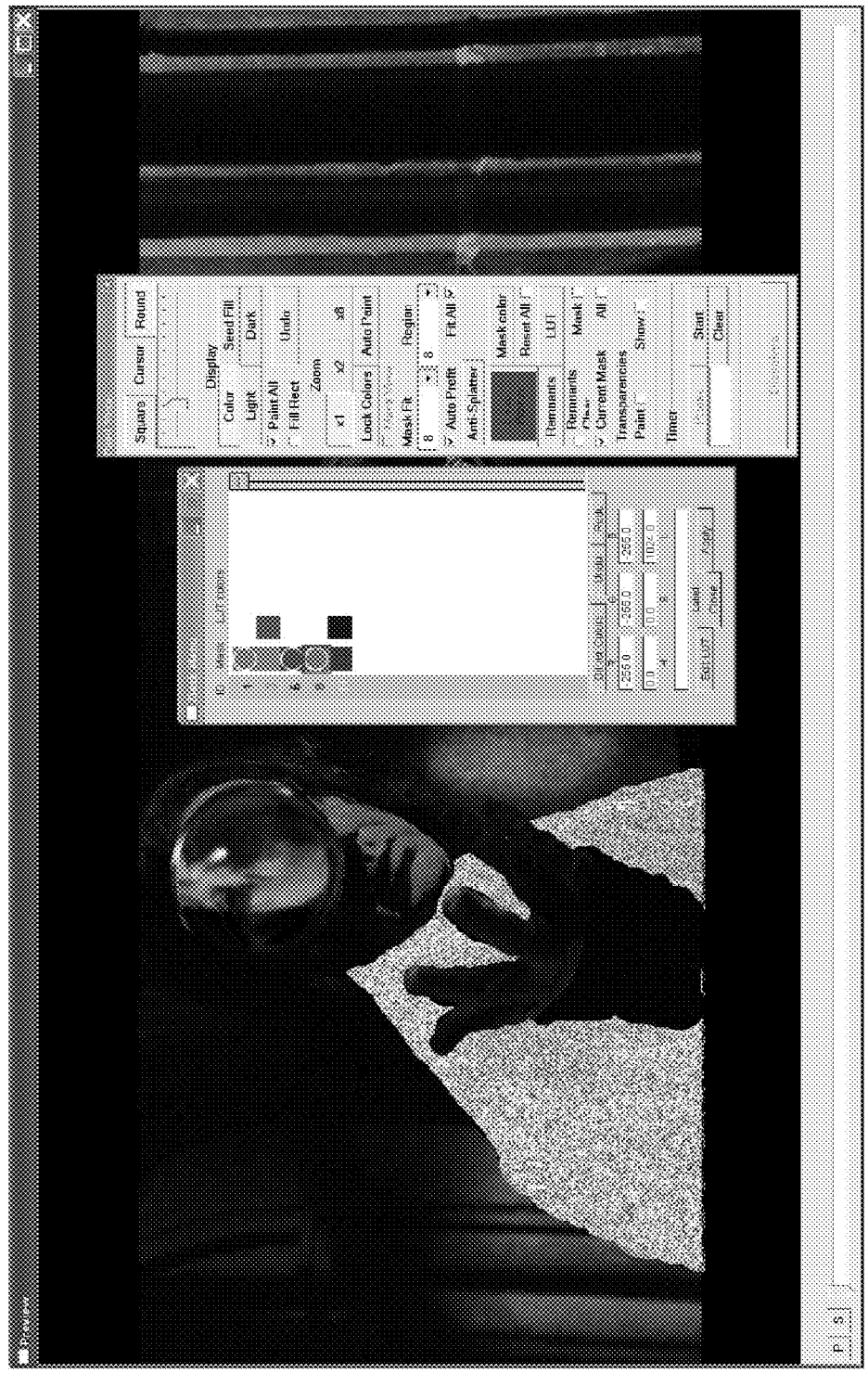
FIG. 48 shows the masking of the fourth object in the first image frame.

FIG. 48 shows the masking of the fourth object in the first image frame. As shown the person's jacket form the fourth object.

Figure 49:
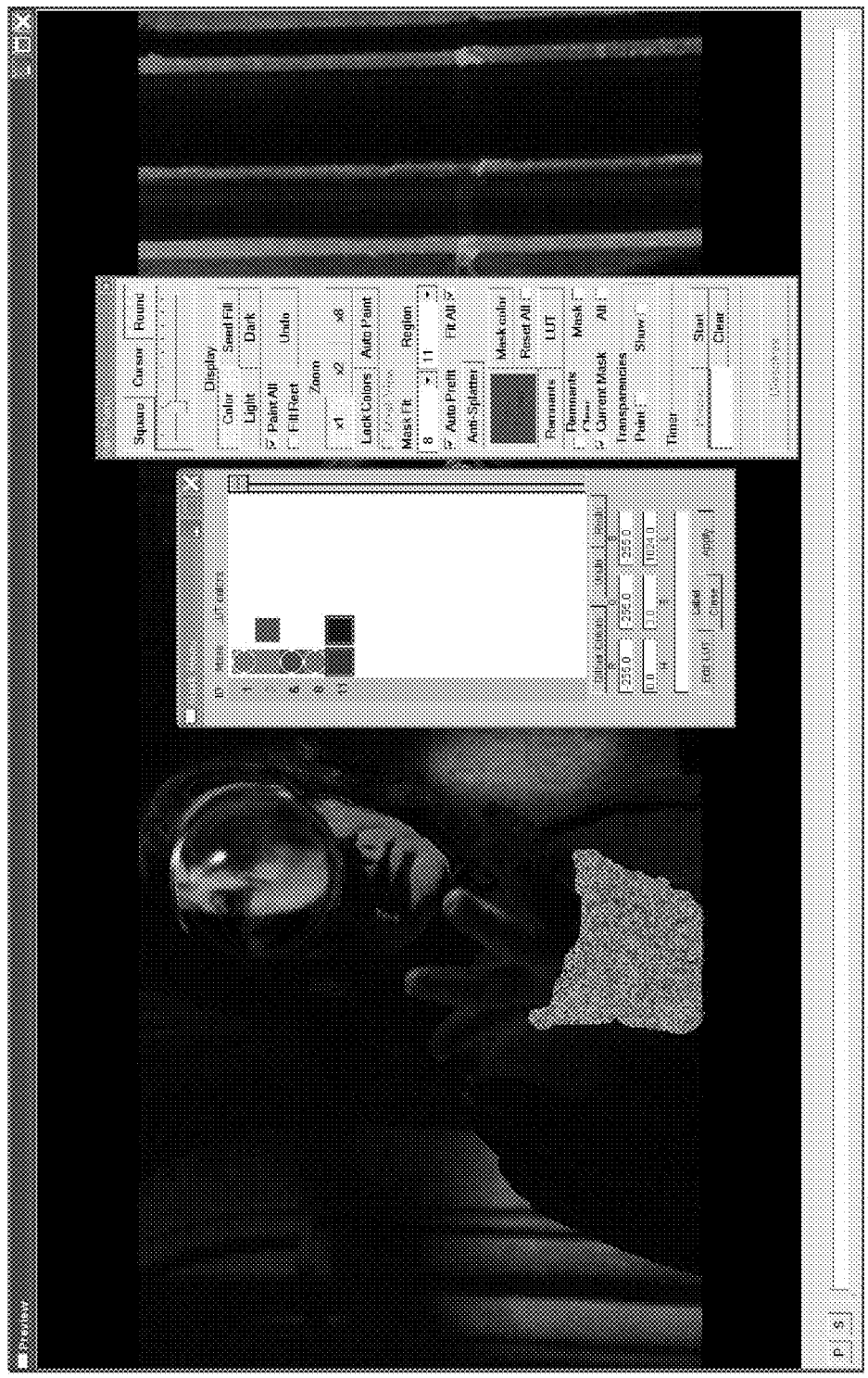
FIG. 49 shows the masking of the fifth object in the first image frame.

FIG. 49 shows the masking of the fifth object in the first image frame. As shown the person's sleeve forms the fifth object.

Figure 50:
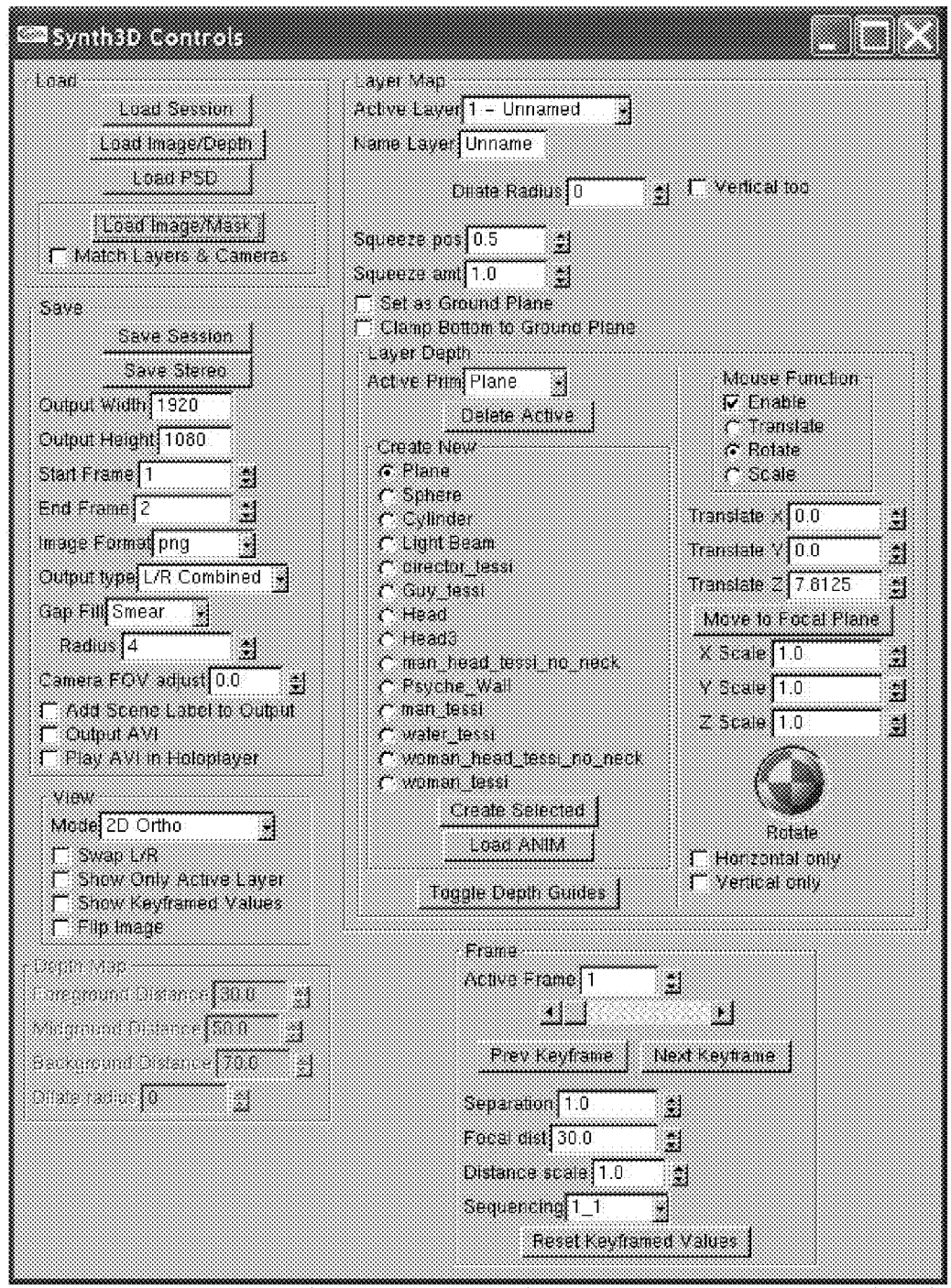
FIG. 50 shows a control panel for the creation of three-dimensional images, including the association of layers and three-dimensional objects to masks within an image frame, specifically showing the creation of a Plane layer for the sleeve of the person in the image.

FIG. 50 shows a control panel for the creation of three-dimensional images, including the association of layers and three-dimensional objects to masks within an image frame, specifically showing the creation of a Plane layer for the sleeve of the person in the image. On the right side of the screendump, the "Rotate" button is enabled, shown a "Translate Z" rotation quantity showing that the sleeve is rotated forward as is shown in the next figure.

Figure 51:
FIG. 51 shows a three-dimensional view of the various masks shown in FIGS. 43-49, wherein the mask associated with the sleeve of the person is shown as a Plane layer that is rotated toward the left and right viewpoints on the right of the page.

FIG. 51 shows a three-dimensional view of the various masks shown in FIGS. 43-49, wherein the mask associated with the sleeve of the person is shown as a Plane layer that is rotated toward the left and right viewpoints on the right of the page. Also, as is shown the masks associated with the jacket and person's face have been assigned a Z-dimension or depth that is in front of the background.

Figure 52:
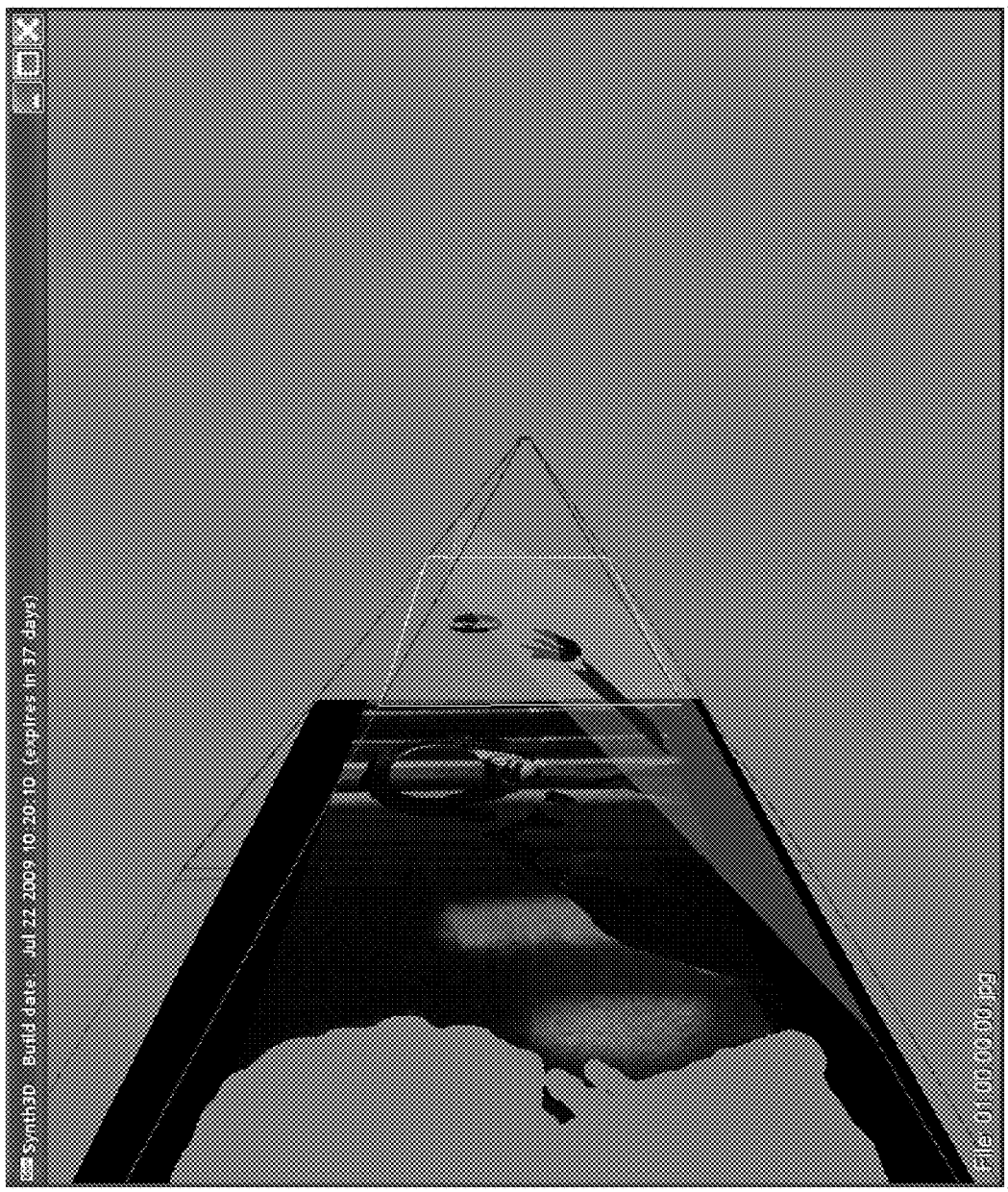
FIG. 52 shows a slightly rotated view of FIG. 51.

FIG. 52 shows a slightly rotated view of FIG. 51. This figure shows the Plane layer with the rotated sleeve tilted toward the viewpoints. The crystal ball is shown as a flat object, still in two-dimensions as it has not yet been assigned a three-dimensional object type.

Figure 53:
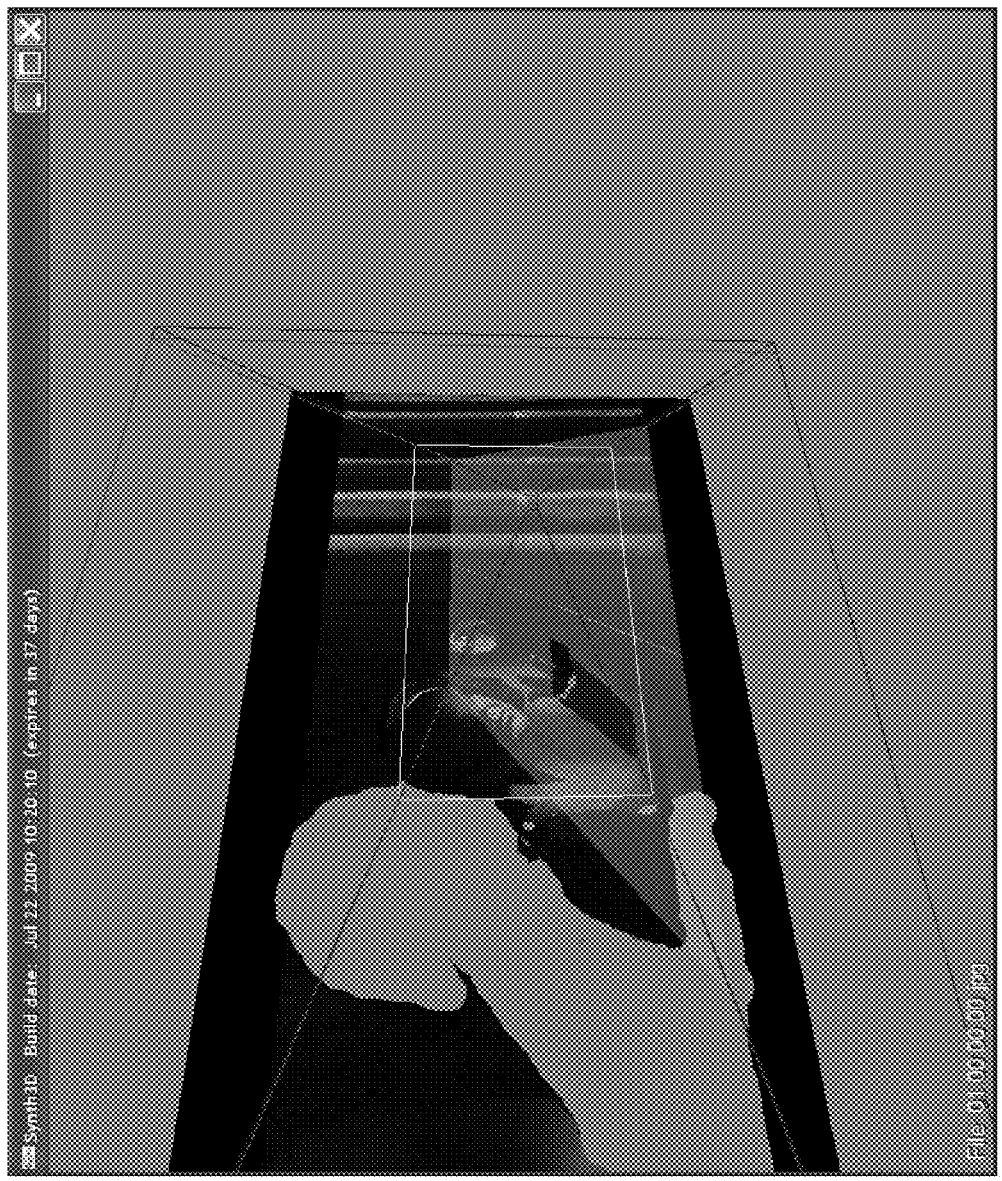
FIG. 53 shows a slightly rotated view of FIG. 51.

FIG. 53 shows a slightly rotated view of FIGS. 51 (and 52), wherein the sleeve is shown tilting forward, again without ever defining a wire frame model for the sleeve. Alternatively, a three-dimensional object type of column can be applied to the sleeve to make an even more realistically three-dimensional shaped object. The Plane type is shown here for brevity.

Figure 54:
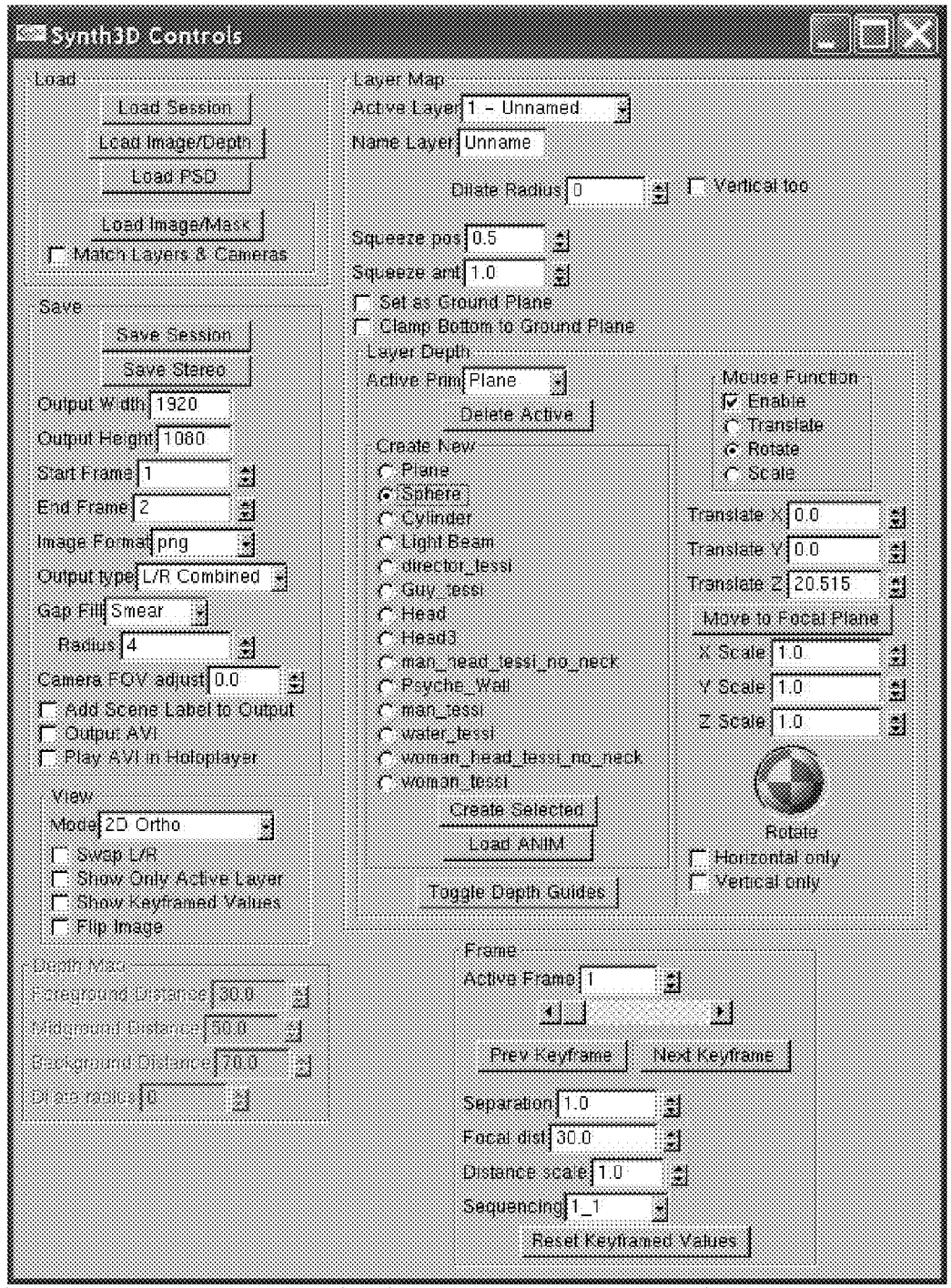
FIG. 54 shows a control panel specifically showing the creation of a sphere object for the crystal ball in front of the person in the image.

FIG. 54 shows a control panel specifically showing the creation of a sphere object for the crystal ball in front of the person in the image. In this figure, the Sphere three-dimensional object is created and dropped into the three-dimensional image by clicking the "create selected" button in the middle of the frame, which is then shown (after translation and resizing onto the crystal ball in the next figure).

Figure 55:
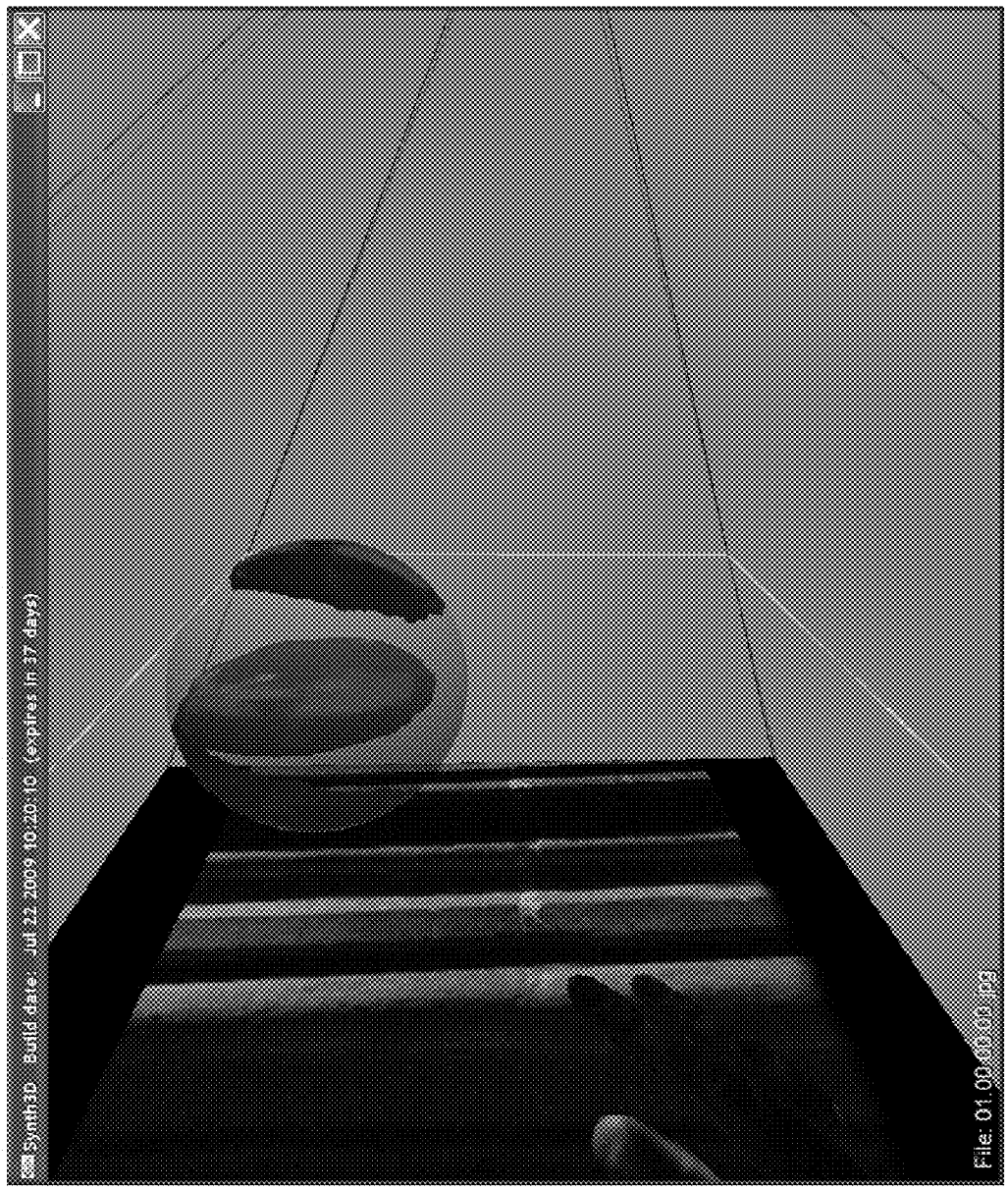
FIG. 55 shows the application of the sphere object to the flat mask of the crystal ball, that is shown within the sphere and as projected to the front and back of the sphere to show the depth assigned to the crystal ball.

FIG. 55 shows the application of the sphere object to the flat mask of the crystal ball, that is shown within the sphere and as projected to the front and back of the sphere to show the depth assigned to the crystal ball. The Sphere object can be translated, i.e., moved in three axis, and resized to fit the object that it is associated with. The projection of the crystal ball onto the sphere shows that the Sphere object is slightly larger than the crystal ball, however this ensures that the full crystal ball pixels are assigned depths. The Sphere object can be resized to the actual size of the sphere as well for more refined work projects as desired.

Figure 56:
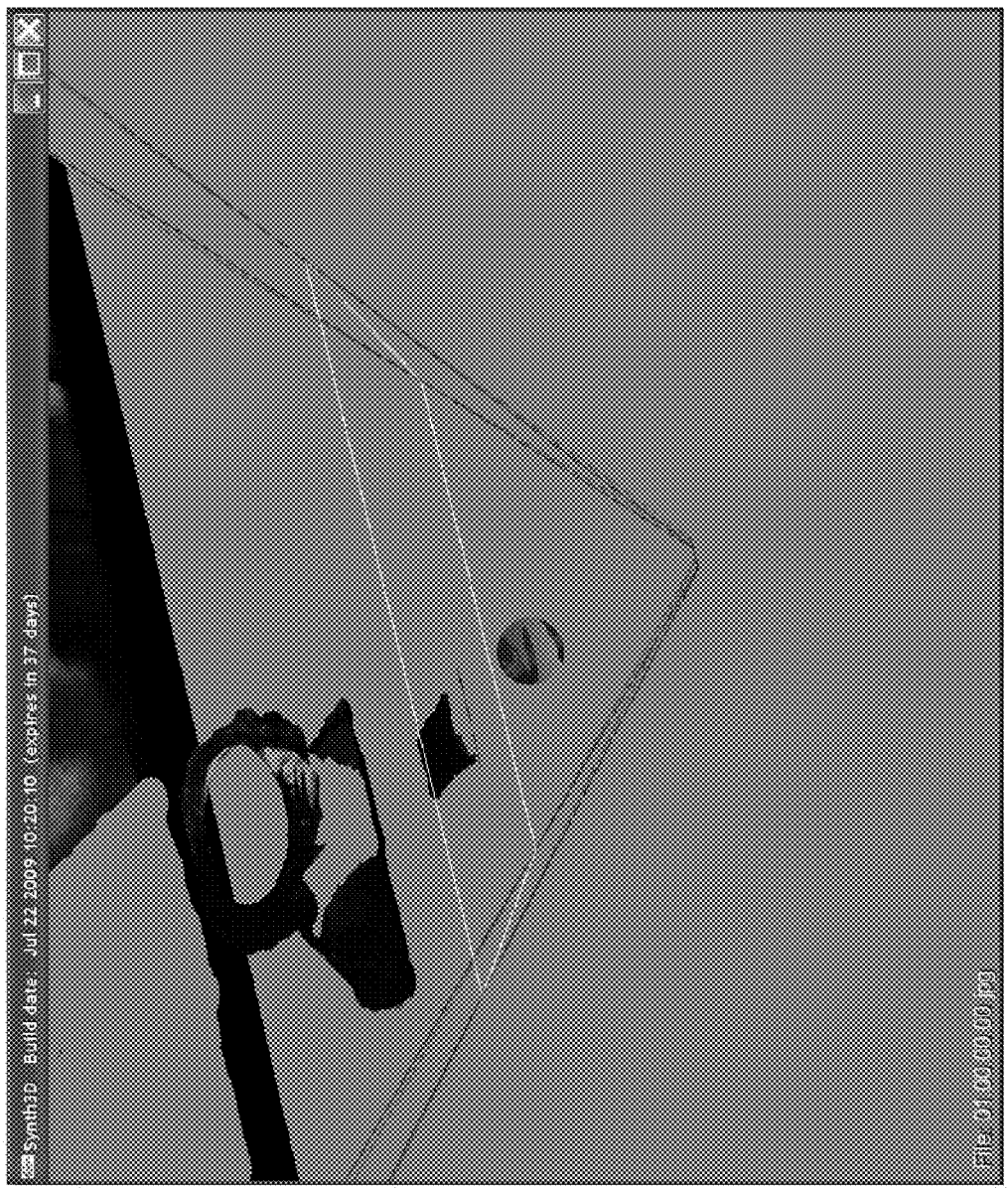
FIG. 56 shows a top view of the three-dimensional representation of the first image frame showing the Z-dimension assigned to the crystal ball shows that the crystal ball is in front of the person in the scene.

FIG. 56 shows a top view of the three-dimensional representation of the first image frame showing the Z-dimension assigned to the crystal ball shows that the crystal ball is in front of the person in the scene.

Figure 57:
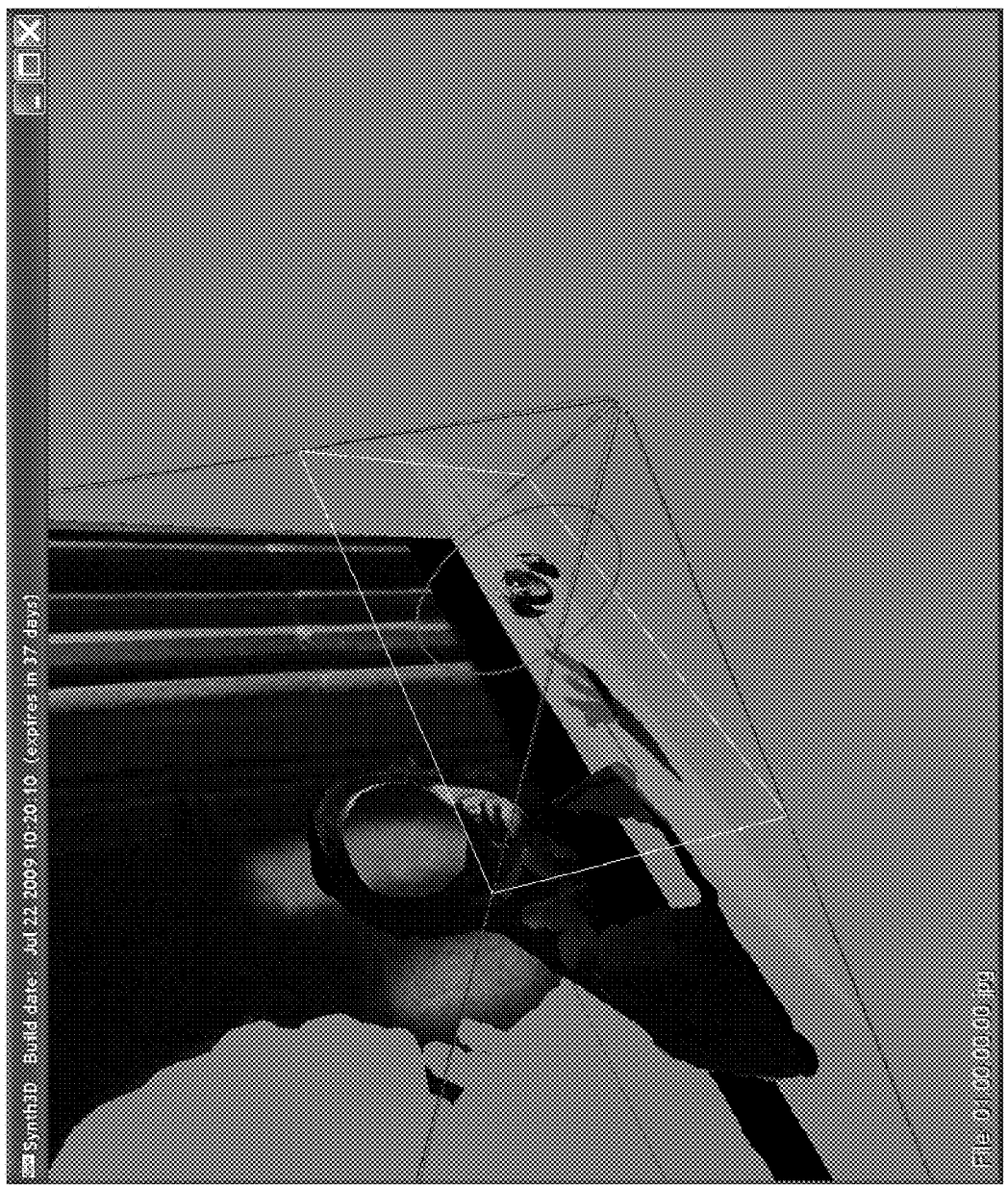
FIG. 57 shows that the sleeve plane rotating in the X-axis to make the sleeve appear to be coming out of the image more.

FIG. 57 shows that the sleeve plane rotating in the X-axis to make the sleeve appear to be coming out of the image more. The circle with a line (X axis line) projecting through it defines the plane of rotation of the three-dimensional object, here a plane associated with the sleeve mask.

Figure 58:
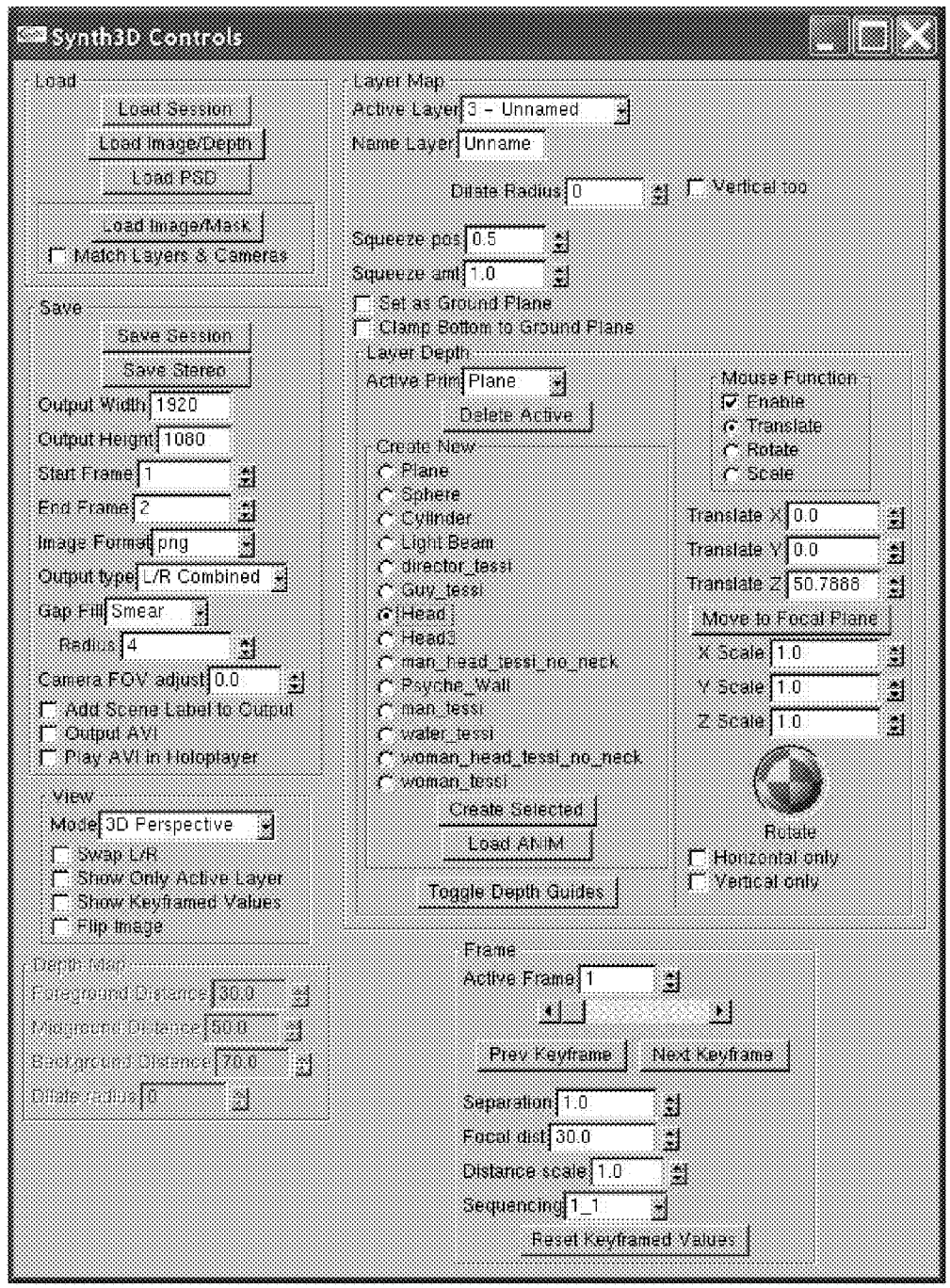
FIG. 58 shows a control panel specifically showing the creation of a Head object for application to the person's face in the image, i.e., to give the person's face realistic depth without requiring a wire model for example.

FIG. 58 shows a control panel specifically showing the creation of a Head object for application to the person's face in the image, i.e., to give the person's face realistic depth without requiring a wire model for example. The Head object is created using the "Created Selected" button in the middle of the screen and is shown in the next figure.

Figure 59:
FIG. 59 shows the Head object in the three-dimensional view, too large and not aligned with the actual person's head.

FIG. 59 shows the Head object in the three-dimensional view, too large and not aligned with the actual person's head. After creating the Head object as per FIG. 58, the Head object shows up in the three-dimensional view as a generic depth primitive that is applicable to heads in general. This is due to the fact that depth information is not exactly required for the human eye. Hence, in depth assignments, generic depth primitives may be utilized in order to eliminate the need for three-dimensional wire frames. The Head object is translated, rotated and resized in subsequent figures as detailed below.

Figure 60:
FIG. 60 shows the Head object in the three-dimensional view, resized to fit the person's face and aligned, e.g., translated to the position of the actual person's head.

FIG. 60 shows the Head object in the three-dimensional view, resized to fit the person's face and aligned, e.g., translated to the position of the actual person's head.

Figure 61:
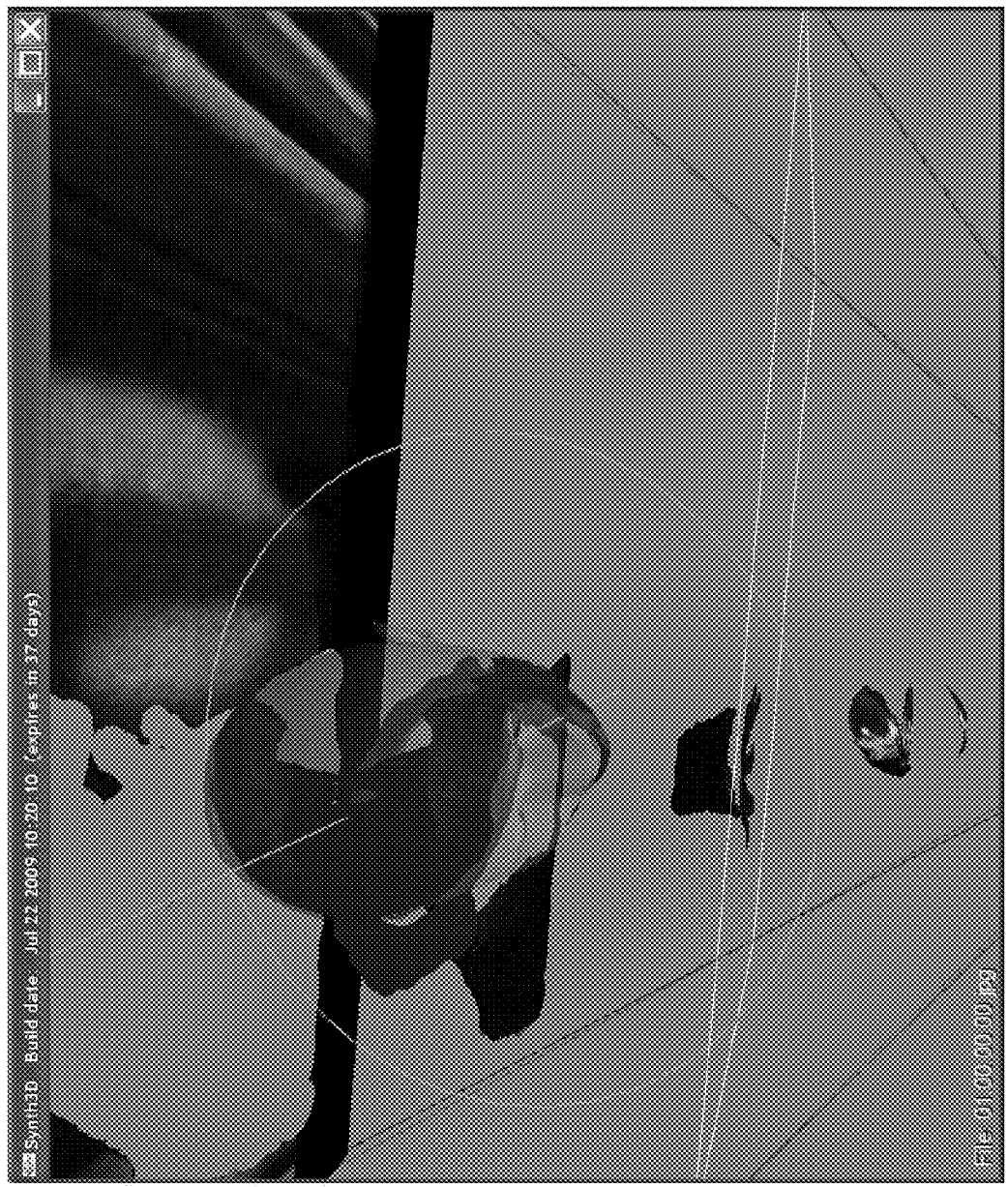
FIG. 61 shows the Head object in the three-dimensional view, with the Y-axis rotation shown by the circle and Y-axis originating from the person's head thus allowing for the correct rotation of the Head object to correspond to the orientation of the person's face.

FIG. 61 shows the Head object in the three-dimensional view, with the Y-axis rotation shown by the circle and Y-axis originating from the person's head thus allowing for the correct rotation of the Head object to correspond to the orientation of the person's face.

Figure 62:
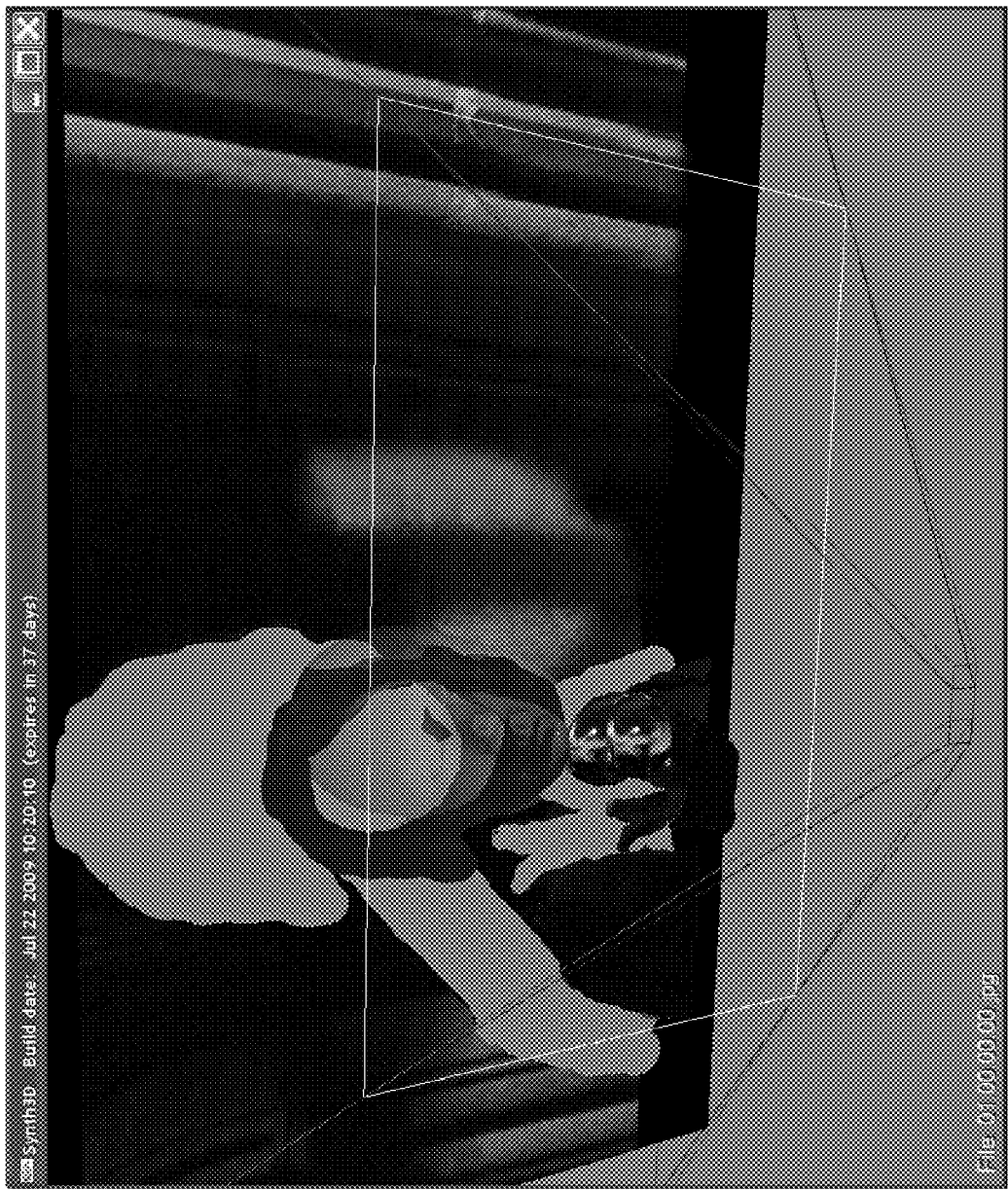
FIG. 62 shows the Head object also rotated slightly clockwise, about the Z-axis to correspond to the person's slightly tilted head.

FIG. 62 shows the Head object also rotated slightly clockwise, about the Z-axis to correspond to the person's slightly tilted head. The mask shows that the face does not have to be exactly lined up for the result three-dimensional image to be believable to the human eye. More exacting rotation and resizing can be utilized where desired.

Figure 63:
FIG. 63 shows the propagation of the masks into the second and final image frame.

FIG. 63 shows the propagation of the masks into the second and final image frame. All of the methods previously disclosed above for moving masks and reshaping them are applied not only to colorization but to depth enhancement as well. Once the masks are propagated into another frame, all frames between the two frames may thus be tweened. By tweening the frames, the depth information (and color information if not a color movie) are thus applied to non-key frames.

Figure 64:
FIG. 64 shows the original position of the mask corresponding to the person's hand.

FIG. 64 shows the original position of the mask corresponding to the person's hand.

Figure 65:
FIG. 65 shows the reshaping of the mask, that can be performed automatically and/or manually, wherein any intermediate frames get the tweened depth information between the first image frame masks and the second image frame masks.

FIG. 65 shows the reshaping of the mask, that is performed automatically and with can be adjusted in key frames manually if desired, wherein any intermediate frames get the tweened depth information between the first image frame masks and the second image frame masks. The automatic tracking of masks and reshaping of the masks allows for great savings in labor. Allowing manual refinement of the masks allows for precision work where desired.

Figure 66:
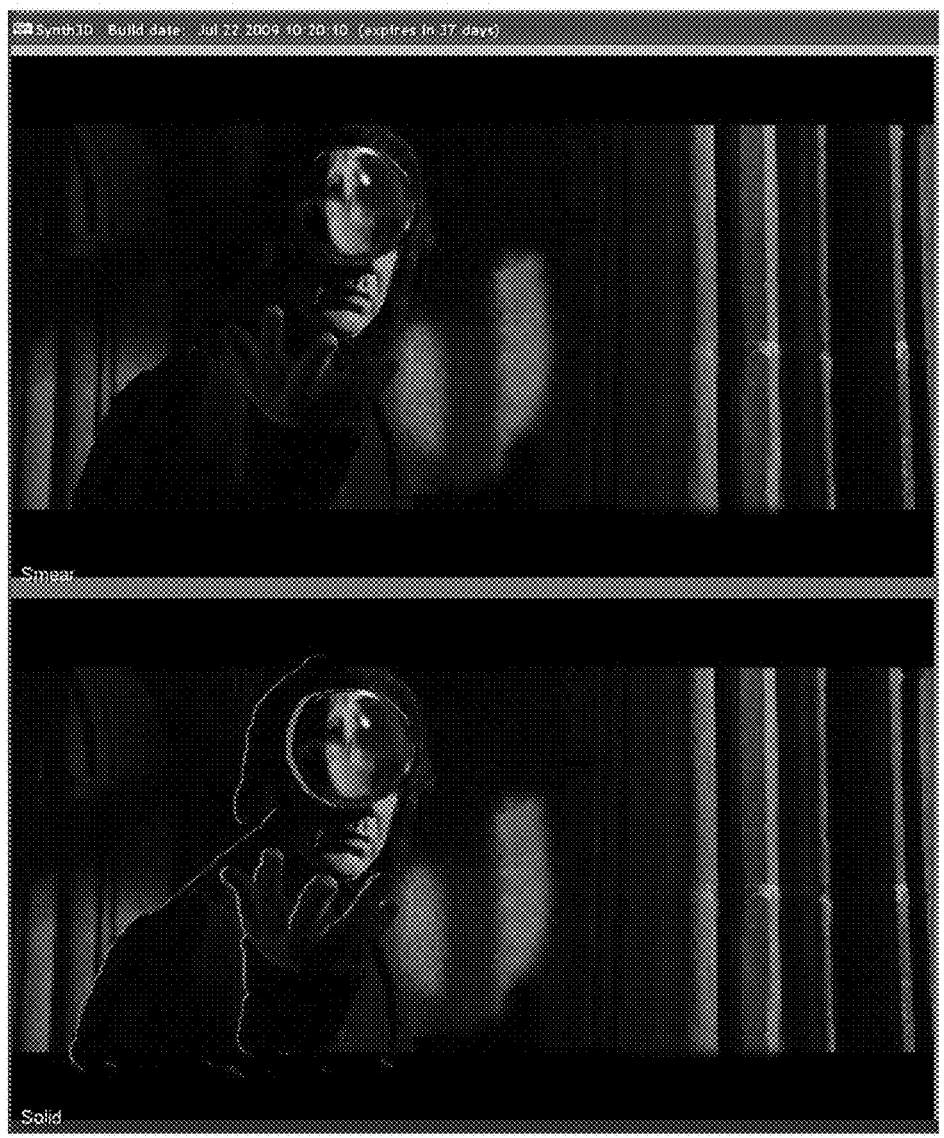
FIG. 66 shows the missing information for the left viewpoint as highlighted in color on the left side of the masked objects in the lower image when the foreground object, here a crystal ball is translated to the right.

FIG. 66 shows the missing information for the left viewpoint as highlighted in color on the left side of the masked objects in the lower image when the foreground object, here a crystal ball is translated to the right. In generating the left viewpoint of the three-dimensional image, the highlighted data must be generated to fill the missing information from that viewpoint.

Figure 67:
FIG. 67 shows the missing information for the right viewpoint as highlighted in color on the right side of the masked objects in the lower image when the foreground object, here a crystal ball is translated to the left.

FIG. 67 shows the missing information for the right viewpoint as highlighted in color on the right side of the masked objects in the lower image when the foreground object, here a crystal ball is translated to the left. In generating the right viewpoint of the three-dimensional image, the highlighted data must be generated to fill the missing information from that viewpoint. Alternatively, a single camera viewpoint may be offset from the viewpoint of the original camera, however the missing data is large for the new viewpoint. This may be utilized if there are a large number of frames and some of the missing information is found in adjacent frames for example.

Figure 68:
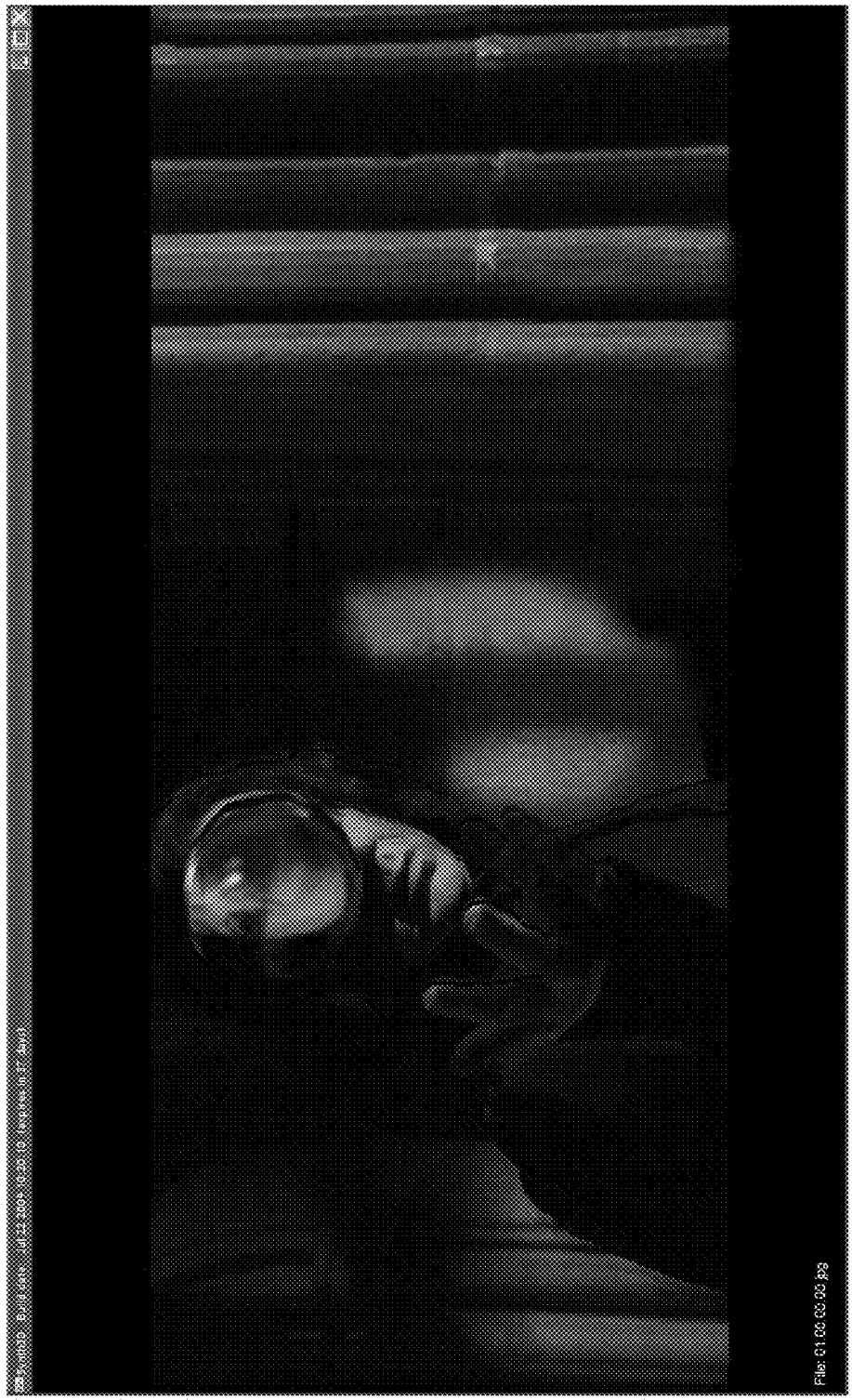
FIG. 68 shows an anaglyph of the final depth enhanced first image frame viewable with Red/Blue 3-D glasses.

FIG. 68 shows an anaglyph of the final depth enhanced first image frame viewable with Red/Blue 3-D glasses. The original two-dimensional image is now shown in three-dimensions.

Figure 69:
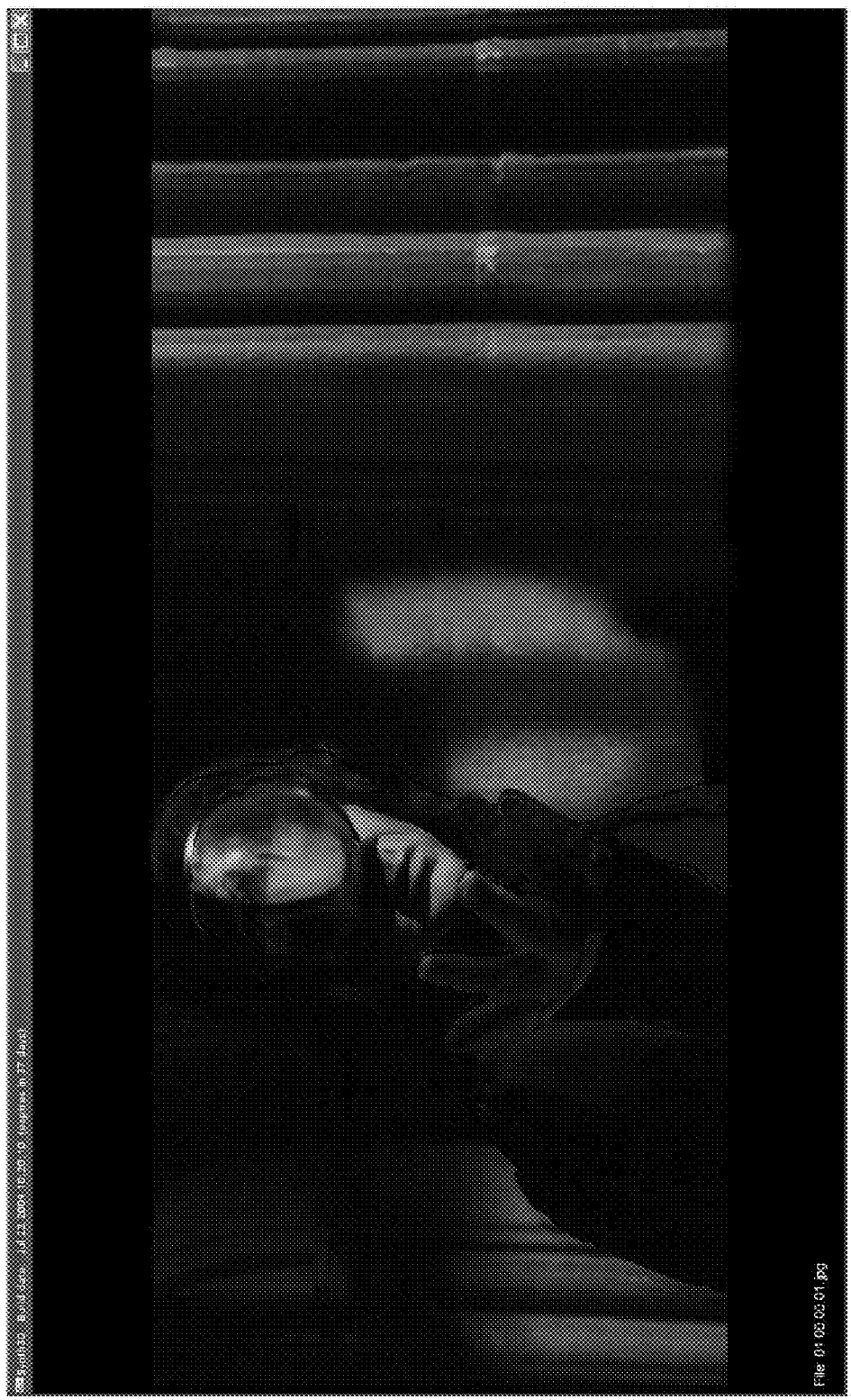
FIG. 69 shows an anaglyph of the final depth enhanced second and last image frame viewable with Red/Blue 3-D glasses, note rotation of person's head, movement of person's hand and movement of crystal ball.

FIG. 69 shows an anaglyph of the final depth enhanced second and last image frame viewable with Red/Blue 3-D glasses, note rotation of person's head, movement of person's hand and movement of crystal ball. The original two-dimensional image is now shown in three-dimensions as the masks have been moved/reshaped using the mask tracking/reshaping as described above and applying depth information to the masks in this subsequent frame from an image sequence. As described above, the operations for applying the depth parameter to a subsequent frame is performed using a general purpose computer having a central processing unit (CPU), memory, bus situated between the CPU and memory for example specifically programmed to do so wherein figures herein which show computer screen displays are meant to represent such a computer.

Figure 70:
FIG. 70 shows the right side of the crystal ball with fill mode "smear", wherein the pixels with missing information for the left viewpoint, i.e., on the right side of the crystal ball are taken from the right edge of the missing image pixels and "smeared" horizontally to cover the missing information.

FIG. 70 shows the right side of the crystal ball with fill mode "smear", wherein the pixels with missing information for the left viewpoint, i.e., on the right side of the crystal ball are taken from the right edge of the missing image pixels and "smeared" horizontally to cover the missing information. Any other method for introducing data into hidden areas is in keeping with the spirit of the invention. Stretching or smearing pixels where missing information is creates artifacts that are recognizable to human observers as errors. By obtaining or otherwise creating realistic data for the missing information is, i.e., for example via a generated background with missing information filled in, methods of filling missing data can be avoided and artifacts are thus eliminated. For example, providing a composite background or frame with all missing information designated in a way that an artist can use to create a plausible drawing or painting of a missing area is one method of obtaining missing information for use in two-dimensional to three-dimensional conversion projects.

Figure 71:
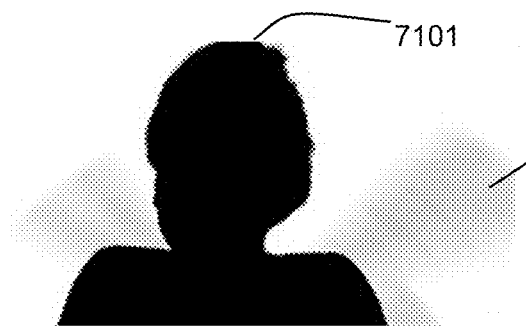
FIG. 71 shows a mask or alpha plane, for an actor's upper torso and head (and transparent wings). The mask may include opaque areas shown as black and transparent areas that are shown as grey areas.

FIG. 71 shows a mask or alpha plane for a given frame of a scene, for an actor's upper torso and head 7101, and transparent wings 7102. The mask may include opaque areas shown as black and transparent areas that are shown as grey areas. The alpha plane may be generated for example as an 8 bit grey-scale "OR" of all foreground masks. Any other method of generating a foreground mask having motion objects or foreground object related masks defined is in keeping with the spirit of the invention.

Figure 72:
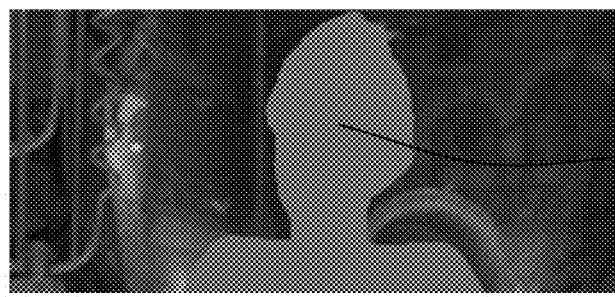
FIG. 72 shows an occluded area, that corresponds to the actor of FIG. 71, and that shows an area of the background that is never exposed in any frame in a scene. This may be a composite background for example.

FIG. 72 shows an occluded area, i.e., missing background image data 7201 as a colored sub-area of the actor of FIG. 71 that never uncovers the underlying background, i.e., where missing information in the background for a scene or frame occurs. This area is the area of the background that is never exposed in any frame in a scene and hence cannot be borrowed from another frame. When for example generating a composite background, any background pixel not covered by a motion object mask or foreground mask can have a simple Boolean TRUE value, all other pixels are thus the occluded pixels as is also shown in FIG. 34.

Figure 73:
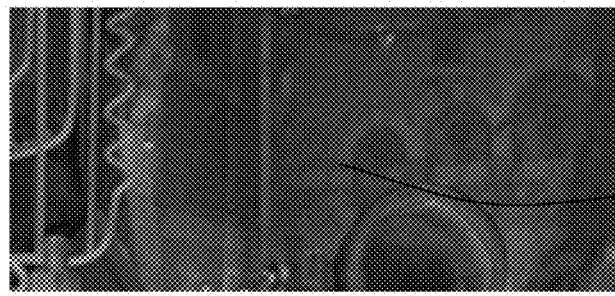
FIG. 73 shows the occluded area artistically rendered to generate a complete and realistic background for use in two-dimensional to three-dimensional conversion, so as to enable an artifact-free conversion.

FIG. 73 shows the occluded area of FIG. 72 with generated data 7201a for missing background image data that is artistically drawn or otherwise rendered to generate a complete and realistic background for use in artifact free two-dimensional to three-dimensional conversion. As shown, FIG. 73 also has masks drawn on background objects, which are shown in colors that differ from the source image. This allows for colorization or colorization modifications for example as desired.

Figure 73A:
FIG. 73A shows the occluded area partially drawn or otherwise rendered to generate just enough of a realistic looking background for use in minimizing artifacts two-dimensional to three-dimensional conversion.

FIG. 73A shows the occluded area with missing background image data 7201*b* partially drawn or otherwise rendered to generate just enough of a realistic looking background for use in artifact free two-dimensional to three-dimensional conversion. An artist in this example may draw narrower versions of the occluded areas, so that offsets to foreground objects would have enough realistic background to work with when projecting a second view, i.e., translating a foreground object horizontally which exposes occluded areas. In other words, the edges of the missing background image data area may be drawn horizontally inward by enough to allow for some of the generated data to be used, or all of the generated data to be used in generating a second viewpoint for a three-dimensional image set.

In one or more embodiments of the invention, a number of scenes from a movie may be generated for example by computer drawing by artists or sent to artists for completion of backgrounds. In one or more embodiments, a website may be created for artists to bid on background completion projects wherein the website is hosted on a computer system connected for example to the Internet. Any other method for obtaining backgrounds with enough information to render a two-dimensional frame into a three-dimensional pair of viewpoints is in keeping with the spirit of the invention, including rendering a full background with realistic data for all of the occluded area of FIG. 72 (which is shown in FIG. 73) or only a portion of the edges of the occluded area of FIG. 72, (which is shown as FIG. 73A). By estimating a background depth and a depth to a foreground object and knowing the offset distance desired for two viewpoints, it is thus possible to obtain less than the whole occluded area for use in artifact free two-dimensional to three-dimensional conversion. In one or more embodiments, a fixed offset, e.g., 100 pixels on each edge of each occluded area, or a percentage of the size of the foreground object, i.e., 5% for example, may flagged to be created and if more data is needed, then the frame is flagged for updating, or smearing or pixel stretching may be utilized to minimize the artifacts of missing data.

Figure 74:
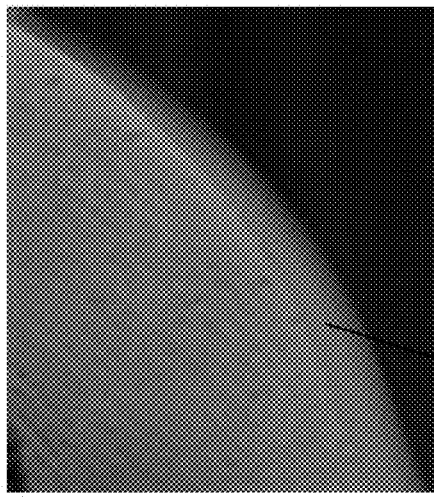
FIG. 74 shows a light area of the shoulder portion on the right side of FIG. 71 that represents a gap where stretching (as is also shown in FIG. 70) would be used when shifting the foreground object to the left to create a right viewpoint. The dark portion of the figure is taken from the background where data is available in at least one frame of a scene.

FIG. 74 shows a light area of the shoulder portion on the right side of FIG. 71, where missing background image data 7201 exists when generating a right viewpoint for a right image of a three-dimensional image pair. Missing background image data 7201 represents a gap where stretching (as is also shown in FIG. 70) or other artifact producing techniques would be used when shifting the foreground object to the left to create a right viewpoint. The dark portion of the figure is taken from the background where data is available in at least one frame of a scene.

Figure 75:
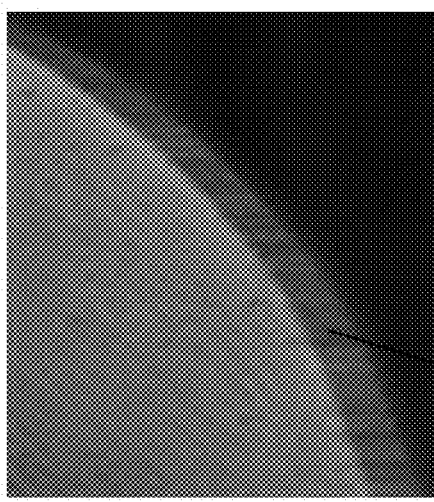
FIG. 75 shows an example of the stretching of pixels, i.e., smearing, corresponding to the light area in FIG. 74 without the use of a generated background, i.e., if no background data is available for an area that is occluded in all frames of a scene.

FIG. 75 shows an example of the stretching of pixels, or "smeared pixels" 7201*c*, corresponding to the light area in FIG. 74, i.e., missing background image data 7201, wherein the pixels are created without the use of a generated background, i.e., if no background data is available for an area that is occluded in all frames of a scene.

Figure 76:
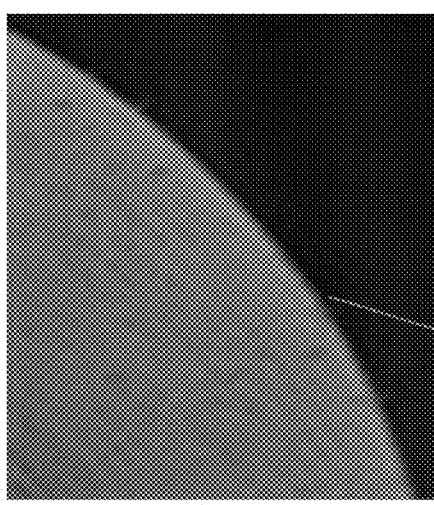
FIG. 76 shows a result of a right viewpoint without artifacts on the edge of the shoulder of the person wherein the dark area includes pixels available in one or more frames of a scene, and generated data for always-occluded areas of a scene.

FIG. 76 shows a result of a right viewpoint without artifacts on the edge of the shoulder of the person through use of generated data 7201*a* (or 7201*b*) for missing background image data 7201 shown as for always-occluded areas of a scene.

The invention claimed is:

1. A method of modifying a set of time ordered digital images comprising:
 associating a first mask with a motion object in a first image;
 copying said first mask to create a second mask associated with a second image;
 moving said second mask to location of said motion object in said second image; and,
 reshaping said second mask automatically to fit said motion object in said second image using a computer.

2. The method of claim 1 further comprising:
 setting at least one color parameter associated with said first mask; and,
 applying said at least one color parameter to said second image.

3. A method of modifying a set of time ordered digital images comprising:
 creating a mask based on bimodal thresholding at a mask location;
 adjusting a mask shape of said mask by a weighted sliding scale for luminance and pattern using a computer; and,
 entering said mask location and said mask shape into a visual reference database coupled with said computer.

4. A method of modifying a set of time ordered digital images comprising:
 copying a first mask associated with a first mask location related to a first image to a second mask associated with a second mask location related to a second image;
 searching via gradient descent within a bounding box around said second mask location in said second image for a pattern of luminance contained within said first mask in said first image; and,
 adjusting said second mask location in said second image using a computer.

5. The method of claim 4 further comprising:
 calculating a weighted index for said first mask in said first image using bilinear interpolation;
 creating a fit box for said second mask in said second image; and,
 modifying a mask shape of said second mask using a gradient descent of minimum errors based on luminance and pattern matching using a computer.

6. The method of claim 5 further comprising:
 setting a depth parameter associated with said first mask in said first image;
 applying said depth parameter to said second mask in said second image.

7. The method of claim 6 wherein modifying the mask shape of said second mask further comprises:
 generating a second viewpoint image using generated missing background data when translating said second mask in said second image in a horizontal direction.

8. A method of modifying a set of time ordered digital images comprising:
 calculating a weighted index for a first mask in a first image using bilinear interpolation;
 creating a fit box for a second mask in a second image; and,
 modifying a mask shape of said second mask using a gradient descent of minimum errors based on luminance and pattern matching using a computer.

9. The method of claim 8 wherein modifying the mask shape of said second mask further comprises:
 setting a depth parameter associated with said first mask in said first image;
 applying said depth parameter to said second mask in said second image.

10. The method of claim 9 wherein modifying the mask shape of said second mask further comprises:
generating a second viewpoint image using generated missing background data when translating said second mask in said second image in a horizontal direction.

11. The method of claim 8 wherein modifying the mask shape of said second mask further comprises:
modifying said mask shape using Bezier curve animation with edge detection.

12. The method of claim 8 wherein modifying the mask shape of said second mask further comprises:
modifying said mask shape via polygon animation with edge detection.

13. A system configured to modify a set of time ordered digital images comprising a computer configured to:
associate a first mask with a motion object in a first image;
copy said first mask to create a second mask associated with a second image;
move said second mask to location of said motion object in said second image; and,
reshape said second mask to fit said motion object in said second image.

14. The system of claim 13 wherein said computer is further configured to:
set at least one color parameter associated with said first mask; and,
apply said at least one color parameter to said second image.

15. A system configured to modify a set of time ordered digital images comprising:
a visual reference database;
a computer coupled with said visual reference database wherein said computer is configured to
create a mask based on bimodal thresholding at a mask location;
adjust a mask shape of said mask by a weighted sliding scale for luminance and pattern; and,
enter said mask location and said mask shape into said visual reference database coupled with said computer.

16. A system configured to modify a set of time ordered digital images comprising a computer configured to:
copy a first mask associated with a first mask location related to a first image to a second mask associated with a second mask location related to a second image;
search via gradient descent within a bounding box around said second mask location in said second image for a pattern of luminance contained within said first mask in said first image; and,
adjust said second mask location in said second image.

17. The system of claim 16 wherein said computer is further configured to:
calculate a weighted index for said first mask in said first image using bilinear interpolation;
create a fit box for said second mask in said second image; and,
modify a mask shape of said second mask using a gradient descent of minimum errors based on luminance and pattern matching.

18. The system of claim 17 wherein said computer is further configured to:
set a depth parameter associated with said first mask in said first image;
apply said depth parameter to said second mask in said second image.

19. The system of claim 18 wherein said computer is further configured to:
generate a second viewpoint image through use of generated missing background data when said second mask in said second image is translated in a horizontal direction.

20. A system configured to modify a set of time ordered digital images comprising a computer configured to:
calculate a weighted index for a first mask in a first image using bilinear interpolation;
create a fit box for a second mask in a second image; and,
modify a mask shape of said second mask using a gradient descent of minimum errors based on luminance and pattern matching.

21. The system of claim 20 wherein said computer is further configured to:
set a depth parameter associated with said first mask in said first image;
apply said depth parameter to said second mask in said second image.

22. The system of claim 21 wherein said computer is further configured to:
generate a second viewpoint image through use of generated missing background data when said second mask in said second image is translated in a horizontal direction.

23. The system of claim 20 wherein said computer is further configured to:
modify said mask shape using Bezier curve animation with edge detection.

24. The system of claim 20 wherein said computer is further configured to:
modify said mask shape via polygon animation with edge detection.

* * * * *